US012771424B2

(12) United States Patent
Muruganathan et al.

(10) Patent No.: US 12,771,424 B2
(45) Date of Patent: Oct. 20, 2026

(54) FREQUENCY DOMAIN CSI COMPRESSION FOR COHERENT JOINT TRANSMISSION

(71) Applicant: Telefonaktiebolaget LM Ericsson (publ), Stockholm (SE)

(72) Inventors: Siva Muruganathan, Stittsville (CA); Fredrik Athley, Västra Frölunda (SE); Shiwei Gao, Nepean (CA); Andreas Nilsson, Gothenburg (SE); Xinlin Zhang, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 18/685,752

(22) PCT Filed: Aug. 23, 2022

(86) PCT No.: PCT/IB2022/057899
§ 371 (c)(1),
(2) Date: Feb. 22, 2024

(87) PCT Pub. No.: WO2023/026196
PCT Pub. Date: Mar. 2, 2023

(65) Prior Publication Data

US 2024/0364400 A1 Oct. 31, 2024

Related U.S. Application Data

(60) Provisional application No. 63/236,157, filed on Aug. 23, 2021.

(51) Int. Cl.

| | |
|---|---|
| ***H04B 7/06*** | (2006.01) |
| ***H04B 7/0456*** | (2017.01) |
| ***H04W 24/08*** | (2009.01) |

(52) U.S. Cl.
CPC ......... *H04B 7/0626* (2013.01); *H04B 7/0479* (2023.05); *H04W 24/08* (2013.01)

(58) Field of Classification Search
CPC .... H04B 7/0626; H04B 7/0479; H04W 24/08
See application file for complete search history.

(56) References Cited

U.S. PATENT DOCUMENTS

| | | | |
|---|---|---|---|
| 10,020,860 | B2 | 7/2018 | Onggosanusi et al. |
| 11,936,456 | B2 | 3/2024 | Grossman et al. |

(Continued)

FOREIGN PATENT DOCUMENTS

| | | | |
|---|---|---|---|
| EP | 4106217 | A1 | 12/2022 |
| WO | 2023026195 | A1 | 3/2023 |

(Continued)

OTHER PUBLICATIONS

Author Unknown, "Technical Specification Group Radio Access Network; NR; Physical layer procedures for data (Release 16)," Technical Specification 38.214, Version 16.5.0, Mar. 2021, 3GPP Organizational Partners, 171 pages.

(Continued)

*Primary Examiner* — Duc C Ho
(74) *Attorney, Agent, or Firm* — Withrow & Terranova, PLLC

(57) ABSTRACT

A method performed by a user equipment (UE) comprises receiving information that configures the UE with: (a) Non-Zero Power (NZP) Channel State Information Reference Signal (CSI-RS) resources for channel measurement each associated with a different Transmission Configuration Indicator (TCI) state or unified TCI state, (b) a single NZP CSI-RS resource for channel measurement comprising multiple sets of CSI-RS ports each associated with a different TCI state or unified TCI state, or both (a) and (b). The information further configures the UE with a parameter (Continued)

combination indicating at least a number of frequency domain (FD) basis vectors to be selected and reported per layer across the NZP CSI-RS resources or the sets of CSI-RS ports, or for each of the NZP CSI-RS resources or each of the of CSI-RS ports and a number of precoding matrix indicator (PMI) subbands. The method further comprises computing and reporting CSI accordingly.

15 Claims, 15 Drawing Sheets

(56) References Cited

U.S. PATENT DOCUMENTS

| | | | | |
|---|---|---|---|---|
| 12,432,588 | B2 | 9/2025 | Zeineddine et al. | |
| 12,563,434 | B2 | 2/2026 | Khoshnevisan et al. | |
| 2021/0359745 | A1* | 11/2021 | Farag | H04L 1/0071 |
| 2022/0303812 | A1 | 9/2022 | Chung et al. | |
| 2023/0037394 | A1* | 2/2023 | Rahman | H04B 7/0478 |
| 2023/0061722 | A1 | 3/2023 | Hao et al. | |
| 2023/0246781 | A1* | 8/2023 | Kim | H04L 5/0051 370/329 |
| 2023/0403058 | A1 | 12/2023 | Khan Beigi et al. | |
| 2024/0250727 | A1* | 7/2024 | Muruganathan | H04B 7/065 |

FOREIGN PATENT DOCUMENTS

| | | | |
|---|---|---|---|
| WO | 2023026197 | A1 | 3/2023 |
| WO | 2023026200 | A1 | 3/2023 |

OTHER PUBLICATIONS

Author Unknown, "Technical Specification Group Radio Access Network; NR; Radio Resource Control (RRC) protocol specification (Release 16)," Technical Specification 38.331, Version 16.5.0, Jun. 2021, 3GPP Organizational Partners, 959 pages.

Ericsson, "R1-2101687: CSI enhancements for Multi-TRP and FR1 FDD reciprocity," 3GPP TSG-RAN WG1 Meeting #104-e, Jan. 25-Feb. 5, 2021, Electronic Meeting, 22 pages.

Huawei, et al., "RWS-210437: NR enhancements for DL MIMO," 3GPP TSG RAN Meeting #92-e, Jun. 28-Jul. 2, 2021, Electronic Meeting, 14 pages.

Huawei, et al., "R1-2101884: Summary of CSI enhancements for MTRP and FDD (Round 0)," 3GPP TSG RAN WG1 Meeting #104-e, Jan. 25-Feb. 5, 2021, Electronic Meeting, 48 pages.

Samsung, "Rws: 210181: On Rel-18 NR MIMO enhancements for 5G Advanced," 3GPP TSG RAN Rel-18 Workshop, Jun. 28-Jul. 2, 2021, Electronic Meeting, 9 pages.

International Search Report and Written Opinion for International Patent Application No. PCT/IB2022/057898, mailed Dec. 21, 2022, 16 pages.

International Search Report and Written Opinion for International Patent Application No. PCT/IB2022/057907, mailed Dec. 16, 2022, 18 pages.

International Search Report and Written Opinion for International Patent Application No. PCT/IB2022/057899, mailed Dec. 14, 2022, 18 pages.

International Search Report and Written Opinion for International Patent Application No. PCT/IB2022/057900, mailed Dec. 20, 2022, 18 pages.

* cited by examiner

FREQUENCY DOMAIN CSI COMPRESSION FOR COHERENT JOINT TRANSMISSION

RELATED APPLICATIONS

This application is a 35 U.S.C. § 371 national phase filing of International Application No. PCT/IB2022/057899, filed Aug. 23, 2022, which claims the benefit of provisional patent application Ser. No. 63/236,157, filed Aug. 23, 2021, the disclosures of which are hereby incorporated herein by reference in their entireties.

TECHNICAL FIELD

The present disclosure relates to a wireless communication system and, more specifically, relates to Channel State Information (CSI) feedback in a wireless communication system.

BACKGROUND 1.1 Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Third Generation Partnership Project (3GPP) New Radio (NR) standard is currently evolving with enhanced MIMO support. A core component in NR is the support of MIMO antenna deployments and MIMO related techniques like for instance spatial multiplexing. The spatial multiplexing mode is aimed for high data rates in favorable channel conditions. An illustration of the spatial multiplexing operation is provided in FIG. 1.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

NR uses Orthogonal Frequency Division Multiplexing (OFDM) in the downlink (and Discrete Fourier Transform (DFT) precoded OFDM in the uplink for rank-1 transmission) and hence the received $N_R \times 1$ vector $y_n$ for a certain TFRE on subcarrier n (or alternatively data TFRE number n) is thus modeled by $$y_n = H_n W s_n + e_n$$

where $e_n$, is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the User Equipment (UE).

In closed-loop precoding for the NR downlink, the UE transmits, based on channel measurements in the downlink, recommendations to the NR base station (gNB) of a suitable precoder to use. The gNB configures the UE to provide feedback according to CSI-ReportConfig and may transmit Channel State Information Reference Signal (CSI-RS) and configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of Channel State Information (CSI) feedback, which also encompasses feeding back other information than recommended precoders to assist the gNodeB in subsequent transmissions to the UE. Such other information may include Channel Quality Indicators (CQIs) as well as transmission Rank Indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 Physical Resource Blocks (PRBs) depending on the band width part (BWP) size.

Given the CSI feedback from the UE, the gNB determines the transmission parameters it wishes to use to transmit to the UE, including the precoding matrix, transmission rank, and Modulation and Coding Scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

1.2 2D Antenna Arrays

Embodiments of solution(s) described in the present disclosure may be used with two-dimensional (2D) antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. The concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with dual-polarized antenna elements is illustrated in FIG. 2.

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook.

1.3 Channel State Information Reference Signals (CSI-RS)

For CSI measurement and feedback, CSI-RS are defined. A CSI-RS is transmitted on each antenna port and is used by a UE to measure downlink channel between each of the transmit antenna ports and each of its receive antenna ports. The transmit antenna ports are also referred to as CSI-RS ports. The supported number of antenna ports in NR are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. FIG. 3 shows an example of CSI-RS REs for 12 antenna ports, where 1 Resource Element (RE) per Resource Block (RB) per port is shown.

In addition, Interference Measurement Resource (IMR) is also defined in NR for a UE to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality.

Furthermore, a UE in NR may be configured to measure interference based on one or multiple NZP CSI-RS resource.

1.4 CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report.

Each CSI reporting setting contains at least the following information:

- A CSI-RS resource set for channel measurement
- An IMR resource set for interference measurement
- Optionally, a CSI-RS resource set for interference measurement
- Time-domain behavior, i.e. periodic, semi-persistent, or aperiodic reporting
- Frequency granularity, i.e. wideband or subband
- CSI parameters to be reported such as RI, PMI, CQI, and CSI-RS Resource Indicator (CRI) in case of multiple CSI-RS resources in a resource set
- Codebook types, i.e. type I or II, and codebook subset restriction
- Measurement restriction
- Subband size. One out of two possible subband sizes is indicated, the value range depends on the bandwidth of the bandwidth part (BWP). One CQI/PMI (if configured for subband reporting) is fed back per subband).

1.5 DFT-Based Precoders

A common type of precoding is to use a DFT-precoder, where the precoder vector used to precode a single-layer transmission using a single-polarized Uniform Linear Array (ULA) with N antennas is defined as $$w_{1D}(k) = \frac{1}{\sqrt{N}} \begin{bmatrix} e^{j2\pi\cdot 0\cdot\frac{k}{QN}} \\ e^{j2\pi\cdot 1\cdot\frac{k}{QN}} \\ \vdots \\ e^{j2\pi\cdot(N-1)\cdot\frac{k}{QN}} \end{bmatrix},$$

where k=0, 1, . . . QN−1 is the precoder index and Q is an integer oversampling factor. A corresponding precoder vector for a two-dimensional Uniform Planar Array (UPA) can be created by taking the Kronecker product of two precoder vectors as $$W_{2D}(k, l) = W_{1D}(k) \otimes w_{1D}(l).$$

Extending the precoder for a dual-polarized UPA may then be done as $$W_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\phi}$ is a co-phasing factor that may for instance to be selected from Quadrature Phase Shift Keying (QPSK) alphabet $$\phi \in \left\{0, \frac{\pi}{2}, \pi, \frac{3\pi}{2}\right\}.$$

A precoder matrix $W_{2D,DP}$ for multi-layer transmission may be created by appending columns of DFT precoder vectors as $$W_{2D,DP} = [w_{2D,DP}(k_1, l_1, \phi_1)\ w_{2D,DP}(k_2, l_2, \phi_2)\ \ldots\ w_{2D,DP}(k_r, l_r, \phi_r)],$$

where r is the number of transmission layers, i.e. the transmission rank. In a common special case, for a rank-2 DFT precoder, $k_1=k_2=k$ and $l_1=l_2=l$, meaning that $$W_{2D,DP} = [\, w_{2D,DP}(k, l, \phi_1)\ \ w_{2D,DP}(k, l, \phi_2) \,] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

Such DFT-based precoders are used for instance in NR Type I CSI feedback.

1.6 MU-MIMO

With multi-user MIMO (MU-MIMO), two or more UEs in the same cell are co-scheduled on the same time-frequency resource. That is, two or more independent data streams are transmitted to different UEs at the same time, and the Spatial Domain (SD) is used to separate the respective streams. By transmitting several streams simultaneously, the capacity of the system can be increased. This, however, comes at the cost of reducing the Signal to Interference plus Noise Ratio (SINR) per stream, as the power must be shared between streams, and the streams will cause interference to each-other.

1.7 Multi-Beam (Linear Combination) Precoders

One central part of MU-MIMO is to obtain accurate CSI that enables null forming between co-scheduled UEs. Therefore, support has been added in Long Term Evolution (LTE) Rel.14 and NR Rel.15-16 for codebooks that provide more detailed CSI than the traditional single DFT-beam precoders. These codebooks, which are referred to as Advanced CSI (LTE), Type TT codebooks (NR Rel.15), and enhanced Type TT codebooks (NR Rel.16), can be described as a set of precoders where each precoder is created from multiple DFT beams. A multi-beam precoder may be defined as a linear combination of several DFT precoder vectors as $$w = \sum_i c_i \cdot w_{2D,DP}(k_i, l_i, \phi_i),$$

where $\{c_i\}$ may be general complex coefficients. Such a multi-beam precoder may more accurately describe the UE's channel and may thus bring an additional performance benefit compared to a DFT precoder, especially for MU-MIMO where rich channel knowledge is desirable in order to perform nullforming between co-scheduled UEs.

1.7.1 NR Rel-15 Type II Codebook

For the NR Type II codebook in Rel-15, the precoding vector for each layer and subband is expressed in 3GPP Technical Specification (TS) 38.214 for a given dual-polarization antenna array with $N_1$ and $N_2$ elements in each dimension for each polarization as:

$$W^l_{q_1 q_2, n_1, n_2, p_l^{(1)}, p_l^{(2)}, c_l} = \frac{1}{\sqrt{N_1 N_2 \sum_{i=0}^{2L-1} \left(p_{l,i}^{(1)} p_{l,i}^{(2)}\right)^2}} \begin{bmatrix} \sum_{i=0}^{L-1} v_{m_1^{(i)}, m_2^{(i)}} p_{l,i}^{(1)} p_{l,i}^{(2)} \varphi_{l,i} \\ \sum_{i=0}^{L-1} v_{m_1^{(i)}, m_2^{(i)}} p_{l,i+L}^{(1)} p_{l,i+L}^{(2)} \varphi_{l,i+L} \end{bmatrix}, l = 1, 2$$

If we restructure the above formula and express it a bit simpler, we can form the precoder vector $w_{l,p}(k)$ for a certain layer l=0, 1, polarization p=0, 1 and subband k=0, . . . , $N_{SB}-1$ as $$w_{l,p}(k) = \frac{1}{C} \sum_{i=0}^{L-1} v_i p_{l,i}^{(1)} c_{l,i}(k)$$

where $v_i = w_{2D}(m_1, m_2) = w_{1D}(m_1) \otimes w_{1D}(m_2)$ is the $i^{th}$ selected 2D beam, $$c_{l,i}(k) = p_{l,i}^{(2)}(k)\varphi_{l,i}(k) \text{ for } p = 0 \text{ and } c_{l,i}(k) = p_{l,L+i}^{(2)}(k)\varphi_{l,L+i}(k)$$

for p=1, and $N_{SB}$ is the number of subbands in the CSI reporting bandwidth. Hence, the change in a beam coefficient across frequency $c_{l,i}(k)$ is determined based on the $2N_{SB}$ parameters $$p_{l,i}^{(2)}(0), \ldots, p_{l,i}^{(2)}(N_{SB}-1) \text{ and } \varphi_{l,i}(0), \ldots, \varphi_{l,i}(N_{SB}-1),$$

where the subband amplitude parameter $$p_{l,i}^{(2}$$

is quantized using 0 or 1 bit, and the subband phase parameter $\varphi_{l,i}$ is quantized using 2 or 3 bits (i.e., either QPSK or 8PSK alphabets), depending on codebook configuration. Further details of the NR rel-15 Type II codebook and associated CSI reporting can be found in 3GPP TS 38.214 V16.5.0 (Clause 5.2.2.2.3).

1.7.2 NR Rel-16 Type II Codebook

For NR Rel-16 Type II, overhead reductions mechanism has been specified. The rationale is that it has been observed that there is a strong correlation between different values of $c_{l,i}$, for different subbands, and one could exploit this correlation to perform efficient compression in order to reduce the number of bits required to represent the information. This would thus lower the amount of information which needs to be signaled from the UE to the gNB which is relevant from several aspects.

Thus, in NR Rel-16 Type II codebook, a set of Frequency Domain (FD) DFT vectors over a set of subbands is introduced. The codebook design for NR Rel-16 Type II codebook can be described as follows:

- Precoder matrix for all FD-units for a spatial layer is given by a size-P×$N_3$ matrix $$W = \left[w^{(0)} \ldots w^{(N_3-1)}\right] = W_1 \tilde{W}_2 W_f^H,$$

- P=$2N_1N_2$ is the number of antenna ports or the SD dimensions, where $N_1$ and $N_2$ are the number of antenna ports in the $1^{st}$ dimension and the $2^{nd}$ dimension of the antenna array, respectively
  - $N_3 = N_{SB} \times R$ is the number of PMI subbands, or the FD dimension, where
    - The value R={1, 2} (the PMI subband size indicator) is Radio Resource Control (RRC) configured
    - $N_{SB}$ is the number of CQI subbands, which is also configured by RRC
    - This applies for $N_{SB} \times R \leq 13$,
  - $W_1$ is size-P×2L spatial compression matrix, where L is a number of selected beams or 2D spatial DFT vectors out of P 2D spatial DFT vectors $\{w_{2D}(m_1, m_2, m_1=0, 1 \ldots, N_1; m_2=0, 1, \ldots, N_2\}$
  - $W_f$ is size-$N_3$×M frequency compression matrix, where M is a number of selected FD basis vectors out of the $N_3$ orthogonal FD DFT basis vectors $\{f_0 f_1 \ldots f_{N_3-1}\}$, where $f_k$ is a size-$N_3$×1 frequency domain DFT vector
  - $\tilde{W}_2$ is size 2L×M coefficient matrix
  - Precoder normalization: the precoding matrix for a given rank and unit of $N_3$ is normalized to norm 1/sqrt(rank)
  - v□{1, . . . , $RI_{MAX}$}∈{1, . . . , $RI_{MAX}$} is the rank reported in Part 1 of the CSI report
- SD compression by $W_1$
  - L SD basis vectors are selected; the L SD basis vectors mapped to the two polarizations, and hence there are 2L columns in total in $W_1$
  - Compression in SD using $$W_1 = \begin{bmatrix} v_0 v_1 \ldots v_{L-1} & 0 \\ 0 & v_0 v_1 \ldots V_{L-1} \end{bmatrix},$$

where $$\{v_i\}_{i=0}^{L-1}$$

are $N_1N_2\times1$ orthogonal 2D SD DFT vectors (same as Rel. 15 Type II) from rotated DFT basis

- 4 rotation hypotheses per spatial dimension corresponding to 4× oversampling
- SD-basis selection is layer-common
- The value of L={2, 4, 6} (number of "beams" or SD-basis vectors) is RRC configured
  - L=6 only supported for limited parameter setting:

$$32\ Tx,\ R=1,\ (p,\beta)\in\left\{\left(\frac{1}{4},\frac{1}{4}\right),\left(\frac{1}{4},\frac{1}{2}\right),\left(\frac{1}{4},\frac{3}{4}\right),\left(\frac{1}{2},\frac{1}{4}\right)\right\}$$

Frequency-domain (FD) compression by $W_f$

- Compression via $W_f=[f_{k_0}\ f_{k_1}\ \ldots\ f_{k_{M-1}}]$, where $$\{f_{k_m}\}_{m=0}^{M-1}$$

are M size-$N_3\times1$ orthogonal frequency domain DFT vectors, where

- $M=\lceil p\times N_3/R\rceil$, and $p=y_0$ for rank=1-2 and $p=v_0$ for rank=3-4
  - The parameters ($y_0$, $v_0$) are jointly configured in RRC and take values from $$\left\{\left(\frac{1}{2},\frac{1}{4}\right),\left(\frac{1}{4},\frac{1}{4}\right),\left(\frac{1}{4},\frac{1}{8}\right)\right\}$$

- Note that M represents the nominal number of FD components.
- FD-basis selection is layer-specific but uses a layer-common intermediary subset for $N_3\geq19$
  - For $N_3\leq19$, one-step free selection is used
    - FD-basis selection per layer is indicated with a $$\left\lceil\log_2\binom{N_3-1}{M_l-1}\right\rceil\ \text{bit}$$

combinatorial indicator for the $l^{th}$ layer, and $M_l$ is the number of selected FD basis vectors for the $l^{th}$ layer. In TS 38.214, the combinatorial indicator is given by the index $i_{1,6,l}$ where l corresponds to the layer index. This combinatorial index is reported by UE to the gNB per layer per PMI.

- For $N_3>19$, two-step selection with layer-common intermediary subset (IntS) is used
    - A window-based IntS selection which is fully parameterized with $M_{initial}$,
    - the intermediate basis set consists of FD bases mod($M_{initial}$+n, $N_3$), n=0, 1, . . . , N−1, where N=2M. Note that as specified in TS 38.214, the selected IntS is reported by UE to the gNB by the UE via the index $i_{1,5}$ which is reported as part of the PMI.
    - The $2^{nd}$ step subset selection is indicated by an $$\left\lceil\log_2\binom{N_3'-1}{M_l-1}\right\rceil-\text{bit}$$

combinatorial indicator for the $l^{th}$ layer in part 2 of the CSI report. In TS 38.214, the combinatorial indicator is given by the index $i_{1,6,l}$ where l corresponds to the layer index. This combinatorial index is reported by UE to the gNB per layer per PMI.

Linear combination by $\tilde{W}_2$ (for $l^{th}$ layer)

$$\tilde{W}_{2,l}=\begin{bmatrix} c_{l,0,0} & \cdots & c_{l,0,M-1} \\ \vdots & \ddots & \vdots \\ c_{l,2L-1,0} & \cdots & c_{l,2L-1,M-1} \end{bmatrix}$$

is composed of $K=2LM_l$ linear combination coefficients

Coefficient subset selection

- Only a subset $K_{NZ,l}\leq K_0<2LM_l$ coefficients are non-zero and reported as part of CSI feedback
  - The $2LM_l$-$K_{NZ,l}$ non-reported coefficients are considered zero and not reported
  - The maximum number of non-zero coefficients per layer is $K_0=\lceil\beta\times2LM_0\rceil$ $$\beta\in\left\{\frac{1}{4},\frac{1}{2},\frac{3}{4}\right\}$$

is RRC configured

- For rank v={2,3,4}, the total maximum number of non-zero (NZ) coefficients across all layers $\leq2K_0$
- Coefficient subset selection: for each layer l a size-$2LM_l$ bitmap with $K_{NZ,l}$ ones is indicated in Part 2 of the CSI
- Indication of $K_{NZ,TOT}$ (the total number of non-zero coefficients summed across all the layers, where $K_{NZ,TOT}\in\{1, 2, \ldots, 2K_0\}$ is given in Part 1 of the CSI, so that Part 2 of the CSI payload can be known Coefficient quantization according to $$c_{l,i,m}=p_{ref}\left(\left\lfloor\frac{i}{L}\right\rfloor\right)\times p(i,m)\times\varphi(i,m)$$

- Strongest coefficient: the strongest coefficient $c_{l,i^*,m^*}=1$ (hence its amplitude/phase is not reported) indicated with a per-layer strongest coefficient indicator ($SCI_l$)
  - For rank=1, a $\lceil\log_2 K_{NZ,0}\rceil$-bit indicator is included for the strongest coefficient index, SCI, (i*, m*)
  - For rank>1, a $\lceil\log_2 2L\rceil$-bit indicator is used per layer l with $l\in\{1, \ldots, v\}$ and v being the rank indicator (RI). The location (index) of the strongest linear combination (LC) coefficient for layer l before index remapping is ($i_l^*$,$m_l^*$), $SCI_l=i_l^*$ and $m_l^*$ is not reported
- Two polarization-specific reference amplitudes $p_{ref}(0)$, $p_{ref}(1)$
  - For the polarization associated with the strongest coefficient $$p_{ref}\left(\left\lfloor\frac{i^*}{L}\right\rfloor\right)=1$$

and hence is not reported

For the other polarization, the reference amplitude is quantized to 4 bits:

The alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}},\right.$$

"reserved"} with a −1.5 dB step size.

For $\{c_{l,i,m}, (i, m) \neq (i_l^*, m_l^*)\}$:

For each polarization, differential amplitudes p(i, m) of the coefficients calculated relative to the associated polarization-specific reference amplitude and quantized to 3 bits The alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}$$

with a −3 dB step size.

Each phase φ(i, m) is quantized to 16PSK (4-bit)

The NR rel-16 Type II codebook structure, utilizing both SD and FD compression is illustrated in FIG. 4. Further details of the NR rel-16 Type II codebook and associated CSI reporting can be found in 3GPP TS 38.214 V16.5.0 (Clause 5.2.2.2.5).

1.7.3 Structure, Configuration and Reporting of eType I PS Codebook

The enhanced Type II (eType II) Port Selection (PS) codebook was introduced in Rel-16, also known as rel-16 Type II port selection codebook, which is intended to be used for beamformed CSI-RS, where each CSI-RS port covers a small portion of the cell coverage area with high beamforming gain (comparing to non-beamformed CSI-RS). Although it is up to gNB implementation, it is usually assumed that each CSI-RS port is transmitted in a 2D spatial beam which has a main lobe with an azimuth pointing angle and an elevation pointing angle. The actual precoder matrix used for CSI-RS is transparent to UE. Based on the measurement, UE selects the best CSI-RS ports and recommends to gNB to use for downlink (DL) transmission. The eType II PS codebook can be used by UE to feedback the selected CSI-RS ports and the way to combine them.

For a given transmission layer l, with $l \in \{1, \ldots, v\}$ and v being the rank indicator (RI), the precoder matrix for all FD-units is given by a size $P_{CSI\text{-}RS} \times N_3$ matrix $W_l$, where $P_{CSI\text{-}RS}$ is the number of single-polarized CSI-RS ports.

$N_3 = N_{SB} \times R$ is the number of PMI subbands, where

The value R={1,2} (the PMI subband size indicator) is RRC configured.

$N_{SB}$ is the number of CQI subbands, which is also RRC configured.

The RI value v is set according to the configured higher layer parameter typeII-RI-Restriction-r16. UE shall not report v>4.

The precoder matrix $W_l$ can be factorized as $$W_l = W_1 \tilde{W}_{2,l} W_{f,l}^H$$

(see FIG. 5), and $W_l$ is normalized such that $\|W_l\|_F = 1/\sqrt{v}$, for l=1, . . . , v.

The codebook design for eType II PS codebook can be described as follows:

Port selection matrix $W_1$:$W_1$ is a size $P_{CSI\text{-}RS} \times 2L$ port selection precoder matrix that can be factorized into $$W_1 = W_{PS} \otimes \begin{bmatrix} 1 & 0 \\ 0 & 1 \end{bmatrix},$$

where $W_{PS}$ is a size $$\frac{P_{CSI\text{-}RS}}{2} \times L$$

port selection matrix consisting of 0s and 1s. Selected ports are indicated by is which are common for both polarizations.

L is the number of selected CSI-RS ports per polarization. Supported L values can be found in Table 1.

Selected CSI-RS ports are jointly determined by two parameters d and $i_{1,1}$. Starting from the $i_{1,1}$-th port, only every d-th port can be selected (note that port numbering is up to gNB to decide).

The value of d is configured with the higher layer parameter portSelectionSamplingSize, where $d \in \{1, 2, 3, 4\}$ and $$d < \min\left(\frac{P_{CSI\text{-}RS}}{2}, L\right).$$

The value of $i_{1,1}$, where $$i_{1,1} \in \left\{0, 1, \ldots, \left\lceil \frac{P_{CSI\text{-}RS}}{2d} \right\rceil - 1\right\},$$

is determined by UE based on CSI-RS measurement. UE shall feed back the chosen $i_{1,1}$ to gNB.

$W_1$ is common for all layers.

Frequency-domain compression matrix $W_{f,l}$: $W_{f,l}$ is a size $N_3 \times M_v$ FD-domain compression matrix for layer l, where $$M_v = \left\lceil p_v \frac{N_3}{R} \right\rceil$$

is the number of selected FD basis vectors, which depends on the rank indicator v and the RRC configured parameter $p_v$. Supported values of $p_v$ can be found in Table 1.

$W_{f,l} = [f_{0,l}\ f_{1,l}\ \ldots\ f_{M_v,l}]$, where $$\{f_{k,l}\}_{k=0}^{M_v-1}$$

are $M_v$ size $N_3\times1$ FD basis vectors that are selected from $N_3$ orthogonal DFT basis vectors $$\{y_t\}_{t=0}^{N_3-1}$$

with size $N_3\times1$.

For $N_3\le19$, a one-step free selection is used.

For each layer, FD basis selection is indicated with a $$\left\lceil \log_2\binom{N_3-1}{M_v-1}\right\rceil$$

bit combinatorial indicator. In TS 38.214, the combinatorial indicator is given by the index $i_{1,6,l}$ where l corresponds to the layer index. This combinatorial index is reported by UE to the gNB per layer per PMI.

For $N_3>19$, a two-step selection with layer-common intermediary subset (IntS) is used.

In this first step, a window-based layer-common IntS selection is used, which is parameterized by $M_{initial}$. The IntS consists of FD basis vectors $\mathrm{mod}(M_{initial}+n, N_3)$, where $$n = 0, 1, \ldots, N_3'-1$$

and $$N_3' = 2M_v.$$

the selected IntS is reported by the UE to the gNB via the parameter $i_{1,5}$, which is reported as part of the PMI.

The second step subset selection is indicated by an $$\left\lceil \log_2\binom{N_3'-1}{M_v-1}\right\rceil$$

bit combinatorial indicator for each layer in Part 2 of the CSI report. In TS 38.214, the combinatorial indicator is given by the index $i_{1,6,l}$ where l corresponds to the layer index. This combinatorial index is reported by UE to the gNB per layer per PMI.

$W_{f,l}$ is layer-specific.

Linear combination coefficient matrix $\tilde{W}_{2,l}$: $\tilde{W}_{2,l}$ is a size $2L\times M_v$ matrix that contains $2LM_v$ coefficients for linearly combining the selected $M_v$ FD basis vectors for the selected 2L CSI-RS ports.

For layer l, only a subset of $$K_l^{NZ} \le K_0$$

coefficients are non-zero and reported. The remaining $$2LM_v - K_l^{NZ}$$

non-reported coefficients are considered zero.

$K_0=\lceil\beta\times2LM_1\rceil$ is the maximum number of non-zero coefficients per layer, where β is a RRC configured parameter. Supported β values are shown in Table 1.

For $v\in\{2, 3, 4\}$, the total number of non-zero coefficients summed across all layers, $$K_{tot}^{NZ} = \sum_{l=1}^{v} K_l^{NZ}, \text{ shall satisfy } K_{tot}^{NZ} \le 2K_0.$$

Selected coefficient subset for each layer is indicated with $$K_l^{NZ}\ 1s$$

in a size $2LM_v$ bitmap, which is included in Part 2 of the CSI report.

Indication of $$K_{tot}^{NZ}, \text{ where } K_{tot}^{NZ} \in \{1, 2, \ldots, 2K_0\},$$

is included in Part of the CSI report, so that payload of Part 2 of the CSI report can be known.

The amplitude and phase of coefficients in $\tilde{W}_{2,l}$ shall be quantized for reporting.

$\tilde{W}_{2,l}$ is layer-specific.

TABLE 1

Rel-16 eType II PS codebook parameter configurations for L, $p_v$ and β

| paramCombination-r16 | L | $p_v$: v ∈ {1, 2} | $p_v$: v ∈ {3, 4} | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

Further details of the eType II PS codebook and associated CSI reporting can be found in 3GPP TS 38.214 V16.5.0 (Clause 5.2.2.2.6).

1.8 FDD-Based Reciprocity Operation and Rel-17 Type II Port Selection Codebook

In Frequency Division Duplex (FDD) operation, the uplink (UL) and DL transmissions are carried out on different frequencies, thus the propagation channels in UL and DL are not reciprocal as in the Time Division Duplex (TDD) case. Despite of this, some physical channel parameters, e.g., delays and angles to different clusters, which depend on the spatial properties of the channel but not the carrier frequency, are reciprocal between UL and DL. Such properties can be exploited to obtain partial reciprocity based FDD transmission. The reciprocal part of the channel can be combined with the non-reciprocal part in order to obtain the complete channel. An estimate of the non-reciprocal part can be obtained by feedback from the UE. In 3GPP RAN1, it has been agreed that in Rel-17, the Rel-16 Type II port selection codebook will be enhanced to support the above-mentioned FDD-based reciprocity operation. It has been agreed in 3GPP RAN1 #104e that the Rel-17 Type II port selection codebook will adopt the same codebook structure as the Rel-16 Type II port selection codebook, i.e., the codebook consists of $W_1$, $W_2$, and $W_f$. Discussion regarding the details of the codebook component, such as dimension of each matrix, is still ongoing.

1.8.1 Procedure for FDD-Based Reciprocity Operation

One example procedure for reciprocity based FDD transmission scheme is illustrated in FIG. 6 in 4 steps, assuming that NR Rel.16 enhanced Type II port-selection codebook is used.

In Step 1, the UE is configured with SRS by the gNB and the UE transmits SRS in the UL for the gNB to estimate the angles and delays of different clusters, which are associated with different propagation paths.

In Step 2, in gNB implementation algorithm, the gNB selects dominant clusters according to the estimated angle-delay power spectrum profile, based on which a set of Spatial-Domain and Frequency-Domain (SD-FD) basis pairs are computed by gNB for CSI-RS beamforming. Each SD-FD pair corresponds to a CSI-RS port with certain delay being pre-compensated. Each CSI-RS port resource can contain one or multiple SD-FD basis pairs by applying different delays on different resource elements of the resource. gNB precodes all the CSI-RS ports in a configured CSI-RS resource or multiple CSI-RS resources to the UE, with each configured CSI-RS resource containing the same number of SD-FD basis pairs.

In Step 3, gNB has configured the UE to measure CSI-RS, and the UE measures the received CSI-RS ports and then determines a type II CSI including RI, PMI for each layer and CQI. The precoding matrix indicated by the PMI includes the selected SD-FD basis pairs/precoded CSI-RS ports, and the corresponding best phase and amplitude for co-phasing the selected pairs/ports. The phase and amplitude for each pair/port are quantized and fed back to the gNB.

In Step 4, the gNB implementation algorithm computes the DL precoding matrix per layer based on the selected beams and the corresponding amplitude and phase feedback and performs Physical Downlink Shared Channel (PDSCH) transmission. The transmission is based on the feed-back (PMI) precoding matrices directly (e.g., Single User MIMO, SU-MIMO transmission) or the transmission precoding matrix is obtained from an algorithm combining CSI feed-back from multiple UEs (MU-MIMO transmission). In this case, a precoder derived based on the precoding matrices (including the CSI reports from co-scheduled UEs) (e.g., Zero-Forcing precoder or regularized ZF precoder). The final precoder is commonly scaled so that the transmit power per power amplifier is not overridden.

Such reciprocity-based transmission can potentially be utilized in a codebook-based DL transmission for FDD in order to, for example, reduce the feedback overhead in UL when NR Type II port-selection codebook is used. Another potential benefit is reduced complexity in the CSI calculation in the UE.

Note that FIG. 6 only sketches one example of the procedure for FDD-based reciprocity operation, where each CSI-RS port contains a single pair of SD-FD basis and UE performs wideband averaging of the channel to obtain the corresponding coefficients. It is possible that each CSI-RS port contains multiple pairs of SD-FD basis and that UE can compress the channel with more FD components besides the DC DFT component.

1.8.2 Type II Port Selection Codebook for FDD Operation Based on Angle and Delay Reciprocity If the Rel.16 enhanced Type II port-selection codebook is used for FDD operation based on angle and/or delay reciprocity, the frequency-domain (FD) basis $W_f$ still needs to be determined by the UE. Therefore, in the CSI report, the feedback overhead for indicating which FD basis vectors are selected can be large, especially when $N_3$, the number of PMI subbands, is large. Also, the computational complexity at UE for evaluating and selecting the best FD basis vectors also increases as $N_3$ increases. In addition, the channel seen at the UE is frequency-selective, which requires a number of FD basis vectors to compress in the PMI report. Reporting coefficients to these FD basis vectors also consumes a large amount of UL overhead.

Based on the angle and delay reciprocity, as mentioned in the previous section, gNB can determine a set of dominant clusters in the propagation channel by analyzing the angle-delay power spectrum of the UL channel. Then, gNB can utilize this information in a way such that each CSI-RS port is precoded towards a dominant cluster. In addition to SD beamforming, each of the CSI-RS ports will also be pre-compensated in time such that all the precoded CSI-RS ports are aligned in delay domain. As a result, frequency-selectivity of the channel is removed and the UE observes a frequency-flat channel, which requires very small number of FD basis to compress. Ideally, if all the beams can be perfectly aligned in time, UE only needs to do a wideband filtering to obtain all the channel information, based on which UE can calculate the Rel-17 Type II PMI. Even if delay cannot be perfectly pre-compensated at gNB in reality, the frequency selectively seen at the UE can still be greatly reduced, so that UE only requires a much smaller number of FD basis vectors, i.e., the number of basis vectors in $W_f$, to compress the channel.

The above procedure is further explained in FIG. 7 in an example. Based on UL measurement, gNB identifies 8 dominant clusters that exist in the original channel, tagged as A-G, which are distributed in 4 directions, with each direction containing one or multiple taps. In this example, 8 CSI-RS ports are precoded at gNB. Each CSI-RS port is precoded towards a dominant direction with pre-compensated delay for a given cluster. The delay pre-compensation can be realized in different ways, for instance by applying a linear phase slope across occupied subcarriers. As a result, in the beamformed channel, which is seen at UE, all the dominant clusters are aligned at the same delay, hence the UE only needs to apply a wideband filter (e.g., applying the DC component of a DFT matrix (i.e., $W_f$ containing a single all one vector over frequency domain channel) to compress the channel and preserve all the channel information. Based on the compressed channel, the UE calculates $W_1$ (selected CSI-RS ports) and $W_2$ (complex coefficients for combining selected ports), which are the remaining part of the Type II port selection codebook.

Although the discussion on Rel-17 Type II codebook is still ongoing, the Rel-16 Type II codebook structure has been confirmed to be reused for Rel-17, i.e., the Rel-17 also comprises of $W_1$, $W_2$ and $W_f$. One potential difference comparing to the Rel-16 Type II, which is to be discussed in 3GPP as of writing this disclosure, is that $W_f$ might be layer-common. The structure of $W_1$, $W_2$ will remain the same as in Rel-16 Type II.

1.9 Coherent Joint Transmission Over Multiple TRPs

Recently, coherent joint transmission (CJT) from multiple TRPs has been proposed in 3GPP as a potential enhancement for NR Rel-18 (see RWS-210437, 'NR enhancements for DL MIMO,' Huawei, HiSilicon, 3GPP TSG RAN Meeting #92-e, Electronic Meeting, Jun. 28-Jul. 2, 2021 and RWS-210181, 'On Rel-18 NR MIMO enhancements for 5G Advanced,' Samsung, 3GPP TSG RAN Meeting #92-e, Electronic Meeting, Jun. 28-Jul. 2, 2021). The motivation for this proposal is to exploit CJT from multiple TRPs for MU-MIMO scheduling with null forming between co-scheduled users.

1.10 TCI State

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, the TCI state may indicate a QCL relation between a CSI-RS for tracking RS (TRS) and the PDSCH DMRS. When UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that use analog beamforming to receive signals, since the UE need to adjust its RX beam in some direction prior to receiving a certain signal. If the UE knows that the signal is spatially QCL with some other signal it has received earlier, then it can safely use the same RX beam to receive also this signal. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for tracking (TRS) for time/frequency offset estimation. To be able to use any QCL reference, the UE would have to receive it with a sufficiently good SINR. In many cases, this means that the TRS has to be transmitted in a suitable beam to a certain UE.

To introduce dynamics in beam and transmission point (TRP) selection, the UE can be configured through RRC signaling with M TCT states, where M is up to 128 in frequency range 2 (FR2) for the purpose of PDSCH reception and up to 8 in FR1, depending on UE capability.

Each TCI state contains QCL information, i.e. one or two source DL RSs, each source RS associated with a QCL type. For example, a TCI state contains a pair of reference signals, each associated with a QCL type, e-g—two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

Each of the M states in the list of TCI states can be interpreted as a list of M possible beams transmitted from the network or a list of M possible TRPs used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight active TCI states for PDSCH. The number of active TCI states the UE support is a UE capability, but the maximum is 8.

Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with 4 active TCI states (from a list of totally 64 configured TCI states). Hence, 60 TCI states are inactive for this particular UE (but some may be active for another UE) and the UE need not be prepared to have large scale parameters estimated for those. But the UE continuously tracks and updates the large scale parameters for the 4 active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

1.10.1 UL TCI States

The existing way of using spatial relation for UL beam indication in NR is cumbersome and inflexible. To facilitate UL beam selection for UEs equipped with multiple panels, a unified TCI framework for UL fast panel selection is to be evaluated and introduced in NR Rel-17. Similar to DL, where TCI states are used to indicate DL beams/TRPs, TCI states may also be used to select UL panels and beams used for UL transmissions (i.e., PUSCH, PUCCH, and SRS).

It is envisioned that UL TCI states are configured by higher layers (i.e., RRC) for a UE in number of possible ways. In one scenario, UL TCI states are configured separately from the DL TCI states and each uplink TCI state may contain a DL RS (e.g., NZP CSI-RS or SSB) or an UL RS (e.g., SRS) to indicate a spatial relation. The UL TCI states can be configured either per UL channel/signal or per BWP such that the same UL TCI states can be used for PUSCH, PUCCH, and SRS. Alternatively, a same list of TCI states may be used for both DL and UL, hence a UE is configured with a single list of TCI states for both UL and DL beam indication. The single list of TCI states in this case can be configured either per UL channel/signal or per BWP information elements. When a TCI state is used for both DL and UL, this TCI state may be referred to as joint TCI state or unified TCI state.

1.11 Type II CSI Report on PUSCH

A UE shall perform aperiodic CSI reporting using PUSCH upon successful decoding of a DCI format 0_1 or DCI format 0_2 which triggers an aperiodic CSI trigger state.

When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH.

A UE shall perform semi-persistent CSI reporting on the PUSCH upon successful decoding of a DCI format 0_1 or DCI format 0_2 which activates a semi-persistent CSI trigger state. DCI format 0_1 and DCI format 0_2 contains a CSI request field which indicates the semi-persistent CSI trigger state to activate or deactivate. The PUSCH resources and MCS shall be allocated semi-persistently by an uplink DCI.

CSI reporting on PUSCH can be multiplexed with uplink data on PUSCH. CSI reporting on PUSCH can also be performed without any multiplexing with uplink data from the UE.

1.11.1 Part 1 and Part 2 for Type II CSI Report

For the Rel-15 Type II and the Rel-16 Type II (aka Enhanced Type II) CSI feedback on PUSCH, a CSI report comprises of two parts: Part 1 and Part 2. A main motivation for dividing a CSI report into Part 1 and Part 2 is to deal with the dynamically varying CSI payload. For example, based on the time-varying channel, UE may report different ranks over the whole period of connection, which has significant impact on the actual required CSI payload size. In order for the gNB to know the actual payload size, Part 1, which has a fixed payload size that carries the information to calculate the payload size of Part 2, will be decoded first by gNB.

- For the Rel-15 Type II CSI feedback, Part 1 contains RI (if reported), CQI, and an indication of the number of non-zero wideband amplitude coefficients per layer for the Type II CSI (see Clause 5.2.2.2.3 in 3GPP TS 38.214). The fields of Part 1—RI (if reported), CQI, and the indication of the number of non-zero wideband amplitude coefficients for each layer—are separately encoded. Part 2 contains the PMI of the Type II CSI. Part 1 and 2 are separately encoded.
- For the Rel-16 Type II CSI feedback, Part 1 contains RI, CQI, and an indication of the overall number of non-zero amplitude coefficients across layers for the Rel-16 Type II CSI (see Clause 5.2.2.2.5 in 3GPP TS 38.214). The fields of Part 1—RI, CQI, and the indication of the overall number of non-zero amplitude coefficients across layers—are separately encoded. Part 2 contains the PMI of the Enhanced Type II CSI. Part 1 and 2 are separately encoded.

1.11.2 CSI Omission

Sometimes, it may happen that the allocated PUSCH resource for carrying the CSI report does not fit the entire CSI report content. For such cases, a CSI omission procedure has been specified in 3GPP, where a portion of the Part 2 CSI omitted if the resulting UCI code rate is too low. This is achieved by segmenting the Part 2 CSI into different priority levels, and dropping CSI segment starting with the lowest priority level until the UCI code rate falls below a threshold (whereby the CSI payload will "fit" on the PUSCH allocation). The priority levels are described in Table 2, where Priority 0 has the highest priority and $N_{Rep}$ represents the number of CSI reports configured to be carried by PUSCH. The motivation behind this design is that the reported remaining PMI can still be used by the gNB.

TABLE 2

| Priority reporting levels for Part 2 CSI |
|---|
| Priority 0:<br>For CSI reports 1 to $N_{Rep}$, Group 0 CSI for CSI reports configured as 'typeII-r16' or 'typeII-PortSelection-r16'; Part 2 wideband CSI for CSI reports configured otherwise |
| Priority 1:<br>Group 1 CSI for CSI report 1, if configured as 'typeII-r16' or 'typeII-PortSelection-r16'; Part 2 subband CSI of even subbands for CSI report 1, if configured otherwise |
| Priority 2:<br>Group 2 CSI for CSI report 1, if configured as 'typeII-r16' or 'typeII-PortSelection-r16'; Part 2 subband CSI of odd subbands for CSI report 1, if configured otherwise |
| Priority 3:<br>Group 1 CSI for CSI report 2, if configured as 'typeII-r16' or 'typeII-PortSelection-r16'; Part 2 subband CSI of even subbands for CSI report 2, if configured otherwise |
| Priority 4:<br>Group 2 CSI for CSI report 2, if configured as 'typeII-r16' or 'typeII-PortSelection-r16'. Part 2 subband CSI of odd subbands for CSI report 2, if configured otherwise |
| .<br>.<br>. |
| Priority $2N_{Rep}-1$:<br>Group 1 CSI for CSI report $N_{Rep}$, if configured as 'typeII-r16' or 'typeII-PortSelection-r16'; Part 2 subband CSI of even subbands for CSI report $N_{Rep}$, if configured otherwise |
| Priority $2N_{Rep}$:<br>Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise |

CSI omission is only performed on the Part 2 CSI, since if the components of the Part 1 CSI was omitted, the gNB would not have enough information to decode the Part 2 CSI.

SUMMARY

Systems and methods related to frequency domain Channel State Information (CSI) compression for coherent joint transmission are disclosed. In one embodiment, a method performed by a user equipment (UE) comprises receiving, from a network node, information for a CSI reporting configuration that configures the UE with: (a) a plurality of Non-Zero Power (NZP) Channel State Information Reference Signal (CSI-RS) resources for channel measurement, where each of the multiple NZP CSI-RS resources is associated with a different Transmission Configuration Indicator (TCI) state or unified TCI state, (b) a single NZP CSI-RS resource for channel measurement, wherein the single NZP CSI-RS resource comprising a plurality of sets of CSI-RS ports wherein each set of CSI-RS ports within the single NZP CSI-RS resource is associated with a different TCI state or unified TCI state, or (c) both (a) and (b). The information for the CSI reporting configuration further configures the UE with: (d) a parameter combination indicating at least a total number of frequency domain (FD) basis vectors to be selected and reported per layer across the plurality of NZP CSI-RS resources or the plurality of sets of CSI-RS ports or (e) a parameter combination indicating at least a number of frequency domain, FD, basis vectors to be selected and reported per layer for each of the plurality of NZP CSI-RS resources or each of the plurality of sets of CSI-RS ports, and a number of precoding matrix indicator (PMI) subbands. The method further comprises performing channel measurements on: (i) the plurality of NZP CSI-RS resources according to the associated TCI states or unified TCI states, (ii) the single NZP CSI-RS resource wherein the plurality of sets of CSI-RS ports in the single NZP CSI-RS resource are measured according to the associated TCI states or unified TCI states, or (iii) both (i) and (ii). The method further comprises computing CSI based on the channel measurements, including selecting FD basis vectors based on the channel measurements and the parameter combination, the CSI comprising: (A) for each of the plurality of CSI-RS resources or each of the plurality of sets of CSI-RS ports, information about a first subset of FD basis vectors selected from a first set of FD basis vectors for each layer, (B) for each layer, information about a single second subset of FD basis vectors selected from a second set of FD basis vectors for the plurality of CSI-RS resources or all of the plurality of sets of CSI-RS ports, or (C) both A and B. The method further comprises reporting the computed CSI.

In one embodiment, the CSI further comprises either or both of: information about the first set of FD basis vectors and information about of the second set of FD basis vectors.

In one embodiment, the first subset of FD basis vectors for each of the plurality of CSI-RS resources or each of the plurality of sets of CSI-RS ports contains a same number of frequency domain basis vectors.

In one embodiment, the first subset of FD basis vectors contains different numbers of frequency domain basis vectors for at least some of the plurality of NZP CSI-RS resources or at least some of the plurality of sets of CSI-RS ports.

In one embodiment, the first set of FD basis vectors for each layer is common for all of the plurality of NZP CSI-RS resources or all of the plurality of sets of CSI-RS ports.

In one embodiment, the first set of FD basis vectors for each layer can be different for some of the plurality of NZP CSI-RS resources or some of the plurality of sets of CSI-RS ports. In one embodiment, the first set of FD basis vectors for each layer contains a same number of frequency domain basis vectors for all of the plurality of NZP CSI-RS resources or all of the plurality of sets of CSI-RS ports.

In one embodiment, each of the first set and the second set of FD basis vectors comprises a subset of consecutive orthogonal Discrete Fourier Transform (DFT) basis vectors arranged in a cyclic order, wherein the information for the first set of FD basis vectors comprising an index that identifies the starting orthogonal DFT basis vector among the subset of consecutive orthogonal DFT basis vectors. In one embodiment, the index that identifies the starting orthogonal DFT basis vector is only reported in the CSI when the number of precoding matrix indicator (PMI) subbands for the CSI is larger than a predefined value.

In one embodiment, the number of consecutive orthogonal frequency domain basis vectors for each layer is an integer multiple of the number of the first subset of FD basis vectors. In one embodiment, the index is layer common.

In one embodiment, the CSI comprises the S indices that identify the starting points of the S>1 windows wherein orthogonal frequency domain basis vectors corresponding to the sth NZP CSI-RS channel measurement resource or sth set of CSI-RS ports are selected from the sth window.

In one embodiment, the information for the first set and the second set of FD basis vectors are only reported when the number of PMI subbands for the CSI is larger than a predefined value.

In one embodiment, the information about each of the first subset and the second subset of FD basis vectors comprises a combinatorial index where the combinatorial index is used to indicate the subset of FD basis vectors from the corresponding set of FD basis vectors. In one embodiment, the frequency domain basis vectors for the S NZP CSI-RS channels or S sets of CSI-RS ports are selected from a single window or S>1 windows when a number of precoding matrix indicator, PMI, subbands for the CSI is larger than a predefined value.

In one embodiment, when the number of PMI subbands for the CSI is less than a predefined threshold, the first set and the second set of FD basis vectors are the same and comprise a number of orthogonal DFT basis vectors each having a vector length equal to the number of PMI subbands, the number of orthogonal DFT basis vectors equals to the number of PMI subbands.

In one embodiment, the first subset of frequency domain basis vectors are phase rotated such that a zero-th frequency domain basis vector containing all 1's is always selected, wherein the amount of phase rotation is reported.

In one embodiment, only a subset of the plurality of CSI-RS resources or the plurality of sets of CSI-RS ports may selected for the CSI, and when a CSI-RS resource or a set of CSI-RS ports is not selected, the associated first subset of FD basis vectors does not contain any FD basis vectors and may not be reported.

In one embodiment, information about the first subset of FD basis vectors and/or the first set of FD basis vectors associated with a NZP CSI-RS resource or a set of CSI-RS ports further comprises an identifier explicitly identifying the NZP CSI-RS resource or the set of CSI-RS ports.

In one embodiment, the plurality of CSI-RS resources or the plurality of sets of CSI-RS ports are ordered according to some criteria and the first subset of FD basis vectors or the first set of FD basis vectors for a NZP CSI-RS resource or a set of CSI-RS ports is implicitly identified according to its order reported in the CSI.

In one embodiment, a total number of the first subset of FD basis vectors across all of the plurality of CSI-RS resources or the plurality of sets of CSI-RS ports is greater than the configured total number of FD basis vectors to be selected.

Corresponding embodiments of a UE are also disclosed. In one embodiment, a UE comprise one or more transmitters, one or more receivers, and processing circuitry associated with the one or more transmitters and the one or more receivers. The processing circuitry is configured to cause the UE to receive, from a network node, information for a CSI reporting configuration that configures the UE with: (a) a plurality of NZP CSI-RS resources for channel measurement, where each of the multiple NZP CSI-RS resources is associated with a different TCI state or unified TCI state, (b) a single NZP CSI-RS resource for channel measurement, wherein the single NZP CSI-RS resource comprising a plurality of sets of CSI-RS ports wherein each set of CSI-RS ports within the single NZP CSI-RS resource is associated with a different TCI state or unified TCI state, or (c) both (a) and (b). The information for the CSI reporting configuration further configures the UE with: (d) a parameter combination indicating at least a total number of frequency domain (FD) basis vectors to be selected and reported per layer across the plurality of NZP CSI-RS resources or the plurality of sets of CSI-RS ports or (e) a parameter combination indicating at least a number of frequency domain, FD, basis vectors to be selected and reported per layer for each of the plurality of NZP CSI-RS resources or each of the plurality of sets of CSI-RS ports, and a number of PMI subbands. The processing circuitry is further configured to cause the UE to perform channel measurements on: (i) the plurality of NZP CSI-RS resources according to the associated TCI states or unified TCI states, (ii) the single NZP CSI-RS resource wherein the plurality of sets of CSI-RS ports in the single NZP CSI-RS resource are measured according to the associated TCI states or unified TCI states, or (iii) both (i) and (ii). The processing circuitry is further configured to cause the UE to compute CSI based on the channel measurements, including selecting FD basis vectors based on the channel measurements and the parameter combination, the CSI comprising: (A) for each of the plurality of CSI-RS resources or each of the plurality of sets of CSI-RS ports, information about a first subset of FD basis vectors selected from a first set of FD basis vectors for each layer, (B) for each layer, information about a single second subset of FD basis vectors selected from a second set of FD basis vectors for the plurality of CSI-RS resources or all of the plurality of sets of CSI-RS ports, or (C) both A and B. The processing circuitry is further configured to cause the UE to report the computed CSI.

Embodiments of a method performed by a network node are also disclosed. In one embodiment, a method performed by a network node comprises, sending, to a UE, information for a CSI reporting configuration that configures the UE with: (a) a plurality of NZP CSI-RS resources for channel measurement, where each of the multiple NZP CSI-RS resources is associated with a different TCI state or unified TCI state, (b) a single NZP CSI-RS resource for channel measurement, wherein the single NZP CSI-RS resource comprising a plurality of sets of CSI-RS ports wherein each set of CSI-RS ports within the single NZP CSI-RS resource is associated with a different TCI state or unified TCI state, or (c) both (a) and (b). The information for the CSI reporting configuration further configures the UE with: (d) a parameter combination indicating at least a total number of frequency domain (FD) basis vectors to be selected and reported per layer across the plurality of NZP CSI-RS resources or the plurality of sets of CSI-RS ports or (e) a parameter combination indicating at least a number of frequency domain, FD, basis vectors to be selected and reported per layer for each of the plurality of NZP CSI-RS resources or each of the plurality of sets of CSI-RS ports, and a number of PMI subbands. The method further comprises receiving, from the UE, a report comprising CSI, wherein the CSI comprises: (A) for each of the plurality of CSI-RS resources or each of the plurality of sets of CSI-RS ports, information about a first subset of FD basis vectors selected from a first set of FD basis vectors for each layer, (B) for each layer, information about a single second subset of FD basis vectors selected from a second set of FD basis vectors for the plurality of CSI-RS resources or all of the plurality of sets of CSI-RS ports, or (C) both (A) and (B).

Corresponding embodiments of a network node are also disclosed. In one embodiment, a network node comprises processing circuitry configured to cause the network node to send, to a UE, information for a CSI reporting configuration that configures the UE with: (a) a plurality of NZP CSI-RS resources for channel measurement, where each of the multiple NZP CSI-RS resources is associated with a different TCI state or unified TCI state, (b) a single NZP CSI-RS resource for channel measurement, wherein the single NZP CSI-RS resource comprising a plurality of sets of CSI-RS ports wherein each set of CSI-RS ports within the single NZP CSI-RS resource is associated with a different TCI state or unified TCI state, or (c) both (a) and (b). The information for the CSI reporting configuration further configures the UE with: (d) a parameter combination indicating at least a total number of frequency domain (FD) basis vectors to be selected and reported per layer across the plurality of NZP CSI-RS resources or the plurality of sets of CSI-RS ports or (e) a parameter combination indicating at least a number of frequency domain, FD, basis vectors to be selected and reported per layer for each of the plurality of NZP CSI-RS resources or each of the plurality of sets of CSI-RS ports, and a number of PMI subbands. The processing circuitry is further configured to cause the network node to receive, from the UE, a report comprising CSI, wherein the CSI comprises: (A) for each of the plurality of CSI-RS resources or each of the plurality of sets of CSI-RS ports, information about a first subset of FD basis vectors selected from a first set of FD basis vectors for each layer, (B) for each layer, information about a single second subset of FD basis vectors selected from a second set of FD basis vectors for the plurality of CSI-RS resources or all of the plurality of sets of CSI-RS ports, or (C) both (A) and (B).

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
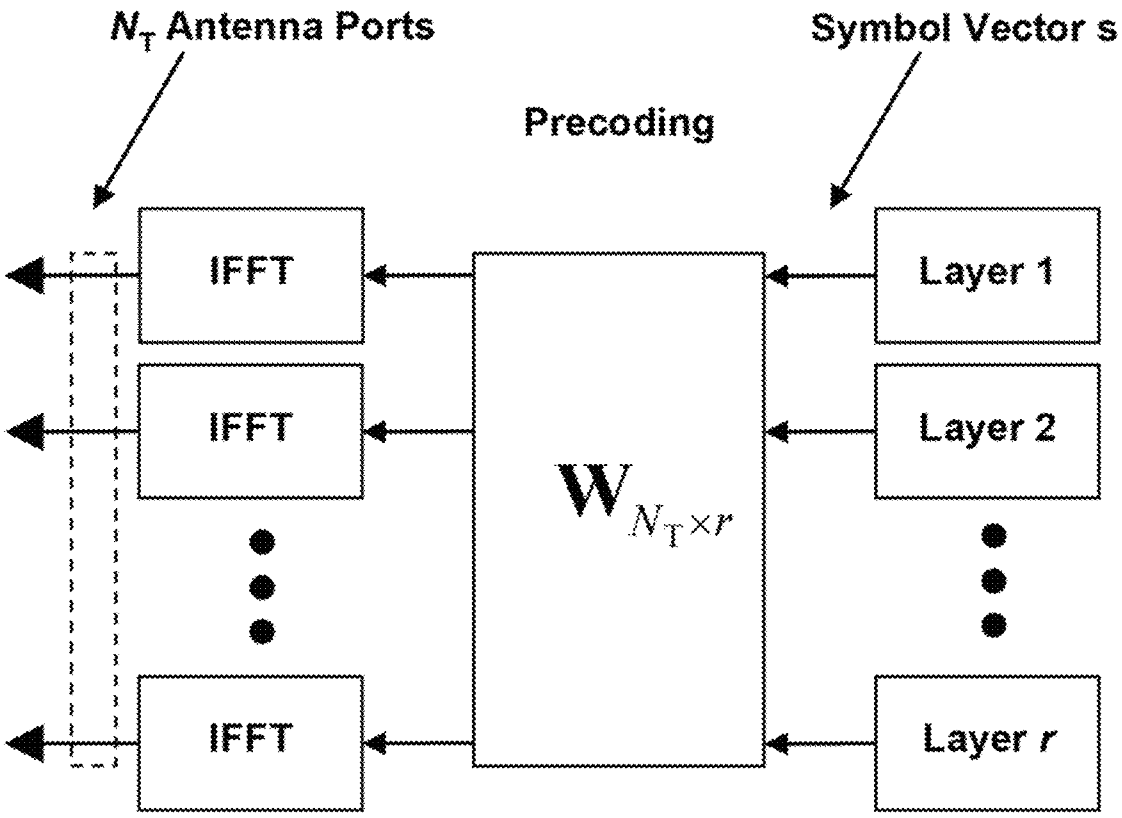
FIG. 1 Prior Art
FIG. 1 is an illustration of the spatial multiplexing operation.
Figure 2:
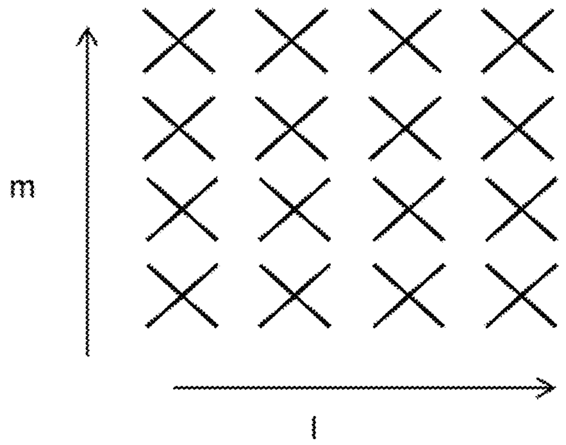
FIG. 2 Prior Art
FIG. 2 illustrates an example of a 4×4 array with dual-polarized antenna elements.
Figure 3:
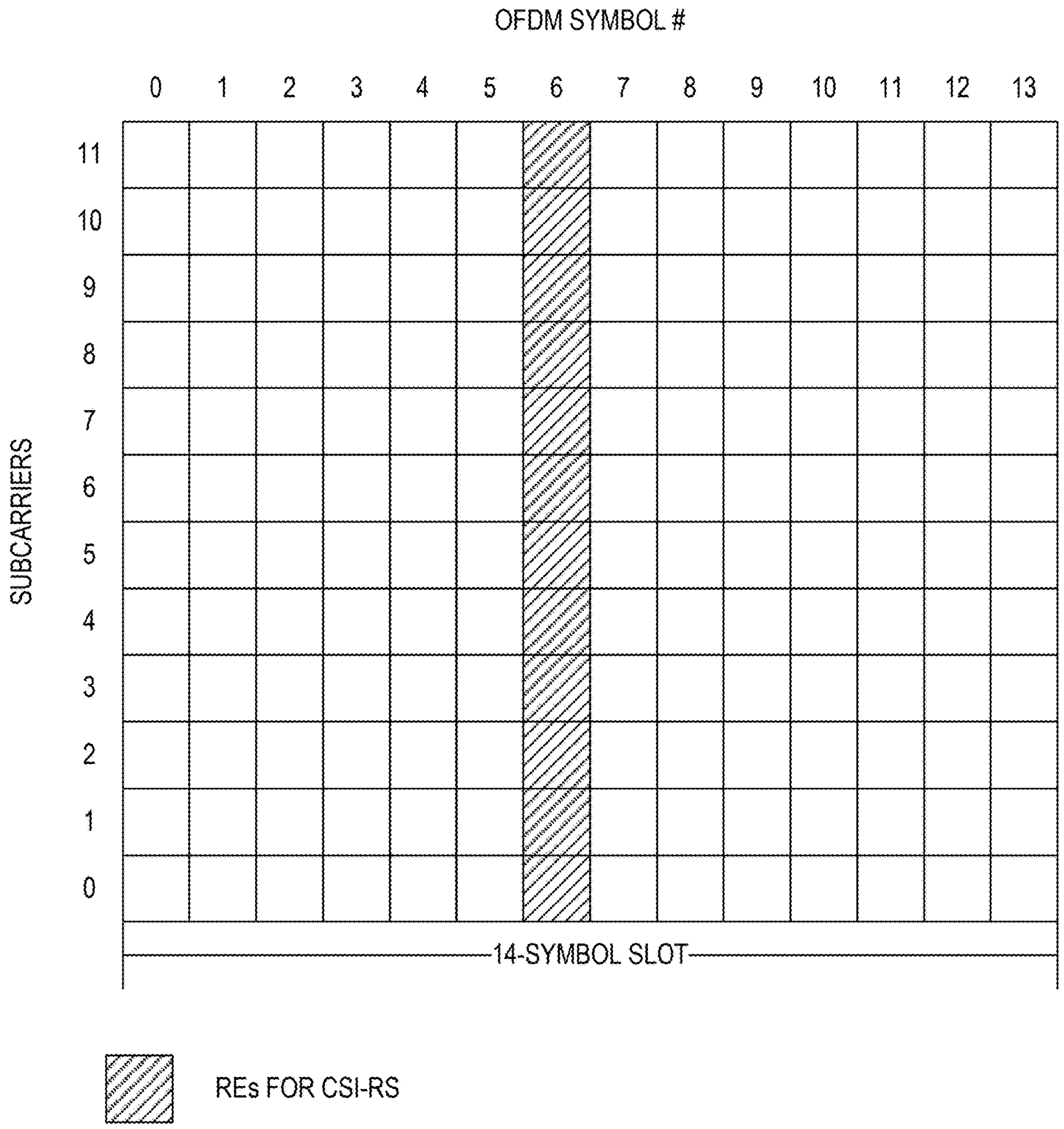
FIG. 3 Prior Art
FIG. 3 shows an example of Channel State Information Reference Signal (CSI-RS) Resource Elements (REs) for twelve antenna ports, where one Resource Element (RE) per Resource Block (RB) per port is shown.
Figure 4:
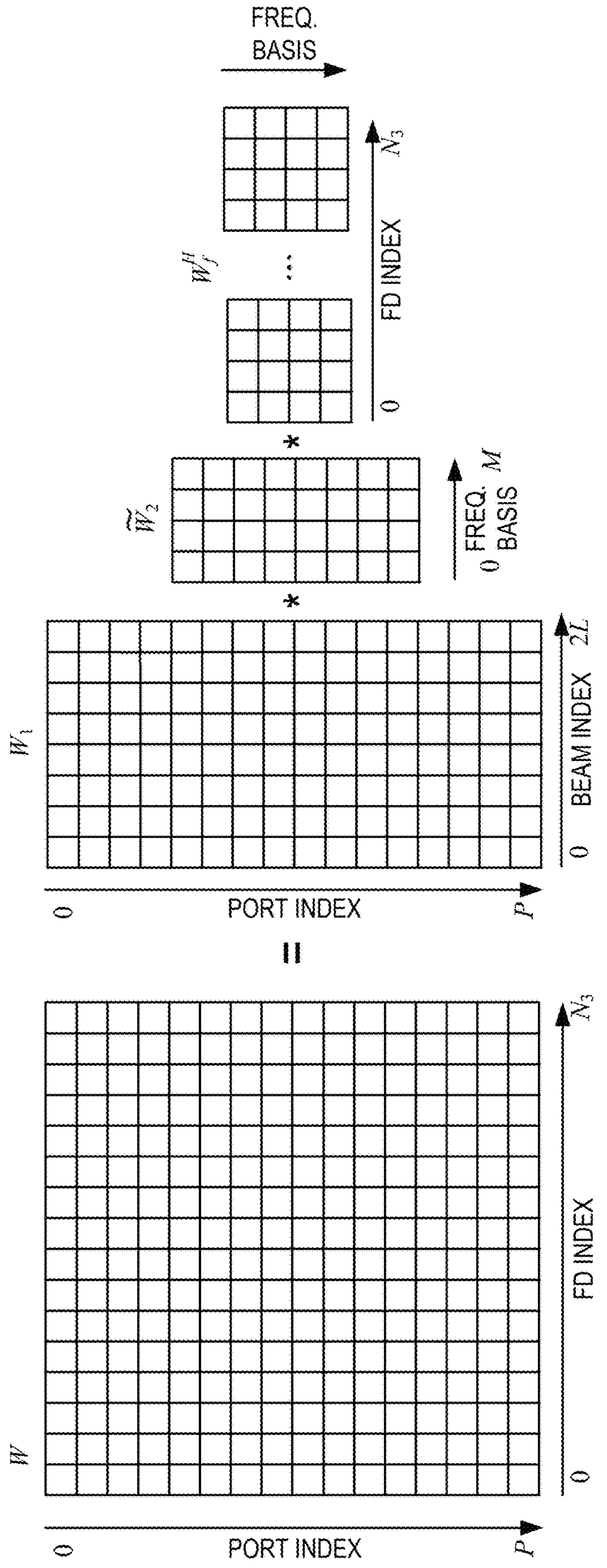
Prior Art FIG. 4
FIG. 4 illustrates the 3rd Generation Partnership Project (3GPP) New Radio (NR) Rel-16 Type II codebook structure, utilizing both Spatial Domain (SD) and Frequency Domain (FD) compression.
Figure 5:
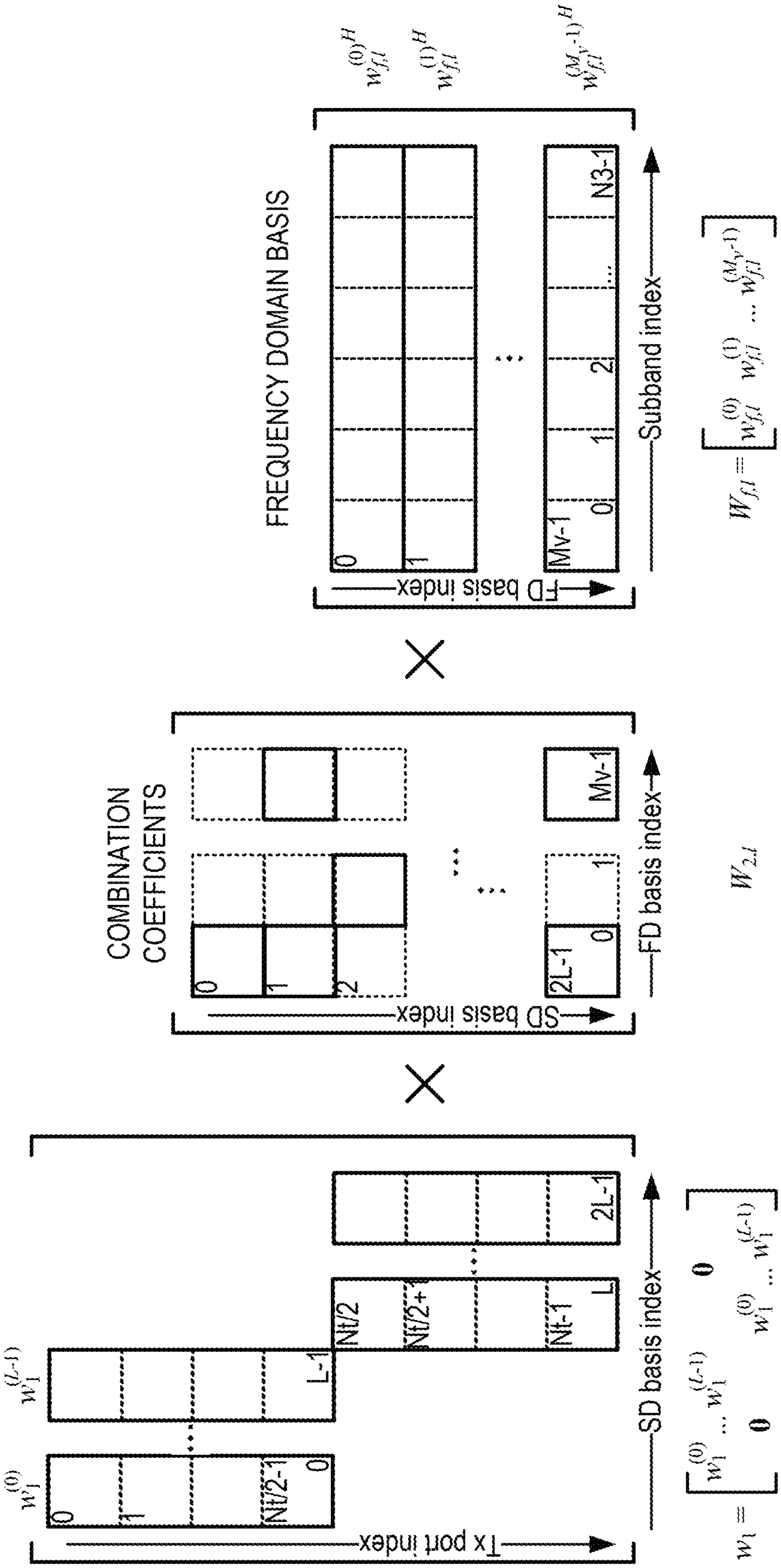
Prior Art FIG. 5
FIG. 5 illustrates how precoder matrix $W_l$ can be factorized as $$W_l = W_1 \tilde{W}_{2,l} W_{f,l}^H;$$
Figure 6:
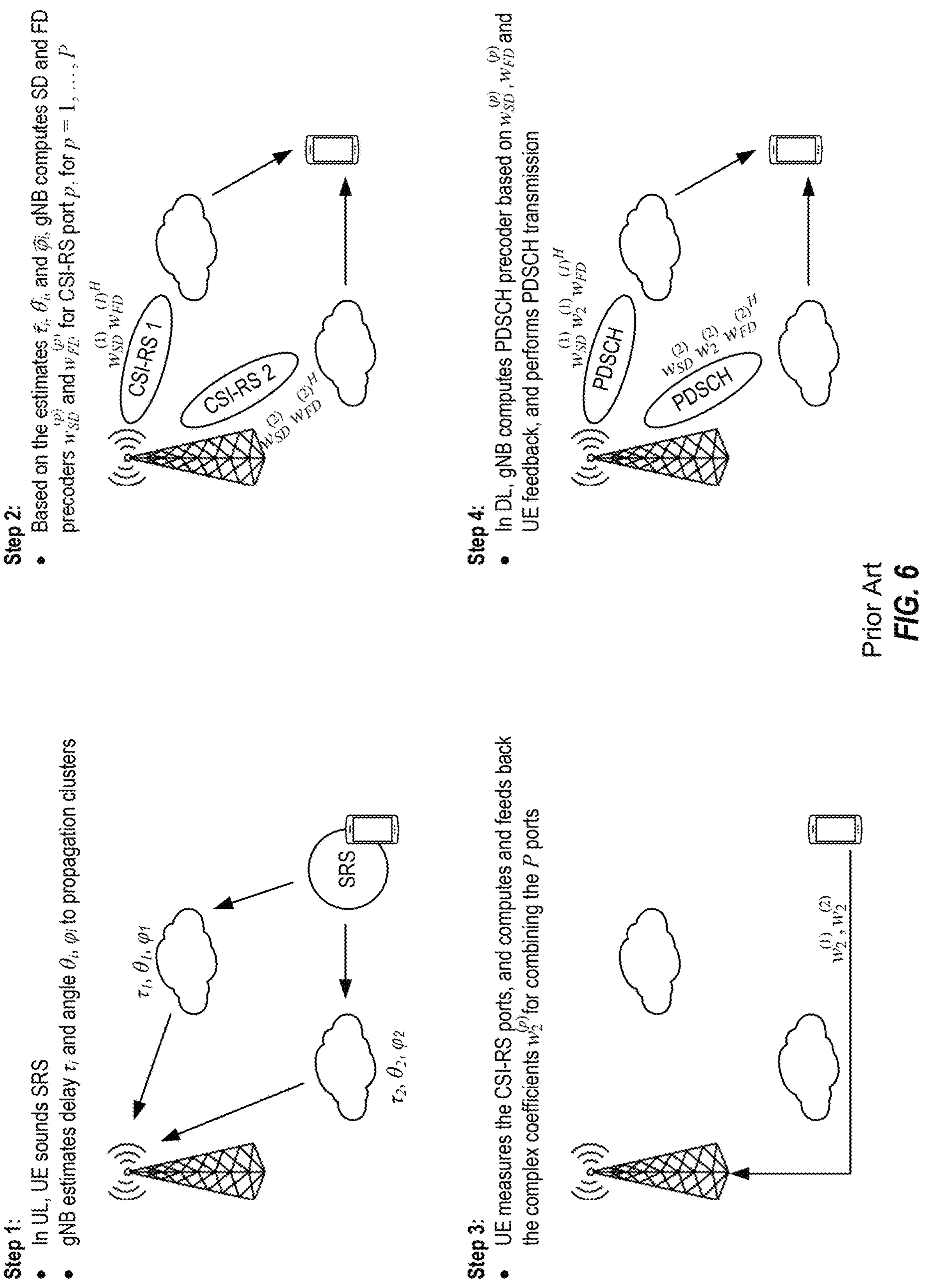
Prior Art FIG. 6
FIG. 6 illustrates one example procedure for reciprocity based Frequency Division Duplexing (FDD) transmission.
Figure 7:
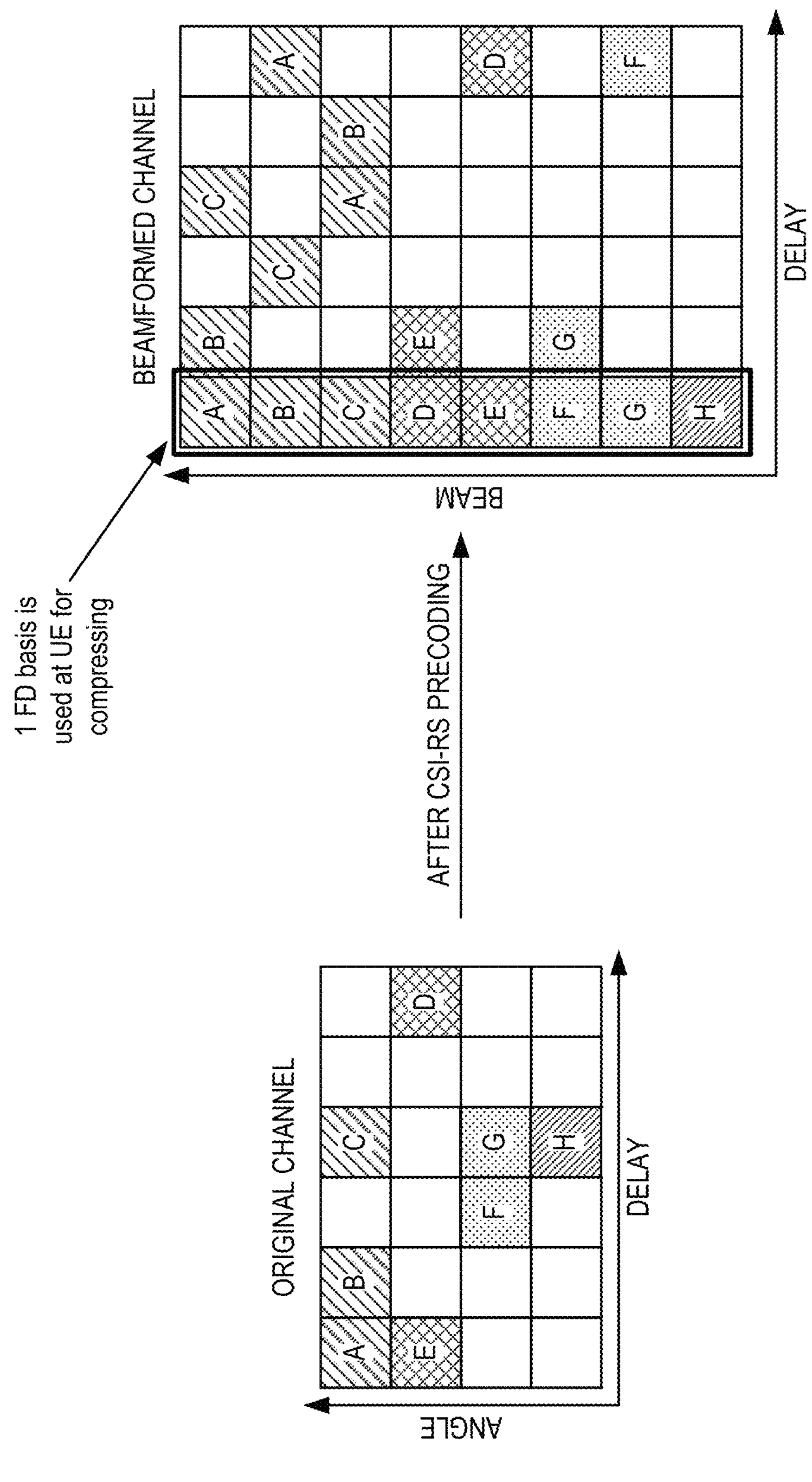
Prior Art FIG. 7
FIG. 7 illustrates an example of a procedure in which a NR base station (gNB) precodes each CSI-RS port towards a dominant cluster.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the term TRP may not be captured in 3GPP specifications. Instead, a TRP may be represented by a TCI state, a Non-Zero Power (NZP) Channel State Information Reference Signal (CSI-RS) resource, or a subset of ports within an NZP CSI-RS resource.

Note that the description given herein focuses on a 3GPP cellular communications system and, as such, 3GPP terminology or terminology similar to 3GPP terminology is oftentimes used. However, the concepts disclosed herein are not limited to a 3GPP system.

There currently exist certain challenge(s). Although Type II Channel State Information (CSI) enhancements for Coherent Joint Transmission (CJT) from multiple TRPs is described on high level in RWS-210437, 'NR enhancements for DL MIMO,' Huawei, HiSilicon, 3GPP TSG RAN Meeting #92-e, Electronic Meeting, Jun. 28-Jul. 2, 2021 and RWS-210181, 'On Rel-18 NR MIMO enhancements for 5G Advanced,' Samsung, 3GPP TSG RAN Meeting #92-e, Electronic Meeting, Jun. 28-Jul. 2, 2021), several details on how to perform CSI reporting for Type II CSI from the UE to the gNB for the case with coherent transmission from multiple TRPs have not been discussed in RWS-210437 and RWS-210181. Particularly, how to compute and report frequency domain Type II CSI parameters related to selection of frequency domain basis vectors for the case with coherent transmission from multiple TRPs is an open problem that needs to be solved.

Certain aspects of the disclosure and their embodiments may provide solutions to these or other challenges. Embodiments of a method for type-II CSI feedback for downlink (DL) CJT across multiple TRPs in which each Multiple Input Multiple Output (MIMO) layer is transmitted over the multiple TRPs are disclosed. In one embodiment, the method comprises one or more of the following steps:

- A UE receives, from a network node, information that configures the UE with multiple CSI-RS resources, one per TRP, or multiple CSI-RS port groups, one per TRP, in a single CSI-RS resource;
- At the UE, for each MIMO layer,
  - the UE selects a number of Spatial Doman (SD) precoding vectors from a set of spatial orthogonal Discrete Fourier Transform (DFT) vectors associated with each CSI-RS resource or CSI-RS port group, and a number of Frequency Domain (FD) basis vectors from a set of orthogonal DFT vectors associated with a set of subbands, and
  - the UE determines a set of coefficients for each pair of selected SD and FD basis vectors.
- The UE reports a Precoding Matrix Indicator (PMI) to the network node, where the PMI comprises the selected beam indices and FD basis vector indices associated with each of the CSI-RS resources of port groups, and the determined coefficients.
- The network node constructs a precoder matrix based on the reported PMI.

In one embodiment, a method performed by a UE for CSI feedback comprises one or more of the following steps:

- Step1: The UE receives at least one of the following configurations for channel measurement associated with a CSI reporting configuration:
  - configuration of multiple NZP CSI-RS resources for channel measurement wherein each of the multiple NZP CSI-RS resources is associated with a different TCI state or unified TCI state (see Section 2.1.1 below for detailed embodiments related to this);

configuration of a single NZP CSI-RS resource for channel measurement consisting of multiple sets of CSI-RS ports wherein each set of CSI-RS ports within the single NZP CSI-RS resource is associated with a different TCI state or unified TCI state (See Section 2.1.2 for detailed embodiments related to this).

Step 2: The UE performs channel measurements on at least one of:

at least a subset of the configured multiple NZP CSI-RS resources using the respective TCI state or unified TCI state associated with each NZP CSI-RS resource;

the configured single NZP CSI-RS resource wherein the multiple sets of CSI-RS ports in the single NZP CSI-RS resource are measured using the respective TCI state or unified TCI state associated with each set of CSI-RS ports.

Step 3: The UE computes CSI using the channel measurements.

Step 4: The UE reports the computed CSI which includes (e.g., in addition to other components such as, e.g., Channel Quality Indictor (CQI), a set of spatial domain basis vectors, a set of selected ports, linear coefficients, and/or the like) at least one of:

an index identifying a starting point of a single window from which orthogonal frequency domain basis vectors corresponding to S>1 NZP CSI-RS channel measurement resources or S>1 sets of CSI-RS ports are selected (See section 2.2.1 and 2.2.2 for details, where Section 2.2.1 covers the case with the same number of FD basis vectors for all resources and Section 2.2.2 covers the case with different number of FD basis vectors for different resources). Note that, in one embodiment, the window index is only reported when the number of PMI subbands N3 is larger than a predefined value. The length of the window can be, e.g., xM, where x>1 is an integer and M is the number of FD basis vectors selected per layer, per NZP CSI-RS channel measurement resource/set of CSI-RS ports. Also note that the index is, in one embodiment, layer common (i.e., the same index applies to all transmission layers).

S indices identifying starting points of S windows wherein the orthogonal frequency domain basis vectors corresponding to the sth NZP CSI-RS channel measurement resource/sth set of CSI-RS ports are selected from the sth window (See section 2.2.1 and 2.2.2 for details). Note that, in one embodiment, the window index is only reported when the number of PMI subbands $N_3$ is larger than a predefined value. The length of the window can be, e.g., xM where x>1 is an integer and M is the number of FD basis vectors selected per layer, per NZP CSI-RS channel measurement resource/set of CSI-RS ports. Also note that, in one embodiment, the index is layer common (i.e., same index applies to all transmission layers).

S combinatorial indices per layer where the sth combinatorial index is used to select the frequency domain basis vectors corresponding to the sth NZP CSI-RS channel measurement resource/sth set of CSI-RS ports (See section 2.2.1 and 2.2.2 for details). Note that, in one embodiment, when the number of PMI subbands N3 is larger than a predefined threshold, the FD basis vectors for the S NZP CSI-RS channels/S sets of CSI-RS ports may be selected from a single window or S windows. In another embodiment, when the number of PMI subbands N3 is less than a predefined threshold, the FD basis vectors for the S NZP CSI-RS channels/S sets of CSI-RS ports are selected without any intermediate window. In one embodiment, the optimization described below in Section 2.3.2 is applicable.

a single combinatorial index per layer is used to select the FD basis vectors corresponding to all S NZP CSI-RS channel measurement resources/S sets of CSI-RS ports (see Section 2.2.3 for details)

Certain embodiments may provide one or more of the following technical advantage(s). With embodiments of the proposed solutions, the network can know the association between reported Type TT frequency domain compression parameters and NZP CSI-RS resources transmitted from different TRPs during CJT. From this association, the network can know which frequency domain basis vectors corresponding to which TRP which transmits the NZP CSI-RS. Using the reported Type II frequency domain compression parameters, the network can perform precoding to a UE from each of the TRPs used in a CJT.

Embodiments will now be described in more detail under separate headings and sub-headings. These embodiments may be used separately or in any desired combination.

2.1 Channel Measurement 2.1.1 Multiple NZP CSI-RS Resources for Channel Measurement The UE is configured by the gNB with NZP CSI-RS resource(s) for channel measurement. To enable Channel State Information (CSI) feedback corresponding to Coherent Joint Transmission (CJT) from multiple TRPs, the UE may be signaled with S>1 NZP CSI-RS resource(s) in a CSI reporting configuration to perform channel measurement for the purpose of calculating CSI. In addition, CSI resource(s) for Interference Measurement (CSI-IM(s)) or additional NZP CSI-RS resource(s) for interference measurement may also be signaled to the UE.

Figure 8:
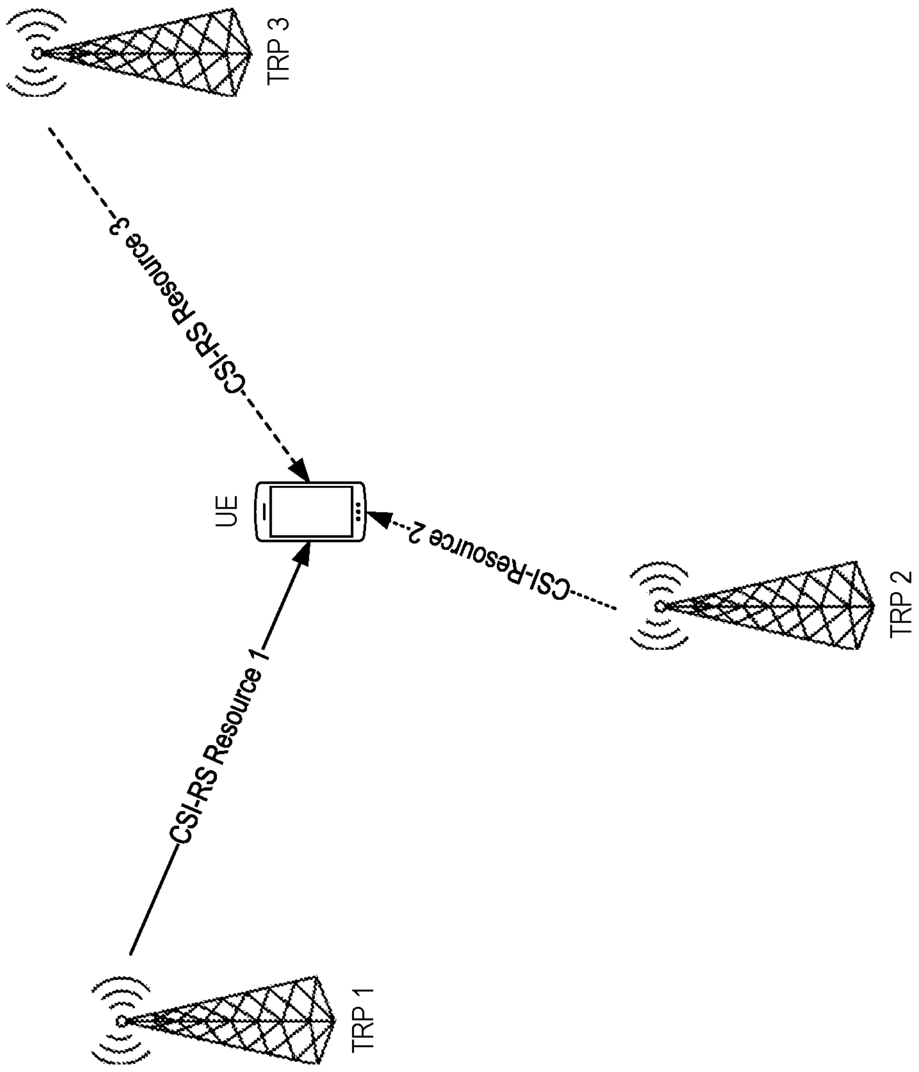
FIG. 8 shows an example where a User Equipment (UE) is configured with S=3 Non-Zero Power (NZP) CSI-RS resources for channel measurement in accordance with an embodiment of the present disclosure.

In one embodiment, the UE is higher layer configured (e.g., via Radio Resource Control (RRC) signaling) with S NZP CSI-RS resource(s) for channel measurement. Each of the S NZP CSI-RS resources may be associated with different TCI states or unified TCI states. The different TCI states may consist of one or more of the following:

different QCL source reference signals (RSs) of QCL Types A, B, or C, where the different QCL Type A/B/C source RSs may be transmitted from different TRPs;

different QCL source RSs of QCL Type D, where the different QCL Type D source RSs may be transmitted from different TRPs;

FIG. 8 shows an example where the UE is configured S=3 NZP CSI-RS resources for channel measurement. The S=3 NZP CSI-RS resources denoted as CSI-RS resources 1, 2, and 3 are transmitted from TRPs 1, 2, and 3, respectively. CSI-RS resources 1, 2, and 3 are measured by the UE to compute/calculate the CSI corresponding to CJT from TRPs 1, 2, and 3. That is, the channel $H_1$ corresponding to TRP 1 is measured on CSI-RS resource 1, the channel $H_2$ corresponding to TRP 2 is measured on CSI-RS resource 2, and the channel $H_3$ corresponding to TRP 3 is measured on CSI-RS resource 3.

Figure 9:
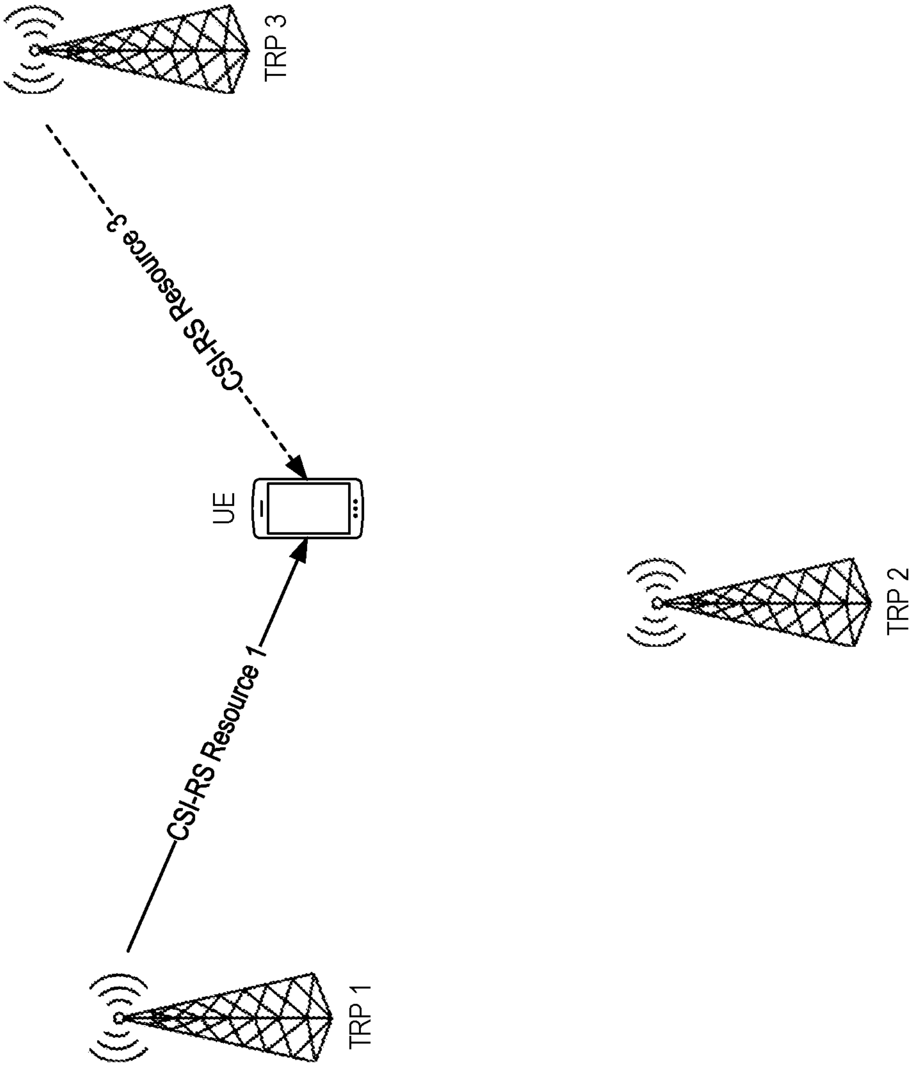
FIG. 9 shows an example where the UE is configured with S=3 NZP CSI-RS resources (the three NZP CSI-RS resources are CSI-RS resources 1, 2, and 3) but is configured to perform channel measurements on a subset of the set of configured NZP CSI-RS resources, in accordance with an embodiment of the present disclosure.

In another variant of this embodiment, S NZP CSI-RS resources are configured for channel measurement, and the UE is further indicated by the gNB with a subset S' (where S≥S'>1) of the NZP CSI-RS resources to perform channel measurement. The further indication may be via a Medium Access Control (MAC) Control Element (CE) control message or via a Downlink Control Information (DCI) (e.g., via a DCI field of a DCI that triggers a CSI report or a DCI field of a DCI that is independent of the DCI that triggers the CSI report). For instance, when a UE is configured via RRC signaling with S NZP CSI-RS resources, the UE may receive a MAC CE from the gNB to indicate S'≤S NZP CSI-RS resources that are to be used for channel measurement to calculate CSI corresponding to CJT. FIG. 9 shows an example where the UE is configured with S=3 NZP CSI-RS resources (the three NZP CSI-RS resources are CSI-RS resources 1, 2, and 3 wherein CSI-RS resource is not shown in FIG. 9). Then, the UE receives a further indication (e.g., via MAC CE signaling or via DCI) of S'=2 NZP CSI-RS resources (i.e., CSI-RS resources 1 and 3) for channel measurement to calculate CSI corresponding to CJT from TRP1 and TRP3. The channel $H_1$ corresponding to TRP 1 is measured on CSI-RS resource 1, and the channel $H_3$ corresponding to TRP 3 is measured on CSI-RS resource 3. In a scenario where based on channel measurement in the uplink, the gNB may know that the UE sees stronger channel from TRP 1 and 3, the gNB may indicate the UE dynamically to use the subset of NZP CSI-RS resources (e.g., CSI-RS resources 1 and 3) for channel measurement. Being able to dynamically indicate a subset S' of NZP CSI-RS resources for channel measurement out of the configured S NZP CSI-RS resources enables the network to dynamically update the NZP CSI-RS resources for channel measurement without the need to RRC reconfigure the UE which tends to be slower compared to dynamically indicating the S' NZP CSI-RS resources. In one extension to this embodiment, the MAC-CE or DCI used to indicate the subset S' of the NZP CSI-RS resources to perform channel measurements on, also includes an indication whether the remaining S-S' NZP CSI-RS resource(s) (initially configured for channel measurements), instead should be used as NZP CSI-RS resources for interference measurements. For example, in FIG. 9, where the gNB indicates NZP CSI-RS resource 1 and NZP CSI-RS resource 3 for channel measurements to calculate CSI corresponding to CJT, the gNB can also indicate whether the UE should ignore the NZP CSI-RS resource 2 or use NZP CSI-RS resource 2 for interference measurement. In case it is used for interference measurements, the UE could assume that the Identity matrix is used as the precoder over the CSI-RS resource ports belonging to that NZP CSI-RS resource. This could for example be useful in case the gNB knows that it will use the TRP2 to transmit to other UEs at the same time (i.e., MU-MIMO). The UE could add the interference estimated from the S-S' NZP CSI-RS resource(s) with other potential interference measurements associated with other CSI-IM(s) or other additional NZP CSI-RS resource(s) configured for interference measurements.

In yet another variant of this embodiment, S NZP CSI-RS resources are configured for channel measurement, and the UE selects a subset S' (where S≥S'>1) of the NZP CSI-RS resources to calculate CSI corresponding to CJT. The selected subset of S' NZP CSI-RS resources are reported by the UE to the gNB as part of the CSI feedback. In one example, the number S' is reported as part of CSI part 1, and indicators indicating the selected subset of S' NZP CSI-RS resources are reported as part of CSI part 2. In an alternative embodiment, the S' NZP CSI-RS resources are reported in a MAC CE control message from the UE to the gNB. Consider the example in FIG. 9 where the UE is configured with S=3 NZP CSI-RS resources. Then, the UE measures the configured S=3 NZP CSI-RS resources and selects S'=2 NZP CSI-RS resources (i.e., CSI-RS resources 1 and 3) for channel measurement to calculate CSI corresponding to CJT from TRP1 and TRP3. For instance, the UE may select CSI-RS resources 1 and 3 based on the strongest received signal strength among the S=3 NZP CSI-RS resources configured. In one extension to this embodiment, when the UE selects a subset S' of the NZP CSI-RS resources to perform channel measurements on, the UE can either use the remaining S-S' NZP CSI-RS resource(s) (initially configured for channel measurements), as NZP CSI-RS resources for interference measurements or ignore them. In one alternate of this embodiment, a UE is pre-configured in the specification to use them as NZP-CSI-RS resource for interference measurements. In one alternate of this embodiment, a UE is pre-configured in the specification to ignore them. In another alternate of this embodiment, the UE can be RRC configured (e.g., with a flag in CSI-ReportConfig information element (IE) as specified in TS 38.311) to either to use them as NZP-CSI-RS resource for interference measurements or to ignore them. In case they are used for interference measurements, the UE could add the interference estimated from the S-S' NZP CSI-RS resource(s) with other potential interference measurements associated with other CSI-IM(s) or other additional NZP CSI-RS resource(s) configured for interference measurements.

In another embodiment, each of the S NZP CSI-RS resources is configured with a same number of CSI-RS ports. In addition, the S NZP CSI-RS resources are orthogonal and in a same slot. In other words, the UE can measure all channels associated with the S NZP CSI-RS within a slot. The total number of CSI-RS ports from all the CSI-RS resources may not exceed 32.

2.1.2 Single NZP CSI-RS Resource for Channel Measurement

In this embodiment, to enable CSI feedback corresponding to CJT from multiple TRPs, the UE may be signaled with a single NZP CSI-RS resource in a CSI reporting configuration to perform channel measurement for the purpose of calculating CSI. In addition, CSI-IM(s) or additional NZP CSI-RS resource(s) for interference measurement may also be signaled to the UE.

Figure 10:
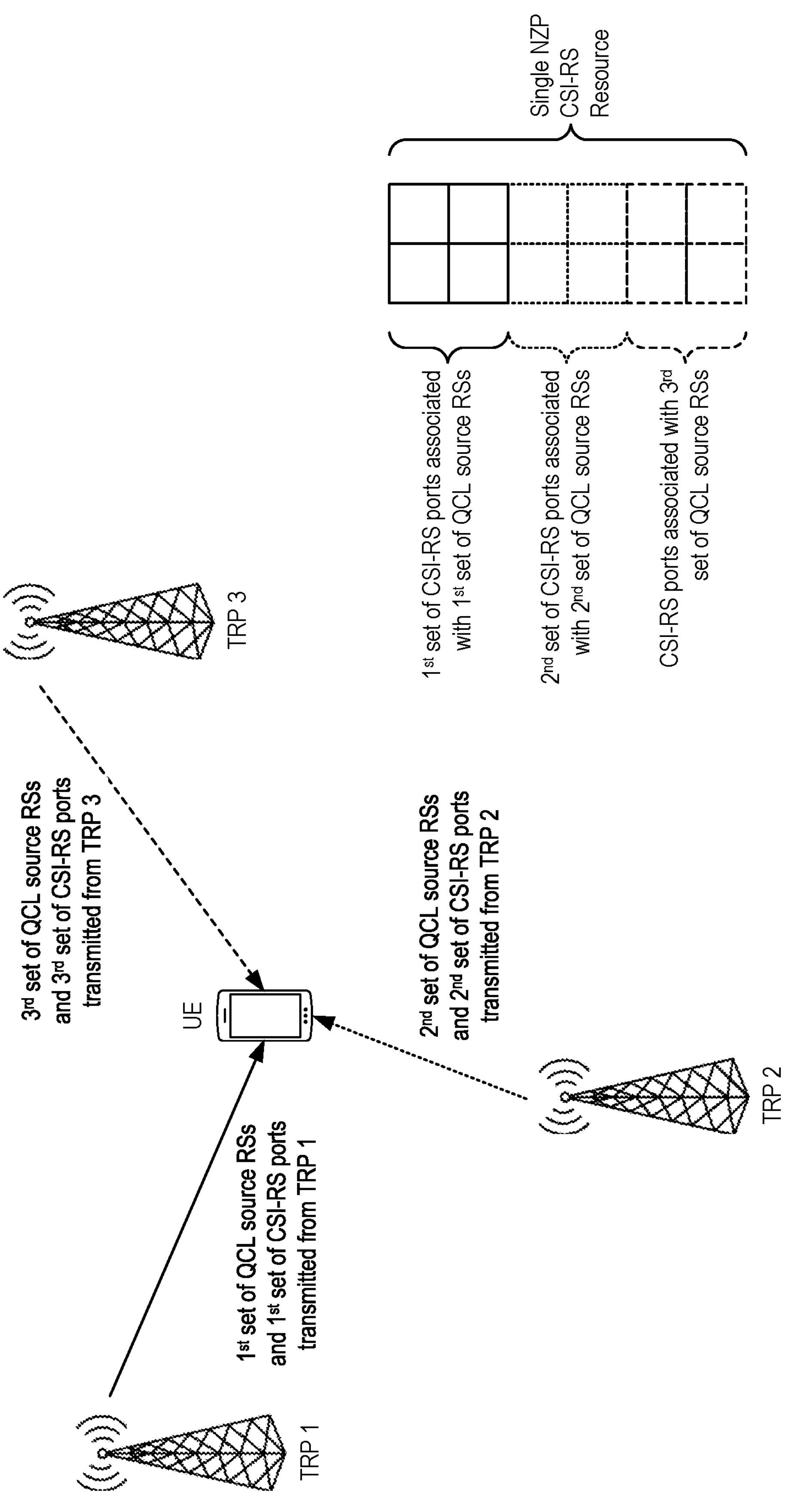
FIG. 10 shows an example where the UE is configured with S=3 sets of CSI-RS ports with different Quasi Co-Location (QCL) source reference signals (RSs) (i.e., different Transmission Configuration Indicator (TCI) states or unified TCI states) within a single NZP CSI-RS resource for channel measurement, in accordance with an embodiment of the present disclosure.

In this embodiment, the UE is higher layer configured (i.e., via RRC signaling) with a single NZP CSI-RS resource for channel measurement that consists of S sets of CSI-RS ports. Each of the S sets of CSI-RS ports may be associated with different TCI states or unified TCI states (i.e., there are S different TCI states or unified TCI states associated with the S sets of CSI-RS ports). The different TCI states may consist of one or more of the following:

- different QCL source reference signals (RSs) of QCL Types A, B, or C, where the different QCL Type A/B/C source RSs may be transmitted from different TRPs;
- different QCL source RSs of QCL Type D, where the different QCL Type D source RSs may be transmitted from different TRPs;

FIG. 10 shows an example where the UE is configured with S=3 sets of CSI-RS ports with different QCL source RSs (i.e., different TCI states or unified TCI states) within a single NZP CSI-RS resource for channel measurement.

- The $1^{st}$ set of CSI-RS ports are associated with the $1^{st}$ set of QCL source RSs which are contained in a $1^{st}$ set of TCI state(s). The $1^{st}$ set of CSI-RS ports and the $1^{st}$ set of QCL source RSs are transmitted from TRP 1.
- The $2^{nd}$ set of CSI-RS ports are associated with the $2^{nd}$ set of QCL source RSs which are contained in a $2^{nd}$ set of TCI state(s). The $2^{nd}$ set of CSI-RS ports and the $2^{nd}$ set of QCL source RSs are transmitted from TRP 2.

The $3^{rd}$ set of CSI-RS ports are associated with the $3^{rd}$ set of QCL source RSs which are contained in a $3^{rd}$ set of TCI state(s). The $3^{rd}$ set of CSI-RS ports and the $3^{rd}$ set of QCL source RSs are transmitted from TRP 3.

A beamformed CSI-RS may be transmitted on each CSI-RS port from a TRP, and the beamformed channel from a TRP is measured from the corresponding CSI-RS port. The UE may select a subset of the ports in the NZP CSI-RS resource and report the selected CSI-RS ports as part of the CSI feedback corresponding to CJT. The selected CSI-RS ports that are included in the CSI report can belong to one or more of the S sets of CSI-RS ports.

In an alternative embodiment, a UE may be higher layer configured (i.e., via RRC signaling) with an aggregated NZP CSI-RS resource for channel measurement that consists of S CSI-RS resources aggregated. Each of the S CSI-RS resources may be associated with different TCI states or unified TCI states (i.e., there are S different TCI states or unified TCI states associated with the S aggregated CSI-RS resources). The different TCI states may consist of one or more of the following:

- different QCL source reference signals (RSs) of QCL Types A, B, or C, where the different QCL Type A/B/C source RSs may be transmitted from different TRPs;
- different QCL source RSs of QCL Type D, where the different QCL Type D source RSs may be transmitted from different TRPs;

2.2 Type II CSI Reporting Enhancement for CJT

Figure 11:
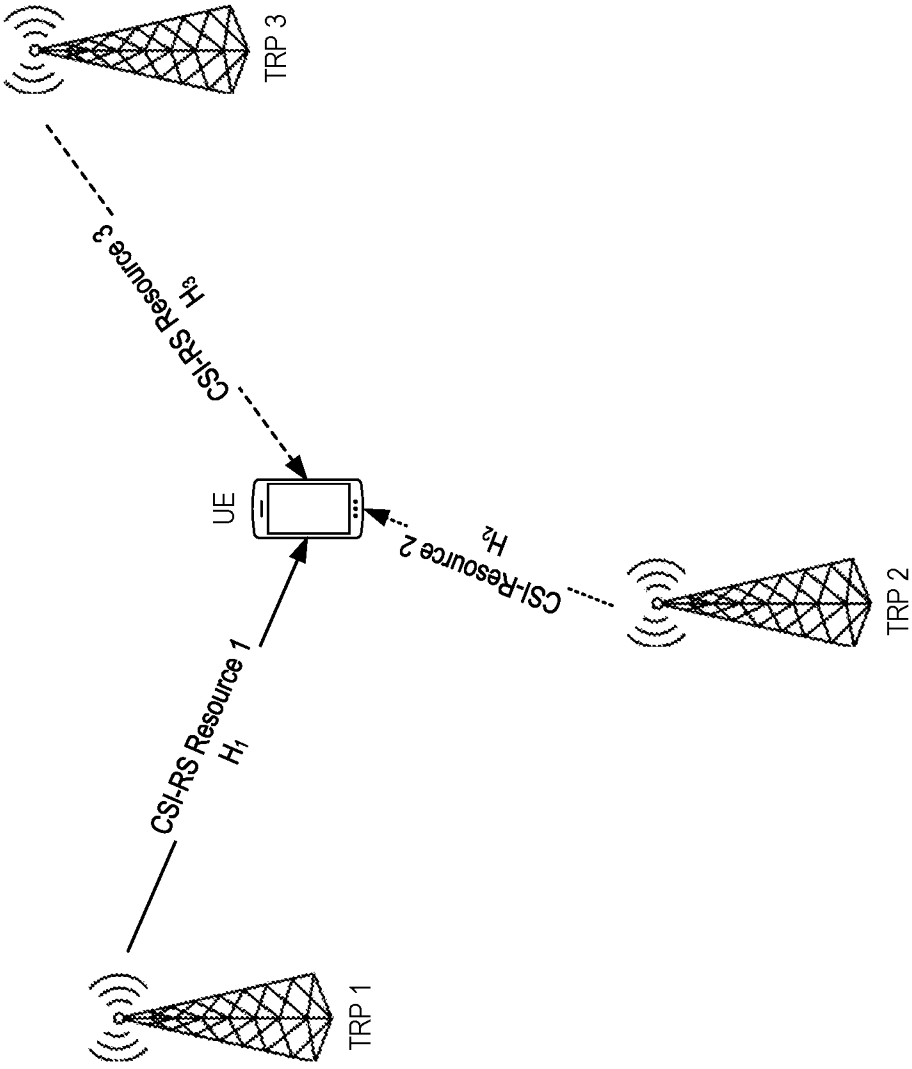
FIG. 11 is an illustration of a UE performing measurement on the NZP CSI-RS resources for Coherent Joint Transmission (CJT) CSI feedback, in accordance with an embodiment of the present disclosure.

The UE performs measurement on the NZP CSI-RS resources for CJT CSI feedback as shown in FIG. 11. The channel measurements corresponding to CSI-RS resources 1, 2, and 3 are respectively denoted as $H_1$, $H_2$, and $H_3$. Note that measured channel $H_s$ corresponds to the channel measured between the UE and a TRP.

For each MIMO layer, the precoder matrix is given by a size-P×$N_3$ matrix $$W = W_1 \tilde{W}_2 W_f^H,$$

where $$P = \sum_{s=0}^{S-1} P_s$$

is the total number of CSI-RS ports in all the S NZP CSI-RS resources, where $P_s$ is the number of CSI-RS ports in the $s^{th}$ NZP CSI-RS resource. The antennas associated with the $s^{th}$ NZP CSI-RS resource can be a 2D antenna array with $$N_1^{(s)}$$

ports in one dimension and $$N_2^{(s)}$$

in the other dimension at each polarization, and $$P_s = 2N_1^{(s)} N_2^{(s)}.$$

$N_3$ is the number of PMI subbands, or the length of the FD basis vectors $$W_1 = \text{diag}\left(W_1^{(0)}, \ldots , W_1^{(S-1)}\right)$$

is size-P×2L block diagonal spatial compression matrix, where L is the total number of selected beams associated with all the S NZP CSI-RS resources, where $$W_1^{(s)} = \begin{bmatrix} v_1^{(s)}, \ldots , v_{L_s}^{(s)} & 0 \\ 0 & v_1^{(s)}, \ldots , v_{L_s}^{(s)} \end{bmatrix} (s = 0, \ldots , S-1)$$

is a size $P_s$×$2L_s$ precoding matrix associated with the $s^{th}$ NZP CSI-RS resource, $$\left\{v_1^{(s)}, \ldots , v_{L_s}^{(s)}\right\}$$

is a set of size $P_s/2$×1 selected orthogonal 2D spatial domain DFT vectors or beams associated with the $s^{th}$ NZP CSI-RS resource, $$v_k^{(s)}(k = 1, \ldots , L_s) \in \left\{v_{l,m};\ l = 0, 1, \ldots , N_1^{(s)}O_1^{(s)} - 1,\ m = 0, 1, \ldots , N_2^{(s)}O_2^{(s)} - 1\right\},$$

where $$v_{l,m} = b_m \otimes a_l,\ a_l = \left[1 \quad e^{j\frac{2\pi l}{O_1^{(s)}N_1^{(s)}}}, \ldots , e^{j\frac{2\pi\left(N_1^{(s)}-1\right)}{O_1^{(s)}N_1^{(s)}}}\right]^T,\ b_m = \left[1 \quad e^{j\frac{2\pi m}{O_2^{(s)}N_2^{(s)}}}, \ldots , e^{j\frac{2\pi\left(N_2^{(s)}-1\right)}{O_2^{(s)}N_2^{(s)}}}\right]^T,$$

⊗ represents Kronecker product, $$O_1^{(s)} \text{ and } O_2^{(s)}$$

are respectively the oversampling factors in the first and second antenna dimensions associated with the $s^{th}$ NZP CSI-RS resource, and L=

$$\sum_{s=0}^{S-1} L_s.$$

$W_f$ is size-$N_3 \times M_{total}$ frequency compression matrix, where $M_{total}$ is the total number of selected FD basis vectors out of the $N_3$ orthogonal FD DFT basis vectors $\{f_0\ f_1 \ldots f_{N_3-1}\}$ for all S NZP CSI-RS resources, where $f_k$ is a size-$N_3 \times 1$ frequency domain DFT vector $\tilde{W}_2$ is size $2L \times M_{total}$ coefficient matrix $$W = W_1 \tilde{W}_2 W_f^H = \begin{bmatrix} W^{(0)} \\ \ldots \\ W^{(S-1)} \end{bmatrix},$$

where $W^{(s)}$ is a size $P_s \times N_3$ matrix associated with the sth CSI-RS resources and each column of $W^{(s)}$ is normalized to norm $$\frac{1}{\sqrt[2]{\gamma_s}},$$

where $\gamma_s$ is the number of layers associated with the $s^{th}$ NZP CSI-RS resource 2.2.1 FD Compression with Equal Number of FD Components for all Measured Channels In one embodiment, the UE is configured with a single parameter combination ($N_3$, R, p) that is applied to all the channels measured (e.g., $H_1$, $H_2$, $H_3$) for CJT CSI feedback, where $N_3 = N_{SB}R$ is the number of PMI subbands, $N_{SB}$ is the number of CQI subbands, R is a scaling factor. The parameter p is rank dependent and is provided by the higher layer parameter paramCombination-r16 according to TS 38.214 V16.5.0. The parameter R is configured by the parameter numberOfPMI-SubbandsPerCQI-Subband according to TS 38.214 V16.5.0. Then, $M = \lceil p \times N_3/R \rceil$ is the maximum number of orthogonal FD vectors selected per layer for each of the channels measured on the NZP CSI-RS resources configured for CJT CSI feedback.

$$W_{f,l} = \left[ f_{k_0,l}^{(0)} f_{k_1,l}^{(0)} \ldots f_{k_{M-1},l}^{(0)}\ f_{k_0,l}^{(1)} f_{k_1,l}^{(1)} \ldots f_{k_{M-1},l}^{(1)}\ f_{k_0,l}^{(2)} f_{k_1,l}^{(2)} \ldots f_{k_{M-1},l}^{(2)} \right]$$

denote the $N_3 \times 1$ sized orthogonal FD vectors that are selected for the $l^{th}$ layer corresponding to the $s^{th}$ measured channel $H_s$. Here, $k_m$ represents the index of the $m^{th}$ selected orthogonal FD vector. Then, the FD compression is achieved by including the orthogonal FD vectors corresponding to each of the configured NZP CSI-RS resources for channel measurement in $W_{f,l}$ as follows:

$$\text{Let } \{f_{k_m,l}^{(s)}\}_{m=0}^{M-1}$$

In the above example, 3 NZP CSI-RS resources are assumed for channel measurement (i.e., s=0, 1, 2). However, the procedure can be similarly extended to the case where the UE measures S NZP CSI-RS resources for channel measurement. In terms of CSI reporting, the above orthogonal FD vectors selected are fed back as part of the $i_1$ component of the PMI (TS 38.214 V16.5.0).

The corresponding $\tilde{W}_2$ is a block diagonal matrix as $\tilde{W}_2 = \text{diag}(\tilde{\boldsymbol{W}}_2^{(0)}, \tilde{\boldsymbol{W}}_2^{(1)}, \tilde{\boldsymbol{W}}_2^{(2)})$, where $\tilde{\boldsymbol{W}}_2^{(s)}$ (s=0, 1, 2) is a size $2L_s \times k_m$ coefficient matrix associated with the $s^{th}$ NZP CSI-RS resource. $\tilde{\boldsymbol{W}}_2^{(s)}$ In some embodiments, when the number of PMI subbands $N_3$ is larger than a predefined value (e.g., $N_3>19$), the orthogonal FD vectors corresponding to the channels measured on all S NZP CSI-RS resources are selected from a single window of length xM in the frequency domain where x is an integer larger than 1. Note that in NR Rel-16, a window of length 2M is used where channel measurement is only performed on a single NZP CSI-RS resource. However, when the UE performs channel measurements on multiple NZP CSI-RS resources from different TRPs, the channel conditions (e.g., average channel delays) between the UE and different TRPs may be different and thus a larger window length may be considered. Hence, in one embodiment, when S>1 NZP CSI-RS resources for channel measurement for the purpose of CJT CSI reporting, the orthogonal FD vectors corresponding to all S NZP CSI-RS resources are selected from a single window of length xM in the frequency domain where x>2. In another embodiment, when the channel delays among the different TRPs are very similar, the orthogonal FD vectors corresponding to all S NZP CSI-RS resources measured are selected from a single window of length 2M in the frequency domain (i.e., x=2). In these embodiments, the starting point of the single window in the frequency domain is reported via a single index $i_{1,5}$ which can take a value in the range {0, 1, . . . , xM−1}. The single index $i_{1,5}$ is reported as part of the $i_1$ component of the PMI. Note that the single index $i_{1,5}$ is layer common (i.e., the same index applies to all transmission layers l).

In an alternative embodiment, when the number of PMI subbands $N_3$ is larger than a predefined value (e.g., $N_3>19$), the orthogonal FD vectors corresponding to the channels measured on S NZP CSI-RS resources are selected from S>1 windows in the frequency domain. The length of each of the S>1 windows is xM in the frequency domain where x≥2. In this alternative embodiment, the starting point of each of the S>1 windows in the frequency domain are reported via multiple indices $$i_{1,5}^{(s)},\ s = 0, 1, \ldots, S-1. \text{ Here, } i_{1,5}^{(s)}$$

denotes the starting point of the window corresponding to the channel measured on the $s^{th}$ NZP CSI-RS resource (i.e., window corresponding to measured channel $H_s$), where $$i_{1,5}^{(s)}$$

can take on a value in the range {0, 1, . . . , xM−1}. The multiple indices $$i_{1,5}^{(s)},\ s = 0, 1, \ldots, S-1$$

are reported as part of the $i_1$ component of the PMI. Note that for channel measured on the $s^{th}$ NZP CSI-RS resource, the index $$i_{1,5}^{(s)}$$

is layer common (i.e., the same index applies to all transmission layers l).

In order to select the M orthogonal FD vectors for the $l^{th}$ layer corresponding to the $s^{th}$ measured channel $H_s$, a combinatorial index $$i_{1,6,l}^{(s)}$$

corresponding to each measured channel $H_s$ is reported as part of the $i_1$ component of the PMI. That is, S different combinatorial indices $$i_{1,6,l}^{(s)},\ s = 0, 1, \ldots, S-1$$

are reported per layer l as part of $i_1$ component of the PMI (i.e., one corresponding to each measured channel $H_s$ per layer l).

In some embodiments, when the number of PMI subbands $N_3$ is larger than a predefined value (e.g., $N_3>19$), the index $$i_{1,6,l}^{(s)}$$

is used to determine the M orthogonal FD vectors for the $l^{th}$ layer from the window corresponding to the measured channel $H_s$ (note that if a single window is reported, the start value of the window is given by the single index $i_{1,5}$; if multiple windows are reported, then the start value of the window is given by the index $$i_{1,5}^{(s)}).$$

In these embodiments, the combinatorial index $$i_{1,6,l}^{(s)}$$

takes on a value in the range $$\left\{0, 1, \ldots, \binom{xM-1}{M-1}-1\right\}.$$

The M orthogonal FD vectors for the $l^{th}$ layer corresponding to the $s^{th}$ measured channel $H_s$ are determined using $$i_{1,6,l}^{(s)}$$

following the procedures given in Clause 5.2.2.2.5 of TS 38.214 V16.5.0.

In some embodiments, when the number of PMI subbands $N_3$ is less than or equal to a predefined value (e.g., $N_3 \leq 19$), the index $$i_{1,6,l}^{(s)}$$

is used to determine the M orthogonal FD vectors for the $l^{th}$ layer corresponding to the measured channel $H_s$ without determining an intermediate window. In these embodiments, the combinatorial index $$i_{1,6,l}^{(s)}$$

takes on a value in the range $$\left\{0, 1, \ldots, \binom{N_3-1}{M-1}-1\right\}.$$

The M orthogonal FD vectors for the $l^{th}$ layer corresponding to the $s^{th}$ measured channel $H_s$ are determined using $$i_{1,6,l}^{(s)}$$

following the procedures given in Clause 5.2.2.2.5 of TS 38.214 V16.5.0.

To associate the indices $$i_{1,6,l}^{(s)} \text{ and } i_{1,5}^{(s)}$$

with the $s^{th}$ measured channel $H_s$, a rule must first be defined in specifications on how to define the $s^{th}$ measured channel $H_s$. In some embodiments, the NZP CSI-RS resources configured for channel measurement for CJT CSI reporting are sorted (e.g., in ascending or descending order) according to the NZP CSI-RS resource ID, and the $s^{th}$ measured channel $H_s$ is the channel measured on the NZP CSI-RS resource with the $s^{th}$ resource ID on the sorted list. For instance, if the NZP CSI-RS resources configured for channel measurement for CJT CSI reporting have resource IDs [35, 2, 89, 15], then the $1^{st}$, $2^{nd}$, $3^{rd}$ and $4^{th}$ measured channels respectively correspond to NZP CSI-RS resources with resource IDs 2, 15, 35, and 89.

In another embodiment, when the UE selects a subset of the NZP CSI-RS resources configured for channel measurement for CJT CSI reporting, only the resource IDs corresponding to the selected NZP CSI-RS resources are used to define the $s^{th}$ measured channel $H_s$. For instance, in the above example, assuming that the UE selects NZP CSI-RS resources with IDs {35, 15}, then the $1^{st}$ and $2^{nd}$ measured channels respectively correspond to NZP CSI-RS resources with resource IDs 15 and 89. In yet another embodiment, when indicators indicating the selected subset of NZP CSI-RS resources are reported as part of CJT CSI, then the $s^{th}$ measured channel $H_s$ corresponds to the NZP CSI-RS resource indicated by the $s^{th}$ indicator.

In another embodiment, when the UE selects a subset of the NZP CSI-RS resources configured for channel measurement for CJT CSI reporting, only the resource IDs corresponding to the selected NZP CSI-RS resources are used to define the $s^{th}$ measured channel $H_s$. For instance, in the above example, assuming that the UE selects NZP CSI-RS resources with IDs [35, 15], then the $1^{st}$ and $2^{nd}$ measured channels respectively correspond to NZP CSI-RS resources with resource IDs 15 and 89. In yet another embodiment, when indicators indicating the selected subset of NZP CSI-RS resources are reported as part of CJT CSI, then the $s^{th}$ measured channel $H_s$ corresponds to the NZP CSI-RS resource indicated by the $s^{th}$ indicator.

In another embodiment, the S NZP CSI-RS resources belong to a NZP CSI-RS resource set and the $s^{th}$ measured channel $H_s$ corresponds to the $s^{th}$ NZP CSI-RS resource configured in the NZP CSI-RS resource set.

Although the above embodiments are written for the case when the UE is configured with multiple NZP CSI-RS resources, they can also be extended to the case when the UE is configured with an aggregated CSI-RS resource with S>1 CSI-RS resources aggregated. In this case, the $s^{th}$ measured channel $H_s$ may be defined via sorting of the S>1 CSI-RS resources aggregated according to their resource IDs similar to the above embodiments. Alternatively, when indicators indicating the selected subset among the S>1 CSI-RS resources are reported as part of CJT CSI, then the $s^{th}$ measured channel $H_s$ corresponds to the CSI-RS resource indicated by the $s^{th}$ indicator.

In alternative embodiments, for defining the $s^{th}$ measured channel $H_s$, the sorting may be performed using TCI state IDs associated with the NZP CSI-RS resources instead of the NZP CSI-RS resource IDs.

2.2.2 FD Compression with Different Number of FD Components Per Measured Channel In general, the channel conditions between the UE and the different TRPs may differ in terms of line of sight/non-line of sight conditions, Doppler spread, average delay, delay spread, etc. Hence, as opposed to the embodiment in Section 2.2.1, the FD compression may be performed with different number of orthogonal FD vectors per layer for different channels measured on the NZP CSI-RS resources configured for CJT CSI feedback. Let $M_s$ denote the number of orthogonal FD vectors that are selected per layer for each of the channels measured on the NZP CSI-RS resources configured for CJT CSI feedback. Then, the orthogonal FD vectors that are selected per layer for the $s^{th}$ measured channel $H_s$ can be denoted as $$\{f_{k_m,l}^{(s)}\}_{m=0}^{M_s-1}.$$

The FD compression is achieved by including the orthogonal FD vectors corresponding to the configured NZP CSI-RS resources for channel measurement in $W_{f,l}$ as follows:

$$W_{f,l} = \left[ f_{k_0,l}^{(0)} f_{k_1,l}^{(0)} \cdots f_{k_{M_0},l}^{(0)} \; f_{k_0,l}^{(1)} f_{k_1,l}^{(1)} \cdots f_{k_{M_1},l}^{(1)} \; f_{k_0,l}^{(2)} f_{k_1,l}^{(2)} \cdots f_{k_{M_2},l}^{(2)} \right]$$

In the above, $M_0$, $M_1$, and $M_2$ respectively denote the number of orthogonal FD vectors corresponding to channel measurements $H_0$, $H_1$, and $H_2$. In the above example, 3 NZP CSI-RS resources are assumed for channel measurement (i.e., s=0, 1, 2). However, the procedure can be similarly extended to the case where the UE measures S NZP CSI-RS resources for channel measurement. In terms of CSI reporting, the above orthogonal FD vectors selected are fed back as part of the $i_1$ component of the PMI (TS 38.214 V16.5.0).

The corresponding $\tilde{W}_2$ is a block diagonal matrix as $\tilde{W}_2 = \text{diag}(\tilde{W}_2^{(0)}, \tilde{W}_2^{(1)}, \tilde{W}_2^{(2)})$, where $\tilde{W}_2^{(s)}$ (s=0, 1, 2) is a size $2L_s \times k_{M_s}$ coefficient matrix associated with the $s^{th}$ NZP CSI-RS resource.

In one variant of this embodiment, the number of orthogonal FD vectors for the $s^{th}$ measured channel $H_s$ can be configured to the UE by the gNB (e.g., via RRC signaling) via parameters $p_s$. When the UE is configured with S NZP CSI-RS resources for channel measurement for the purpose of CJT CSI reporting, the gNB configures the UE with the corresponding $p_s$ parameter for each of the NZP CSI-RS resources (i.e., the gNB configures $p_0, p_1, \ldots, p_{s-1}$ to the UE). The number of orthogonal FD vectors for the $s^{th}$ measured channel $H_s$ is determined by $$M_s = \left\lceil p_s \frac{N_3}{R} \right\rceil.$$

In some embodiments, the different $p_s$ parameters are signaled as part of a list of parameter combinations (e.g., a list of paramCombination-r16 parameters).

In another variant of this embodiment, the number of orthogonal FD vectors for the $s^{th}$ measured channel $H_s$ can be selected by the UE and reported to the gNB as part of the CJT CSI feedback. For instance, when the UE selects $M_s$ orthogonal FD vectors for the $s^{th}$ measured channel $H_s$, the UE may indicate $M_s$ in Part 1 of the CJT CSI feedback. Since is $M_s$ is determined per transmission layer, in some embodiments, the UE will indicate the selected $M_s$ for each transmission layer. It should be noted that $M_s$ will determine the number of linear combination coefficients per transmission layer that needs to be fed back in Part 2 of the CJT CSI, and hence, $M_s$ will impact the payload size of the CJT CSI feedback. Hence, $M_s$ needs to be reported in Part 1 of the CJT CSI report.

In some embodiments, a maximum limit on the total number of orthogonal FD basis vectors per layer over all S NZP CSI-RS resources may be specified such that $$\sum_{s=0}^{S-1} M_s \leq M_{max}.$$

In some cases, $M_{max}$ may be specified in 3GPP specifications while in other cases, $M_{max}$ may be configured to the UE via RRC signaling.

In some embodiments, when the number of PMI subbands $N_3$ is larger than a predefined value (e.g., $N_3$>19), the orthogonal FD vectors corresponding to the channels measured on all S NZP CSI-RS resources are selected from a single window of length xM in the frequency domain where x is an integer larger than 1. The difference in this embodiment when compared to the embodiment in Section 2.2.1 is that different number of orthogonal FD vectors (i.e., different $M_s$) per layer corresponding to different channel measurements $H_s$ from a single window of length xM in the frequency domain. In this embodiment, the M that is used to determine the window length may be predefined in specifications or chosen as the largest among the different $M_s$ values. The value of x may be defined similar to the embodiments in Section 2.2.1. The starting point of the single window in the frequency domain is reported via a single index $i_{1,5}$ which can take a value in the range {0, 1, . . . , xM−1}. The single index $i_{1,5}$ is reported as part of the $i_1$ component of the PMI. Note that the single index $i_{1,5}$ is layer common (i.e., the same index applies to all transmission layers l).

In an alternative embodiment, when the number of PMI subbands $N_3$ is larger than a predefined value (e.g., $N_3>19$), the orthogonal FD vectors corresponding to the channels measured on S NZP CSI-RS resources are selected from S>1 windows in the frequency domain. The length of the $s^{th}$ window corresponding to the channel measured on the $s^{th}$ NZP CSI-RS resource (i.e., window corresponding to measured channel $H_s$) is $xM_s$ in the frequency domain where x≥2. In this alternative embodiment, the starting point of each of the S>1 windows in the frequency domain are reported via multiple indices $$i_{1,5}^{(s)},\ s=0, 1, \ldots , S-1.$$

Here, $$i_{1,5}^{(s)}$$

denotes the starting point of the window corresponding to the channel measured on the $s^{th}$ NZP CSI-RS resource (i.e., window corresponding to measured channel $H_s$), where $$i_{1,5}^{(s)}$$

can take on a value in the range {0, 1, . . . , $xM_s-1$}. The multiple indices $$i_{1,5}^{(s)},\ s=0, 1, \ldots , S-1$$

are reported as part of the $i_1$ component of the PMI. Note that for channel measured on the $s^{th}$ NZP CSI-RS resource, the index $$i_{1,5}^{(s)}$$

is layer common (i.e., the same index applies to all transmission layers l).

In order to select the $M_s$ orthogonal FD vectors for the $l^{th}$ layer corresponding to the $s^{th}$ measured channel $H_s$, a combinatorial index $$i_{1,6,l}^{(s)}$$

corresponding to each measured channel $H_s$ is reported as part of the $i_1$ component of the PMI. That is, S different combinatorial indices $$i_{1,6,l}^{(s)},\ s=0, 1, \ldots , S-1$$

are reported per layer l as part of $i_1$ component of the PMI (i.e., one corresponding to each measured channel $H_s$ per layer l).

In some embodiments, when the number of PMI subbands $N_3$ is larger than a predefined value (e.g., $N_3>19$), the index $$i_{1,6,l}^{(s)}$$

is used to determine the $M_s$ orthogonal FD vectors for the $l^{th}$ layer from the window corresponding to the measured channel $H_s$ (note that if a single window is reported, the start value of the window is given by the single index $i_{1,5}$; if multiple windows are reported, then the start value of the window is given by the index $$i_{1,5}^{(s)}).$$

In these embodiments, the combinatorial index $$i_{1,6,l}^{(s)}$$

takes on a value in the range $$\left\{0, 1, \ldots , \binom{xM_s-1}{M_s-1}-1\right\}.$$

The $M_s$ orthogonal FD vectors for the $l^{th}$ layer corresponding to the $s^{th}$ measured channel $H_s$ are determined using $$i_{1,6,l}^{(s)}$$

following the procedures given in Clause 5.2.2.2.5 of TS 38.214 V16.5.0.

In some embodiments, when the number of PMI subbands $N_3$ is less than or equal to a predefined value (e.g., $N_3\leq19$), the index $$i_{1,6,l}^{(s)}$$

is used to determine the $M_s$ orthogonal FD vectors for the $l^{th}$ layer corresponding to the measured channel $H_s$ without determining an intermediate window. In these embodiments, the combinatorial index $$i_{1,6,l}^{(s)}$$

takes on a value in the range $$\left\{0, 1, \ldots , \binom{N_3-1}{M_s-1}-1\right\}.$$

The $M_s$ orthogonal FD vectors for the $l^{th}$ layer corresponding to the $s^{th}$ measured channel $H_s$ are determined using $$i_{1,6,l}^{(s)}$$

following the procedures given in Clause 5.2.2.2.5 of TS 38.214 V16.5.0.

The association rules between indices $$i_{1,6,l}^{(s)} \text{ and } i_{1,5}^{(s)}$$

with the $s^{th}$ measured channel $H_s$ are similar to those covered in the embodiments in Section 2.2.1.

2.2.3 FD Compression with a Common Set of FD Basis Vectors

In some deployment scenarios, the channel delay spreads associated with different NZP CSI-RS resources may overlap or may be quite similar. In this case, a common set of FD basis vectors may be selected for all the NZP CSI-RS resources. Let M denote the number of orthogonal FD vectors that are selected per layer for all the channels measured on the NZP CSI-RS resources configured for CJT CSI feedback. Then, the orthogonal FD vectors that are selected per layer can be denoted as $$\{f_{k_m,l}\}_{m=0}^{M-1}.$$

The FD compression is achieved by including the orthogonal FD vectors in $W_{f,l}$ as follows:

$$W_{f,l} = [f_{k_0,l} f_{k_1,l} \ldots f_{k_{M-1},l}]$$

In some embodiments, UE can further down-select the FD basis vectors within the common set for which non-zero coefficients will be reported. This is useful since it is unlikely that all the FD basis vectors in the common set are strong for a particular TRP. In such cases, the coefficients associated with the weak FD basis are close to zero, which requires unnecessary overhead to report.

In some embodiments, the down-selected FD basis vectors associated with a NZP CSI-RS can be reported to the gNB using a combinatorial coefficient, which takes on a value in the range $$\left\{0, 1, \ldots, \binom{M}{M_s} - 1\right\},$$

where $M_s$ is the number of down-selected FD basis vectors for the s-th NZP CSI-RS.

In some embodiments, the common set of FD basis vector can also be layer-common, i.e., they are selected for all layers and all the channels measured on the NZP CSI-RS resources configured for CJT CSI feedback. For this case, in some embodiments, UE indicates to gNB the association between layer and the common set of FD basis vectors.

2.3 Further Optimization for Reporting FD Basis

In the following, optimization related to reporting of FD basis vectors are proposed.

2.3.1 Rotation of FD Basis Vectors for Each Associated NZP CSI-RS

For each NZP CSI-RS resource, when calculating the Type II report, UE can rotate the corresponding selected FD basis vectors such that the zero-th FD basis vector (e.g., the DC component which contains all ones) is always selected. Therefore, the zero-th FD basis vector will always be selected for all NZP CSI-RS resources so that it does not need to be reported. Based on this, UE can calculate the linear combination coefficient matrix, $W_2$, to ensure coherency between NZP CSI-RS resources and selected FD basis vectors. The reporting overhead can thus be saved. In some embodiments, for each NZP CSI-RS, UE only needs to report the FD basis vectors that are not the zero-th FD basis vector.

2.3.2 Reporting FD Basis Vectors Per NZP CSI-RS with a Constraint on the Total Number of Selected FD Basis Vectors In some scenarios, the propagation channels between the UE and the multiple TRPs are different in richness. For example, a UE may have line-of-sight (LoS) to one TRP while has non-LoS to another TRP. In such cases, a single FD basis vector may be sufficient for the first TRP while multiple FD basis vectors are needed for the second TRP.

In light of this, different number of FD basis vectors can be selected for different TRPs (hence the associated NZP CSI-RS) based on channel condition. The gNB only needs to configure the maximum total number of FD basis vectors selected by UE for all NZP CSI-RS resources, it is up to the UE to report the actual number of selected FD basis vectors for each NZP CSI-RS.

UE can report the selected FD basis vectors for NZP CSI-RS resource s with a bitmap of length NS, for s=0, . . . , S−1, where S is the number of configured NZP CSI-RS resources, and $N_s$ is the number of FD basis candidates (can be explicitly configured via high-layer parameter, or can be implicitly inferred from the number of PMI subbands) for NZP CSI-RS resource s. Each bit field in the bitmap corresponds to a unique FD basis vector candidate that is commonly known to the gNB and the UE. The bitmap for NZP CSI-RS resource s contains $M_s$ ones $$(0 \le M_s \le M_s'),$$

indicating the $M_s$ FD basis vectors selected by the UE. The rest $N_s$–$M_s$ bit fields are all zeros. Denote $M_{max}$ the maximum limit on the total number of orthogonal FD basis vectors selected over all S NZP CSI-RS resources, $$\sum_{s=0}^{S-1} M_s \le M_{max}$$

shall be fulfilled.

The number of FD basis vectors selected by the UE for NZP CSI-RS resource s can be inferred by counting the number of ones in the bit field. In this way, there is no need to signal the number of selected FD basis vectors per NZP CSI-RS explicitly, thereby reducing the encoding/reporting complexity. In addition, the payload stays constant and is therefore more predictable (otherwise payload may vary depending on the actual number of selected FD basis vectors for each NZP CSI-RS).

2.4 Further Description

Figure 12:
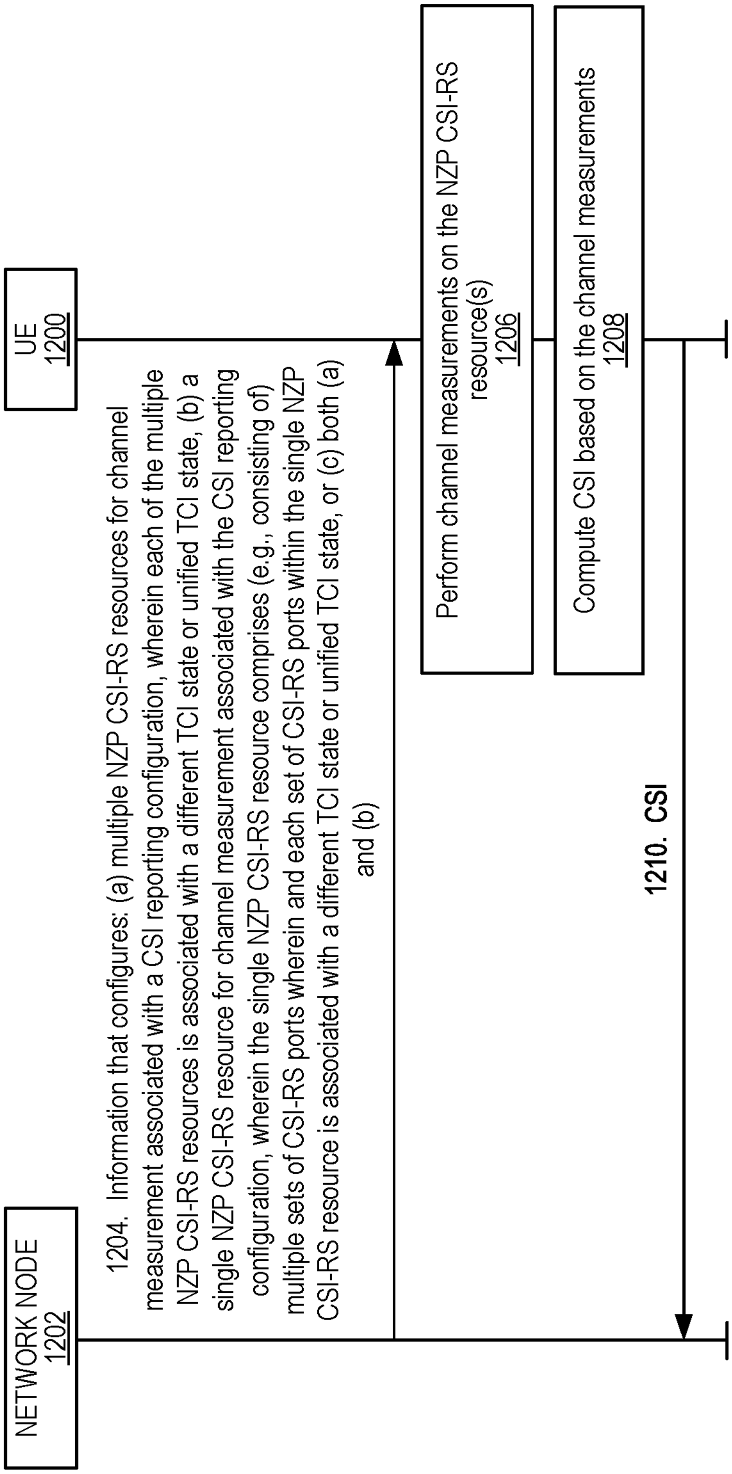
FIG. 12 illustrates the operation of a UE and a network node in accordance with at least some embodiments of the present disclosure.

FIG. 12 illustrates the operation of a UE 1200 and a network node 1202 in accordance with at least some of the embodiments described above.

Step 1204: The UE 1200 receives, from the network node 1202, at least one of the following configurations for channel measurement associated with a CSI reporting configuration:

(a) configuration of multiple NZP CSI-RS resources for channel measurement wherein each of the multiple NZP CSI-RS resources is associated with a different TCI state or unified TCI state (see Section 2.1.1 for detailed embodiments related to this);

(b) configuration of a single NZP CSI-RS resource for channel measurement consisting of multiple sets of CSI-RS ports wherein each set of CSI-RS ports within the single NZP CSI-RS resource is associated with a different TCI state or unified TCI state (See Section 2.1.2 for detailed embodiments related to this); or (c) both (a) and (b).

Step 1206: The UE 1200 performs channel measurements on at least one of:

(i) at least a subset of the configured multiple NZP CSI-RS resources using the respective TCI state or unified TCI state associated with each NZP CSI-RS resource;

(ii) the configured single NZP CSI-RS resource wherein at least a subset of the multiple sets of CSI-RS ports in the single NZP CSI-RS resource are measured using the respective TCI state or unified TCI state associated with each set of CSI-RS ports; or (iii) both (i) and (ii).

Step 1208: The UE 1200 computes CSI using the channel measurements. The computed CSI includes (e.g., in addition to other components such as, e.g., CQI, set of spatial domain basis vectors, a set of selected ports, linear coefficients, and/or the like):

A. an index identifying a starting point of a single window from which orthogonal frequency domain basis vectors corresponding to S>1 NZP CSI-RS channel measurement resources or S>1 sets of CSI-RS ports are selected (See section 2.2.1 and 2.2.2 for details, where Section 2.2.1 covers the case with the same number of FD basis vectors for all resources and Section 2.2.2 covers the case with different number of FD basis vectors for different resources). Note that, in one embodiment, the window index is only reported when the number of PMI subbands N3 is larger than a predefined value. The length of the window can be, e.g., xM, where x>1 is an integer and M is the number of FD basis vectors selected per layer, per NZP CSI-RS channel measurement resource/set of CSI-RS ports. Also note that the index is, in one embodiment, layer common (i.e., the same index applies to all transmission layers).

B. S indices identifying starting points of S windows wherein the orthogonal frequency domain basis vectors corresponding to the $s^{th}$ NZP CSI-RS channel measurement resource/$s^{th}$ set of CSI-RS ports are selected from the $s^{th}$ window (See section 2.2.1 and 2.2.2 for details). Note that, in one embodiment, the window index is only reported when the number of PMI subbands N3 is larger than a predefined value. The length of the window can be, e.g., xM where x>1 is an integer and M is the number of FD basis vectors selected per layer, per NZP CSI-RS channel measurement resource/set of CSI-RS ports. Also note that, in one embodiment, the index is layer common (i.e., same index applies to all transmission layers).

C. S combinatorial indices per layer where the $s^{th}$ combinatorial index is used to select the frequency domain basis vectors corresponding to the $s^{th}$ NZP CSI-RS channel measurement resource/$s^{th}$ set of CSI-RS ports (See section 2.2.1 and 2.2.2 for details). Note that, in one embodiment, when the number of PMI subbands N3 is larger than a predefined threshold, the FD basis vectors for the S NZP CSI-RS channels/S sets of CSI-RS ports may be selected from a single window or S windows. In another embodiment, when the number of PMI subbands N3 is less than a predefined threshold, the FD basis vectors for the S NZP CSI-RS channels/S sets of CSI-RS ports are selected without any intermediate window. In one embodiment, the optimization described below in Section 2.3.2 is applicable.

D. a single combinatorial index per layer is used to select the FD basis vectors corresponding to all S NZP CSI-RS channel measurement resources/S sets of CSI-RS ports (see Section 2.2.3 for details).

E. A combination of any two or more of A-D.

Step 1210: The UE 1200 reports the computed CSI to the network node 1202.

Figure 13:
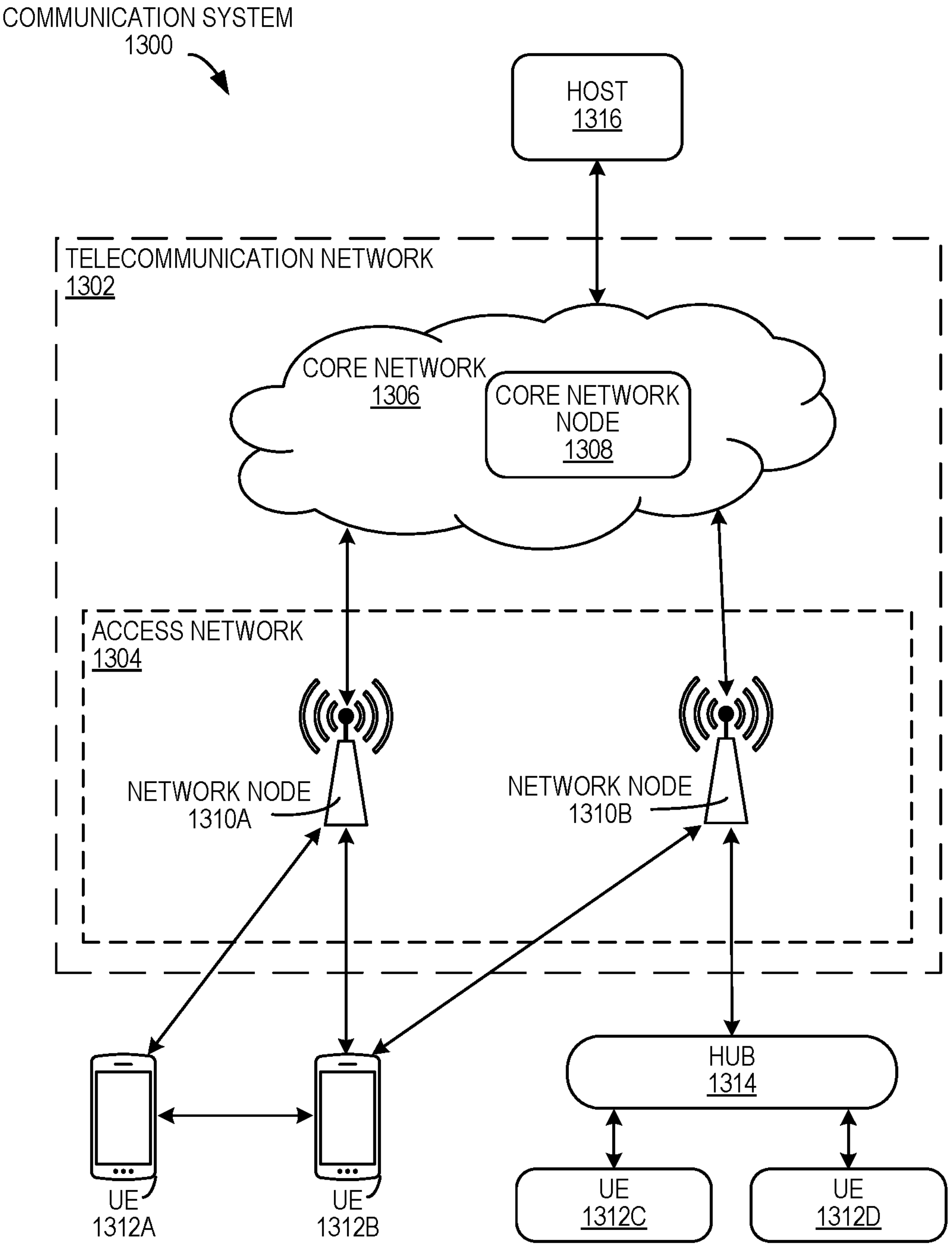
FIG. 13 shows an example of a communication system in which embodiments of the present disclosure may be implemented.

FIG. 13 shows an example of a communication system 1300 in which embodiments of the present disclosure may be implemented.

In the example, the communication system 1300 includes a telecommunication network 1302 that includes an access network 1304, such as a Radio Access Network (RAN), and a core network 1306, which includes one or more core network nodes 1308. The access network 1304 includes one or more access network nodes, such as network nodes 1310A and 1310B (one or more of which may be generally referred to as network nodes 1310), or any other similar Third Generation Partnership Project (3GPP) access node or non-3GPP Access Point (AP). The network nodes 1310 facilitate direct or indirect connection of User Equipment (UE), such as by connecting UEs 1312A, 1312B, 1312C, and 1312D (one or more of which may be generally referred to as UEs 1312) to the core network 1306 over one or more wireless connections. Note that the network node 1202 of FIG. 12 may be, for example, one of the network nodes 1310, and the UE 1200 of FIG. 12 may be one of the UEs 1312.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1300 may include any number of wired or wireless networks, network nodes, UEs, and/or any other components or systems that may facilitate or participate in the communication of data and/or signals whether via wired or wireless connections. The communication system 1300 may include and/or interface with any type of communication, telecommunication, data, cellular, radio network, and/or other similar type of system.

The UEs 1312 may be any of a wide variety of communication devices, including wireless devices arranged, configured, and/or operable to communicate wirelessly with the network nodes 1310 and other communication devices. Similarly, the network nodes 1310 are arranged, capable, configured, and/or operable to communicate directly or indirectly with the UEs 1312 and/or with other network nodes or equipment in the telecommunication network 1302 to enable and/or provide network access, such as wireless network access, and/or to perform other functions, such as administration in the telecommunication network 1302.

In the depicted example, the core network 1306 connects the network nodes 1310 to one or more hosts, such as host 1316. These connections may be direct or indirect via one or more intermediary networks or devices. In other examples, network nodes may be directly coupled to hosts. The core network 1306 includes one more core network nodes (e.g., core network node 1308) that are structured with hardware and software components. Features of these components may be substantially similar to those described with respect to the UEs, network nodes, and/or hosts, such that the descriptions thereof are generally applicable to the corresponding components of the core network node 1308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-Concealing Function (SIDF), Unified Data Management (UDM), Security Edge Protection Proxy (SEPP), Network Exposure Function (NEF), and/or a User Plane Function (UPF).

The host 1316 may be under the ownership or control of a service provider other than an operator or provider of the access network 1304 and/or the telecommunication network 1302, and may be operated by the service provider or on behalf of the service provider. The host 1316 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1300 of FIG. 13 enables connectivity between the UEs, network nodes, and hosts. In that sense, the communication system 1300 may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable Second, Third, Fourth, or Fifth Generation (2G, 3G, 4G, or 5G) standards, or any applicable future generation standard (e.g., Sixth Generation (6G)); Wireless Local Area Network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any Low Power Wide Area Network (LPWAN) standards such as LoRa and Sigfox.

In some examples, the telecommunication network 1302 is a cellular network that implements 3GPP standardized features. Accordingly, the telecommunication network 1302 may support network slicing to provide different logical networks to different devices that are connected to the telecommunication network 1302. For example, the telecommunication network 1302 may provide Ultra Reliable Low Latency Communication (URLLC) services to some UEs, while providing enhanced Mobile Broadband (eMBB) services to other UEs, and/or massive Machine Type Communication (mMTC)/massive Internet of Things (IoT) services to yet further UEs.

In some examples, the UEs 1312 are configured to transmit and/or receive information without direct human interaction. For instance, a UE may be designed to transmit information to the access network 1304 on a predetermined schedule, when triggered by an internal or external event, or in response to requests from the access network 1304. Additionally, a UE may be configured for operating in single- or multi-Radio Access Technology (RAT) or multi-standard mode. For example, a UE may operate with any one or combination of WiFi, New Radio (NR), and LTE, i.e. be configured for Multi-Radio Dual Connectivity (MR-DC), such as Evolved UMTS Terrestrial RAN (E-UTRAN) NR-Dual Connectivity (EN-DC).

In the example, a hub 1314 communicates with the access network 1304 to facilitate indirect communication between one or more UEs (e.g., UE 1312C and/or 1312D) and network nodes (e.g., network node 1310B). In some examples, the hub 1314 may be a controller, router, content source and analytics, or any of the other communication devices described herein regarding UEs. For example, the hub 1314 may be a broadband router enabling access to the core network 1306 for the UEs. As another example, the hub 1314 may be a controller that sends commands or instructions to one or more actuators in the UEs. Commands or instructions may be received from the UEs, network nodes 1310, or by executable code, script, process, or other instructions in the hub 1314. As another example, the hub 1314 may be a data collector that acts as temporary storage for UE data and, in some embodiments, may perform analysis or other processing of the data. As another example, the hub 1314 may be a content source. For example, for a UE that is a Virtual Reality (VR) headset, display, loudspeaker or other media delivery device, the hub 1314 may retrieve VR assets, video, audio, or other media or data related to sensory information via a network node, which the hub 1314 then provides to the UE either directly, after performing local processing, and/or after adding additional local content. In still another example, the hub 1314 acts as a proxy server or orchestrator for the UEs, in particular in if one or more of the UEs are low energy IoT devices.

The hub 1314 may have a constant/persistent or intermittent connection to the network node 1310B. The hub 1314 may also allow for a different communication scheme and/or schedule between the hub 1314 and UEs (e.g., UE 1312C and/or 1312D), and between the hub 1314 and the core network 1306. In other examples, the hub 1314 is connected to the core network 1306 and/or one or more UEs via a wired connection. Moreover, the hub 1314 may be configured to connect to a Machine-to-Machine (M2M) service provider over the access network 1304 and/or to another UE over a direct connection. In some scenarios, UEs may establish a wireless connection with the network nodes 1310 while still connected via the hub 1314 via a wired or wireless connection. In some embodiments, the hub 1314 may be a dedicated hub—that is, a hub whose primary function is to route communications to/from the UEs from/to the network node 1310B. In other embodiments, the hub 1314 may be a non-dedicated hub—that is, a device which is capable of operating to route communications between the UEs and the network node 1310B, but which is additionally capable of operating as a communication start and/or end point for certain data channels.

Figure 14:
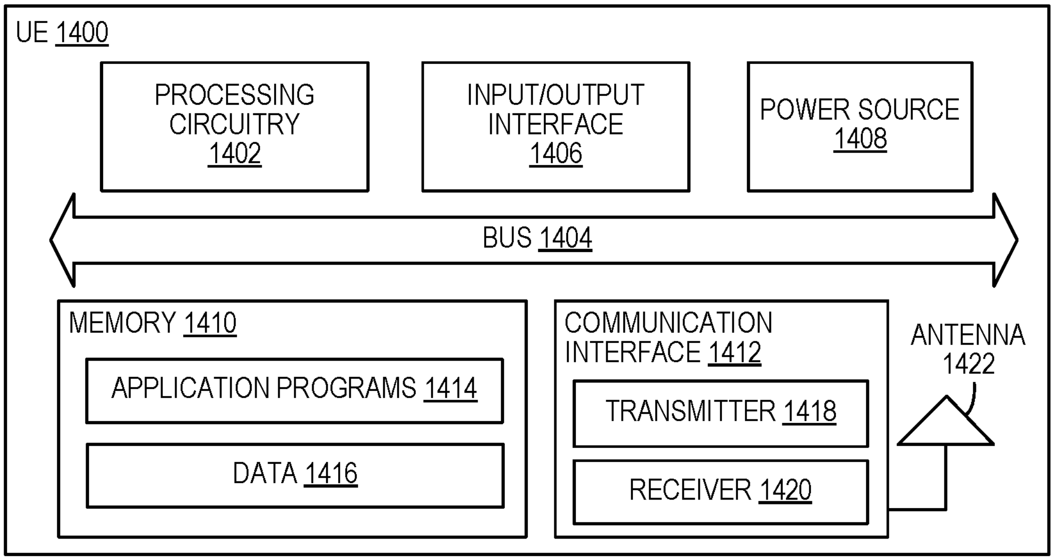
FIG. 14 shows a UE in accordance with some embodiments.

FIG. 14 shows a UE 1400 in accordance with some embodiments. As used herein, a UE refers to a device capable, configured, arranged, and/or operable to communicate wirelessly with network nodes and/or other UEs. Examples of a UE include, but are not limited to, a smart phone, mobile phone, cell phone, Voice over Internet Protocol (VoIP) phone, wireless local loop phone, desktop computer, Personal Digital Assistant (PDA), wireless camera, gaming console or device, music storage device, playback appliance, wearable terminal device, wireless endpoint, mobile station, tablet, laptop, Laptop Embedded Equipment (LEE), Laptop Mounted Equipment (LME), smart device, wireless Customer Premise Equipment (CPE), vehicle-mounted or vehicle embedded/integrated wireless device, etc. Other examples include any UE identified by the 3GPP, including a Narrowband Internet of Things (NB-IoT) UE, a Machine Type Communication (MTC) UE, and/or an enhanced MTC (eMTC) UE.

A UE may support Device-to-Device (D2D) communication, for example by implementing a 3GPP standard for sidelink communication, Dedicated Short-Range Communication (DSRC), Vehicle-to-Vehicle (V2V), Vehicle-to-Infrastructure (V2I), or Vehicle-to-Everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1400 includes processing circuitry 1402 that is operatively coupled via a bus 1404 to an input/output interface 1406, a power source 1408, memory 1410, a communication interface 1412, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry 1402 is configured to process instructions and data and may be configured to implement any sequential state machine operative to execute instructions stored as machine-readable computer programs in the memory 1410. The processing circuitry 1402 may be implemented as one or more hardware-implemented state machines (e.g., in discrete logic, Field Programmable Gate Arrays (FPGAs), Application Specific Integrated Circuits (ASICs), etc.); programmable logic together with appropriate firmware; one or more stored computer programs, general purpose processors, such as a microprocessor or Digital Signal Processor (DSP), together with appropriate software; or any combination of the above. For example, the processing circuitry 1402 may include multiple Central Processing Units (CPUs).

In the example, the input/output interface 1406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1408 is structured as a battery or battery pack. Other types of power sources, such as an external power source (e.g., an electricity outlet), photovoltaic device, or power cell, may be used. The power source 1408 may further include power circuitry for delivering power from the power source 1408 itself, and/or an external power source, to the various parts of the UE 1400 via input circuitry or an interface such as an electrical power cable. Delivering power may be, for example, for charging the power source 1408. Power circuitry may perform any formatting, converting, or other modification to the power from the power source 1408 to make the power suitable for the respective components of the UE 1400 to which power is supplied.

The memory 1410 may be or be configured to include memory such as Random Access Memory (RAM), Read Only Memory (ROM), Programmable ROM (PROM), Erasable PROM (EPROM), Electrically EPROM (EEPROM), magnetic disks, optical disks, hard disks, removable cartridges, flash drives, and so forth. In one example, the memory 1410 includes one or more application programs 1414, such as an operating system, web browser application, a widget, gadget engine, or other application, and corresponding data 1416. The memory 1410 may store, for use by the UE 1400, any of a variety of various operating systems or combinations of operating systems.

The memory 1410 may be configured to include a number of physical drive units, such as Redundant Array of Independent Disks (RAID), flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a tamper resistant module in the form of a Universal Integrated Circuit Card (UICC) including one or more Subscriber Identity Modules (SIMs), such as a Universal SIM (USIM) and/or Internet Protocol Multimedia Services Identity Module (ISIM), other memory, or any combination thereof. The UICC may for example be an embedded UICC (eUICC), integrated UICC (iUICC) or a removable UICC commonly known as a 'SIM card.' The memory 1410 may allow the UE 1400 to access instructions, application programs, and the like stored on transitory or non-transitory memory media, to off-load data, or to upload data. An article of manufacture, such as one utilizing a communication system, may be tangibly embodied as or in the memory 1410, which may be or comprise a device-readable storage medium.

The processing circuitry 1402 may be configured to communicate with an access network or other network using the communication interface 1412. The communication interface 1412 may comprise one or more communication subsystems and may include or be communicatively coupled to an antenna 1422. The communication interface 1412 may include one or more transceivers used to communicate, such as by communicating with one or more remote transceivers of another device capable of wireless communication (e.g., another UE or a network node in an access network). Each transceiver may include a transmitter 1418 and/or a receiver 1420 appropriate to provide network communications (e.g., optical, electrical, frequency allocations, and so forth). Moreover, the transmitter 1418 and receiver 1420 may be coupled to one or more antennas (e.g., the antenna 1422) and may share circuit components, software, or firmware, or alternatively be implemented separately.

In the illustrated embodiment, communication functions of the communication interface 1412 may include cellular communication, WiFi communication, LPWAN communication, data communication, voice communication, multimedia communication, short-range communications such as Bluetooth, NFC, location-based communication such as the use of the Global Positioning System (GPS) to determine a location, another like communication function, or any combination thereof. Communications may be implemented according to one or more communication protocols and/or standards, such as IEEE 802.11, Code Division Multiplexing Access (CDMA), Wideband CDMA (WCDMA), GSM, LTE, NR, UMTS, WiMax, Ethernet, Transmission Control Protocol/Internet Protocol (TCP/IP), Synchronous Optical Networking (SONET), Asynchronous Transfer Mode (ATM), Quick User Datagram Protocol Internet Connection (QUIC), Hypertext Transfer Protocol (HTTP), and so forth.

Regardless of the type of sensor, a UE may provide an output of data captured by its sensors, through its communication interface 1412, or via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application, and healthcare. Non-limiting examples of such an IoT device are a device which is or which is embedded in: a connected refrigerator or freezer, a television, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or VR, a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1400 shown in FIG. 14.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship, an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator and handle communication of data for both the speed sensor and the actuators.

Figure 15:
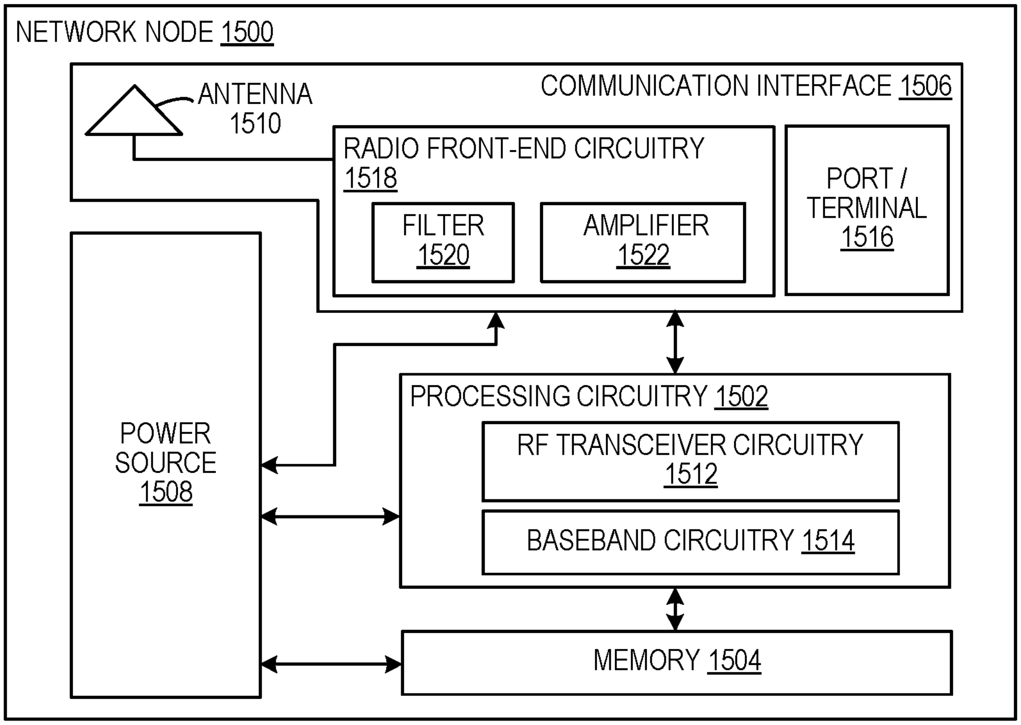
FIG. 15 shows a network node in accordance with some embodiments.

FIG. 15 shows a network node 1500 in accordance with some embodiments. As used herein, network node refers to equipment capable, configured, arranged, and/or operable to communicate directly or indirectly with a UE and/or with other network nodes or equipment in a telecommunication network. Examples of network nodes include, but are not limited to, APs (e.g., radio APs), Base Stations (BSs) (e.g., radio BSs, Node Bs, evolved Node Bs (eNBs), and NR Node Bs (gNBs)).

BSs may be categorized based on the amount of coverage they provide (or, stated differently, their transmit power level) and so, depending on the provided amount of coverage, may be referred to as femto BSs, pico BSs, micro BSs, or macro BSs. A BS may be a relay node or a relay donor node controlling a relay. A network node may also include one or more (or all) parts of a distributed radio BS such as centralized digital units and/or Remote Radio Units (RRUs), sometimes referred to as Remote Radio Heads (RRHs). Such RRUs may or may not be integrated with an antenna as an antenna integrated radio. Parts of a distributed radio BS may also be referred to as nodes in a Distributed Antenna System (DAS).

Other examples of network nodes include multiple Transmission Point (multi-TRP) 5G access nodes, Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1500 includes processing circuitry 1502, memory 1504, a communication interface 1506, and a power source 1508. The network node 1500 may be composed of multiple physically separate components (e.g., a Node B component and an RNC component, or a BTS component and a BSC component, etc.), which may each have their own respective components. In certain scenarios in which the network node 1500 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1500 may be configured to support multiple RATs. In such embodiments, some components may be duplicated (e.g., separate memory 1504 for different RATs) and some components may be reused (e.g., an antenna 1510 may be shared by different RATs). The network node 1500 may also include multiple sets of the various illustrated components for different wireless technologies integrated into network node 1500, for example GSM, WCDMA, LTE, NR, WiFi, Zigbee, Z-wave, Long Range Wide Area Network (LoRaWAN), Radio Frequency Identification (RFID), or Bluetooth wireless technologies. These wireless technologies may be integrated into the same or different chip or set of chips and other components within the network node 1500.

The processing circuitry 1502 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other network node 1500 components, such as the memory 1504, to provide network node 1500 functionality.

In some embodiments, the processing circuitry 1502 includes a System on a Chip (SOC). In some embodiments, the processing circuitry 1502 includes one or more of Radio Frequency (RF) transceiver circuitry 1512 and baseband processing circuitry 1514. In some embodiments, the RF transceiver circuitry 1512 and the baseband processing circuitry 1514 may be on separate chips (or sets of chips), boards, or units, such as radio units and digital units. In alternative embodiments, part or all of the RF transceiver circuitry 1512 and the baseband processing circuitry 1514 may be on the same chip or set of chips, boards, or units.

The memory 1504 may comprise any form of volatile or non-volatile computer-readable memory including, without limitation, persistent storage, solid state memory, remotely mounted memory, magnetic media, optical media, RAM, ROM, mass storage media (for example, a hard disk), removable storage media (for example, a flash drive, a Compact Disk (CD), or a Digital Video Disk (DVD)), and/or any other volatile or non-volatile, non-transitory device-readable, and/or computer-executable memory devices that store information, data, and/or instructions that may be used by the processing circuitry 1502. The memory 1504 may store any suitable instructions, data, or information, including a computer program, software, an application including one or more of logic, rules, code, tables, and/or other instructions capable of being executed by the processing circuitry 1502 and utilized by the network node 1500. The memory 1504 may be used to store any calculations made by the processing circuitry 1502 and/or any data received via the communication interface 1506. In some embodiments, the processing circuitry 1502 and the memory 1504 are integrated.

The communication interface 1506 is used in wired or wireless communication of signaling and/or data between a network node, access network, and/or UE. As illustrated, the communication interface 1506 comprises port(s)/terminal(s) 1516 to send and receive data, for example to and from a network over a wired connection. The communication interface 1506 also includes radio front-end circuitry 1518 that may be coupled to, or in certain embodiments a part of, the antenna 1510. The radio front-end circuitry 1518 comprises filters 1520 and amplifiers 1522. The radio front-end circuitry 1518 may be connected to the antenna 1510 and the processing circuitry 1502. The radio front-end circuitry 1518 may be configured to condition signals communicated between the antenna 1510 and the processing circuitry 1502. The radio front-end circuitry 1518 may receive digital data that is to be sent out to other network nodes or UEs via a wireless connection. The radio front-end circuitry 1518 may convert the digital data into a radio signal having the appropriate channel and bandwidth parameters using a combination of the filters 1520 and/or the amplifiers 1522. The radio signal may then be transmitted via the antenna 1510. Similarly, when receiving data, the antenna 1510 may collect radio signals which are then converted into digital data by the radio front-end circuitry 1518. The digital data may be passed to the processing circuitry 1502. In other embodiments, the communication interface 1506 may comprise different components and/or different combinations of components.

In certain alternative embodiments, the network node 1500 does not include separate radio front-end circuitry 1518; instead, the processing circuitry 1502 includes radio front-end circuitry and is connected to the antenna 1510. Similarly, in some embodiments, all or some of the RF transceiver circuitry 1512 is part of the communication interface 1506. In still other embodiments, the communication interface 1506 includes the one or more ports or terminals 1516, the radio front-end circuitry 1518, and the RF transceiver circuitry 1512 as part of a radio unit (not shown), and the communication interface 1506 communicates with the baseband processing circuitry 1514, which is part of a digital unit (not shown).

The antenna 1510 may include one or more antennas, or antenna arrays, configured to send and/or receive wireless signals. The antenna 1510 may be coupled to the radio front-end circuitry 1518 and may be any type of antenna capable of transmitting and receiving data and/or signals wirelessly. In certain embodiments, the antenna 1510 is separate from the network node 1500 and connectable to the network node 1500 through an interface or port.

The antenna 1510, the communication interface 1506, and/or the processing circuitry 1502 may be configured to perform any receiving operations and/or certain obtaining operations described herein as being performed by the network node 1500. Any information, data, and/or signals may be received from a UE, another network node, and/or any other network equipment. Similarly, the antenna 1510, the communication interface 1506, and/or the processing circuitry 1502 may be configured to perform any transmitting operations described herein as being performed by the network node 1500. Any information, data, and/or signals may be transmitted to a UE, another network node, and/or any other network equipment.

The power source 1508 provides power to the various components of the network node 1500 in a form suitable for the respective components (e.g., at a voltage and current level needed for each respective component). The power source 1508 may further comprise, or be coupled to, power management circuitry to supply the components of the network node 1500 with power for performing the functionality described herein. For example, the network node 1500 may be connectable to an external power source (e.g., the power grid or an electricity outlet) via input circuitry or an interface such as an electrical cable, whereby the external power source supplies power to power circuitry of the power source 1508. As a further example, the power source 1508 may comprise a source of power in the form of a battery or battery pack which is connected to, or integrated in, power circuitry. The battery may provide backup power should the external power source fail.

Embodiments of the network node 1500 may include additional components beyond those shown in FIG. 15 for providing certain aspects of the network node's functionality, including any of the functionality described herein and/or any functionality necessary to support the subject matter described herein. For example, the network node 1500 may include user interface equipment to allow input of information into the network node 1500 and to allow output of information from the network node 1500. This may allow a user to perform diagnostic, maintenance, repair, and other administrative functions for the network node 1500.

Figure 16:
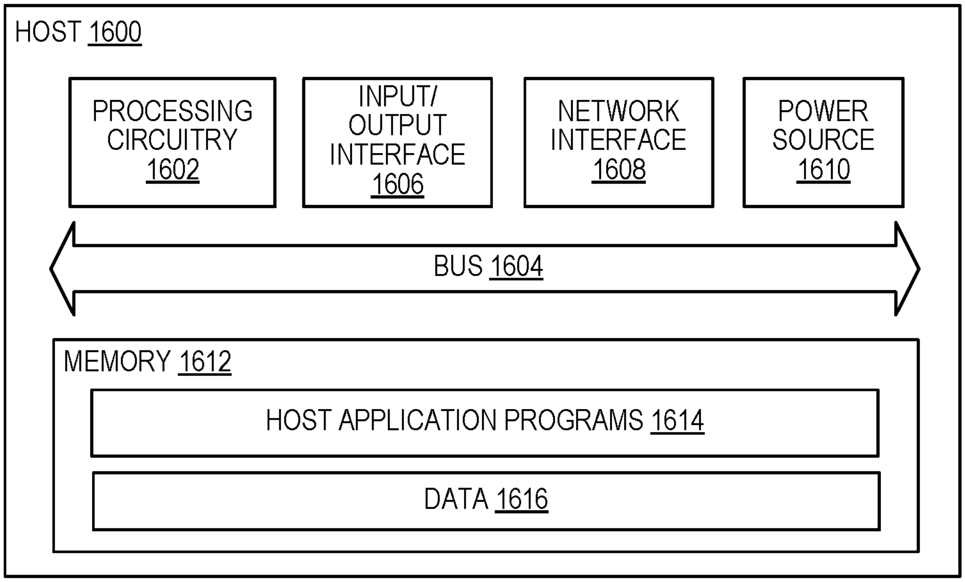
FIG. 16 is a block diagram of a host, which may be an embodiment of the host of FIG. 13, in accordance with various aspects described herein.

FIG. 16 is a block diagram of a host 1600, which may be an embodiment of the host 1316 of FIG. 13, in accordance with various aspects described herein. As used herein, the host 1600 may be or comprise various combinations of hardware and/or software including a standalone server, a blade server, a cloud-implemented server, a distributed server, a virtual machine, container, or processing resources in a server farm. The host 1600 may provide one or more services to one or more UEs.

The host 1600 includes processing circuitry 1602 that is operatively coupled via a bus 1604 to an input/output interface 1606, a network interface 1608, a power source 1610, and memory 1612. Other components may be included in other embodiments. Features of these components may be substantially similar to those described with respect to the devices of previous figures, such as FIGS. 14 and 15, such that the descriptions thereof are generally applicable to the corresponding components of the host 1600.

The memory 1612 may include one or more computer programs including one or more host application programs 1614 and data 1616, which may include user data, e.g. data generated by a UE for the host 1600 or data generated by the host 1600 for a UE. Embodiments of the host 1600 may utilize only a subset or all of the components shown. The host application programs 1614 may be implemented in a container-based architecture and may provide support for video codecs (e.g., Versatile Video Coding (VVC), High Efficiency Video Coding (HEVC), Advanced Video Coding (AVC), Moving Picture Experts Group (MPEG), VP9) and audio codecs (e.g., Free Lossless Audio Codec (FLAC), Advanced Audio Coding (AAC), MPEG, G.711), including transcoding for multiple different classes, types, or implementations of UEs (e.g., handsets, desktop computers, wearable display systems, and heads-up display systems). The host application programs 1614 may also provide for user authentication and licensing checks and may periodically report health, routes, and content availability to a central node, such as a device in or on the edge of a core network. Accordingly, the host 1600 may select and/or indicate a different host for Over-The-Top (OTT) services for a UE. The host application programs 1614 may support various protocols, such as the HTTP Live Streaming (HLS) protocol, Real-Time Messaging Protocol (RTMP), Real-Time Streaming Protocol (RTSP), Dynamic Adaptive Streaming over HTTP (DASH or MPEG-DASH), etc.

Figure 17:
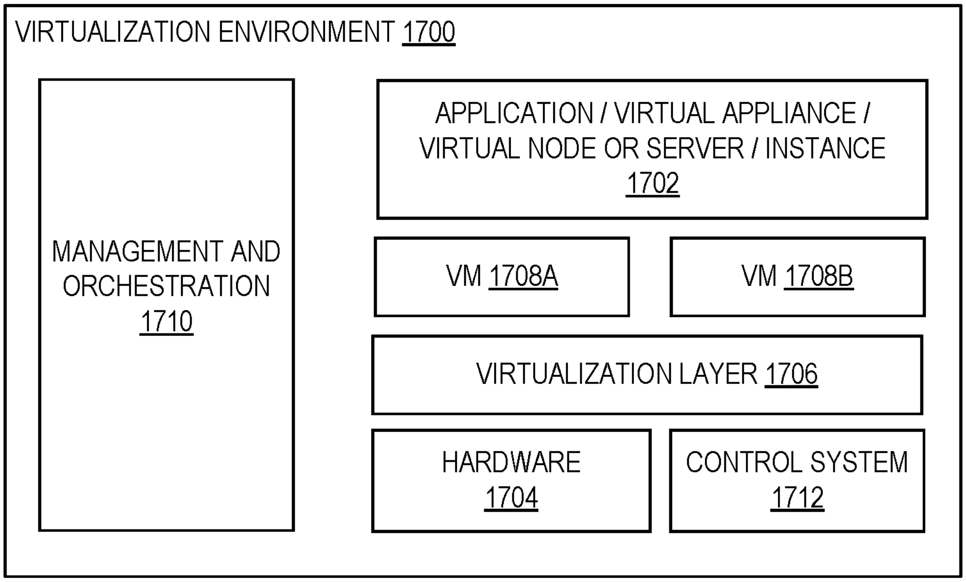
FIG. 17 is a block diagram illustrating a virtualization environment in which functions implemented by some embodiments may be virtualized.

FIG. 17 is a block diagram illustrating a virtualization environment 1700 in which functions implemented by some embodiments may be virtualized. In the present context, virtualizing means creating virtual versions of apparatuses or devices which may include virtualizing hardware platforms, storage devices, and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more Virtual Machines (VMs) implemented in one or more virtual environments 1700 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1702 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1704 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1706 (also referred to as hypervisors or VM Monitors (VMMs)), provide VMs 1708A and 1708B (one or more of which may be generally referred to as VMs 1708), and/or perform any of the functions, features, and/or benefits described in relation with some embodiments described herein. The virtualization layer 1706 may present a virtual operating platform that appears like networking hardware to the VMs 1708.

The VMs 1708 comprise virtual processing, virtual memory, virtual networking, or interface and virtual storage, and may be run by a corresponding virtualization layer 1706. Different embodiments of the instance of a virtual appliance 1702 may be implemented on one or more of the VMs 1708, and the implementations may be made in different ways. Virtualization of the hardware is in some contexts referred to as Network Function Virtualization (NFV). NFV may be used to consolidate many network equipment types onto industry standard high volume server hardware, physical switches, and physical storage, which can be located in data centers and customer premise equipment.

In the context of NFV, a VM 1708 may be a software implementation of a physical machine that runs programs as if they were executing on a physical, non-virtualized machine. Each of the VMs 1708, and that part of the hardware 1704 that executes that VM, be it hardware dedicated to that VM and/or hardware shared by that VM with others of the VMs 1708, forms separate virtual network elements. Still in the context of NFV, a virtual network function is responsible for handling specific network functions that run in one or more VMs 1708 on top of the hardware 1704 and corresponds to the application 1702.

The hardware 1704 may be implemented in a standalone network node with generic or specific components. The hardware 1704 may implement some functions via virtualization. Alternatively, the hardware 1704 may be part of a larger cluster of hardware (e.g., such as in a data center or CPE) where many hardware nodes work together and are managed via management and orchestration 1710, which, among others, oversees lifecycle management of the applications 1702. In some embodiments, the hardware 1704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a RAN or a BS. In some embodiments, some signaling can be provided with the use of a control system 1712 which may alternatively be used for communication between hardware nodes and radio units.

Figure 18:
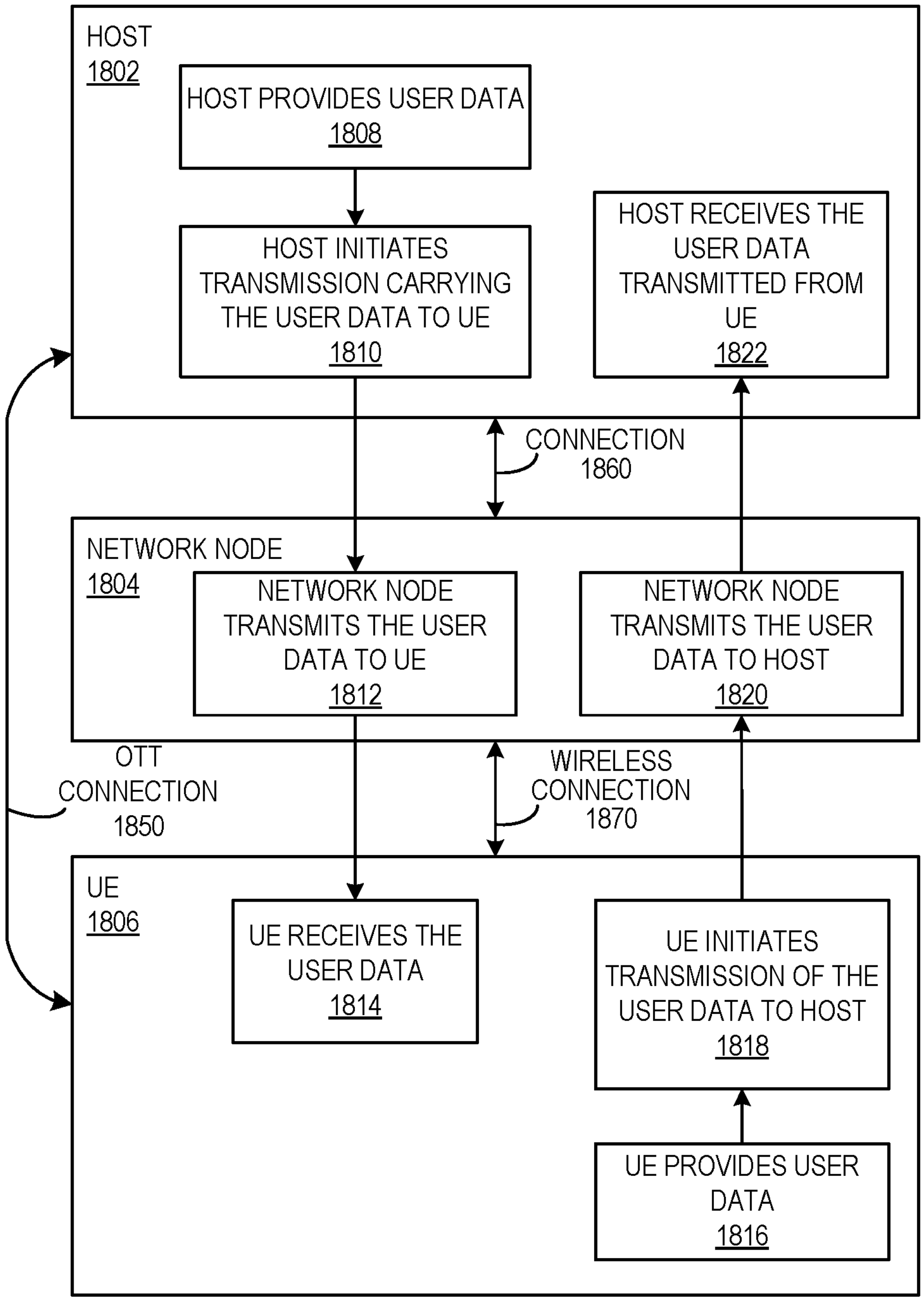
FIG. 18 shows a communication diagram of a host communicating via a network node with a UE over a partially wireless connection in accordance with some embodiments.

FIG. 18 shows a communication diagram of a host 1802 communicating via a network node 1804 with a UE 1806 over a partially wireless connection in accordance with some embodiments. Example implementations, in accordance with various embodiments, of the UE (such as the UE 1312A of FIG. 13 and/or the UE 1400 of FIG. 14), the network node (such as the network node 1310A of FIG. 13 and/or the network node 1500 of FIG. 15), and the host (such as the host 1316 of FIG. 13 and/or the host 1600 of FIG. 16) discussed in the preceding paragraphs will now be described with reference to FIG. 18.

Like the host 1600, embodiments of the host 1802 include hardware, such as a communication interface, processing circuitry, and memory. The host 1802 also includes software, which is stored in or is accessible by the host 1802 and executable by the processing circuitry. The software includes a host application that may be operable to provide a service to a remote user, such as the UE 1806 connecting via an OTT connection 1850 extending between the UE 1806 and the host 1802. In providing the service to the remote user, a host application may provide user data which is transmitted using the OTT connection 1850.

The network node 1804 includes hardware enabling it to communicate with the host 1802 and the UE 1806 via a connection 1860. The connection 1860 may be direct or pass through a core network (like the core network 1306 of FIG. 13) and/or one or more other intermediate networks, such as one or more public, private, or hosted networks. For example, an intermediate network may be a backbone network or the Internet.

The UE 1806 includes hardware and software, which is stored in or accessible by the UE 1806 and executable by the UE's processing circuitry. The software includes a client application, such as a web browser or operator-specific "app" that may be operable to provide a service to a human or non-human user via the UE 1806 with the support of the host 1802. In the host 1802, an executing host application may communicate with the executing client application via the OTT connection 1850 terminating at the UE 1806 and the host 1802. In providing the service to the user, the UE's client application may receive request data from the host's host application and provide user data in response to the request data. The OTT connection 1850 may transfer both the request data and the user data. The UE's client application may interact with the user to generate the user data that it provides to the host application through the OTT connection 1850.

The OTT connection 1850 may extend via the connection 1860 between the host 1802 and the network node 1804 and via a wireless connection 1870 between the network node 1804 and the UE 1806 to provide the connection between the host 1802 and the UE 1806. The connection 1860 and the wireless connection 1870, over which the OTT connection 1850 may be provided, have been drawn abstractly to illustrate the communication between the host 1802 and the UE 1806 via the network node 1804, without explicit reference to any intermediary devices and the precise routing of messages via these devices.

As an example of transmitting data via the OTT connection 1850, in step 1808, the host 1802 provides user data, which may be performed by executing a host application. In some embodiments, the user data is associated with a particular human user interacting with the UE 1806. In other embodiments, the user data is associated with a UE 1806 that shares data with the host 1802 without explicit human interaction. In step 1810, the host 1802 initiates a transmission carrying the user data towards the UE 1806. The host 1802 may initiate the transmission responsive to a request transmitted by the UE 1806. The request may be caused by human interaction with the UE 1806 or by operation of the client application executing on the UE 1806. The transmission may pass via the network node 1804 in accordance with the teachings of the embodiments described throughout this disclosure. Accordingly, in step 1812, the network node 1804 transmits to the UE 1806 the user data that was carried in the transmission that the host 1802 initiated, in accordance with the teachings of the embodiments described throughout this disclosure. In step 1814, the UE 1806 receives the user data carried in the transmission, which may be performed by a client application executed on the UE 1806 associated with the host application executed by the host 1802.

In some examples, the UE 1806 executes a client application which provides user data to the host 1802. The user data may be provided in reaction or response to the data received from the host 1802. Accordingly, in step 1816, the UE 1806 may provide user data, which may be performed by executing the client application. In providing the user data, the client application may further consider user input received from the user via an input/output interface of the UE 1806. Regardless of the specific manner in which the user data was provided, the UE 1806 initiates, in step 1818, transmission of the user data towards the host 1802 via the network node 1804. In step 1820, in accordance with the teachings of the embodiments described throughout this disclosure, the network node 1804 receives user data from the UE 1806 and initiates transmission of the received user data towards the host 1802. In step 1822, the host 1802 receives the user data carried in the transmission initiated by the UE 1806.

One or more of the various embodiments improve the performance of OTT services provided to the UE 1806 using the OTT connection 1850, in which the wireless connection 1870 forms the last segment.

In an example scenario, factory status information may be collected and analyzed by the host 1802. As another example, the host 1802 may process audio and video data which may have been retrieved from a UE for use in creating maps. As another example, the host 1802 may collect and analyze real-time data to assist in controlling vehicle congestion (e.g., controlling traffic lights). As another example, the host 1802 may store surveillance video uploaded by a UE. As another example, the host 1802 may store or control access to media content such as video, audio, VR, or AR which it can broadcast, multicast, or unicast to UEs. As other examples, the host 1802 may be used for energy pricing, remote control of non-time critical electrical load to balance power generation needs, location services, presentation services (such as compiling diagrams etc. from data collected from remote devices), or any other function of collecting, retrieving, storing, analyzing, and/or transmitting data.

In some examples, a measurement procedure may be provided for the purpose of monitoring data rate, latency, and other factors on which the one or more embodiments improve. There may further be an optional network functionality for reconfiguring the OTT connection 1850 between the host 1802 and the UE 1806 in response to variations in the measurement results. The measurement procedure and/or the network functionality for reconfiguring the OTT connection 1850 may be implemented in software and hardware of the host 1802 and/or the UE 1806. In some embodiments, sensors (not shown) may be deployed in or in association with other devices through which the OTT connection 1850 passes; the sensors may participate in the measurement procedure by supplying values of the monitored quantities exemplified above, or by supplying values of other physical quantities from which software may compute or estimate the monitored quantities. The reconfiguring of the OTT connection 1850 may include message format, retransmission settings, preferred routing, etc.; the reconfiguring need not directly alter the operation of the network node 1804. Such procedures and functionalities may be known and practiced in the art. In certain embodiments, measurements may involve proprietary UE signaling that facilitates measurements of throughput, propagation times, latency, and the like by the host 1802. The measurements may be implemented in that software causes messages to be transmitted, in particular empty or 'dummy' messages, using the OTT connection 1850 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining, or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box or nested within multiple boxes, in practice computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hardwired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole and/or by end users and a wireless network generally.

Some example embodiments of the present disclosure are as follows:

Group A Embodiments

Embodiment 1: A method performed by a user equipment, UE, (1200), the method comprising one or more of the following steps:

- receiving (1204), from a network node (1202), information that configures the UE (1200) with:
  - (a) multiple NZP CSI-RS resources for channel measurement associated with a CSI reporting configuration, where each of the multiple NZP CSI-RS resources is associated with a different TCI state or unified TCI state; or
  - (b) a single NZP CSI-RS resource for channel measurement associated with the CSI reporting configuration, the single NZP CSI-RS resource comprising (e.g., consisting of) multiple sets of CSI-RS ports wherein each set of CSI-RS ports within the single NZP CSI-RS resource is associated with a different TCI state or unified TCI state; or
  - (c) both (a) and (b);
- performing (1206) channel measurement on:
  - (i) at least a subset of the configured multiple NZP CSI-RS resources using the respective TCI states or unified TCI state; or
  - (ii) the configured single NZP CSI-RS resource wherein at least a subset of the multiple sets of CSI-RS ports in the single NZP CSI-RS resource are measured using the respective TCI states or unified TCI state; or
  - (iii) both (i) and (ii);
- computing (1208) CSI based on the channel measurements, the computed CSI comprising:
  - A. an index identifying a starting point of a single window from which orthogonal frequency domain basis vectors corresponding to S>1 NZP CSI-RS channel measurement resources or S>1 sets of CSI-RS ports are selected, or
  - B. S indices identifying starting points of S windows wherein orthogonal frequency domain basis vectors corresponding to the $s^{th}$ NZP CSI-RS channel measurement resource or $s^{th}$ set of CSI-RS ports are selected from the $s^{th}$ window, or
  - C. S combinatorial indices per layer where the $s^{th}$ combinatorial index is used to select frequency domain basis vectors corresponding to the $s^{th}$ NZP CSI-RS channel measurement resource or $s^{th}$ set of CSI-RS ports; or
  - D. a single combinatorial index per layer used to select frequency domain basis vectors corresponding to all S NZP CSI-RS channel measurement resources or S sets of CSI-RS ports; or E. a combination of any two or more of A-D; and reporting (1210) the computed CSI.

Embodiment 2: The method of embodiment 1 wherein the same number of frequency domain basis vectors are selected for all measured channels (e.g., for all S>1 NZP CSI-RS channel measurement resources or S>1 sets of CSI-RS ports).

Embodiment 3: The method of embodiment 1 wherein different numbers of frequency domain basis vectors are selected for at least some of measured channels (e.g., for at least some of the S>1 NZP CSI-RS channel measurement resources or at least some of the S>1 sets of CSI-RS ports).

Embodiment 4: The method of any of embodiments 1 to 3 wherein the computed CSI comprises an index identifying a starting point of a single window from which orthogonal frequency domain basis vectors corresponding to S>1 NZP CSI-RS channel measurement resources or S>1 sets of CSI-RS ports are selected.

Embodiment 5: The method of embodiment 4 wherein the index identifying the starting point of the single window is only reported when the number of PMI subbands is larger than a predefined value.

Embodiment 6: The method of embodiment 4 or 5 wherein a length of the single window is xM, where x>1 is an integer and M is the number of frequency domain basis vectors selected per layer per NZP CSI-RS resource or set of CSI-RS ports.

Embodiment 7: The method of any of embodiments 4 to 6 wherein the index is layer common.

Embodiment 8: The method of any of embodiments 1 to 3 wherein the computed CSI comprises S indices identifying starting points of S windows wherein orthogonal frequency domain basis vectors corresponding to the $s^{th}$ NZP CSI-RS channel measurement resource or $s^{th}$ set of CSI-RS ports are selected from the $s^{th}$ window.

Embodiment 9: The method of embodiment 8 wherein the S indices identifying starting points of S windows are only reported when the number of PMI subbands is larger than a predefined value.

Embodiment 10: The method of any of embodiments 1 to 3 wherein the computed CSI comprises S combinatorial indices per layer where the $s^{th}$ combinatorial index is used to select frequency domain basis vectors corresponding to the $s^{th}$ NZP CSI-RS channel measurement resource or $s^{th}$ set of CSI-RS ports.

Embodiment 11: The method of embodiment 10 wherein the frequency domain basis vectors for the S NZP CSI-RS channels or S sets of CSI-RS ports are selected from a single window or S windows when the number of PMI subband is larger than a predefined value.

Embodiment 12: The method of embodiment 10 wherein, when the number of PMI subbands is less than a predefined threshold, the frequency domain basis vectors for the S NZP CSI-RS channels or S sets of CSI-RS ports are selected without any intermediate window.

Embodiment 13: The method of any of embodiments 1 to 12 wherein the selected frequency domain basis vectors are rotated such that a zero-th frequency domain basis vector is always selected.

Embodiment 14: The method of any of embodiments 1 to 13 wherein different numbers of frequency domain basis vectors are selected for different NZP CSI-RS resources or different sets of NZP CSI-RS ports.

Embodiment 15: The method of any of the previous embodiments, further comprising: providing user data; and forwarding the user data to a host via the transmission to the network node.

Group B Embodiments

Embodiment 16: A method performed by a network node (1202), the method comprising one or more of the following steps:

sending (1204), to a user equipment, UE, (1200), information that configures the UE (1200) with:

(a) multiple NZP CSI-RS resources for channel measurement associated with a CSI reporting configuration, where each of the multiple NZP CSI-RS resources is associated with a different TCI state or unified TCI state; or (b) a single NZP CSI-RS resource for channel measurement associated with the CSI reporting configuration, the single NZP CSI-RS resource comprising (e.g., consisting of) multiple sets of CSI-RS ports wherein each set of CSI-RS ports within the single NZP CSI-RS resource is associated with a different TCI state or unified TCI state; or (c) both (a) and (b); and receiving (120) CSI from the UE (1200), the CSI comprising:

A. an index identifying a starting point of a single window from which orthogonal frequency domain basis vectors corresponding to S>1 NZP CSI-RS channel measurement resources or S>1 sets of CSI-RS ports are selected, or B. S indices identifying starting points of S windows wherein orthogonal frequency domain basis vectors corresponding to the $s^{th}$ NZP CSI-RS channel measurement resource or $s^{th}$ set of CSI-RS ports are selected from the $s^{th}$ window, or C. S combinatorial indices per layer where the $s^{th}$ combinatorial index is used to select frequency domain basis vectors corresponding to the $s^{th}$ NZP CSI-RS channel measurement resource or $s^{th}$ set of CSI-RS ports; or D. a single combinatorial index per layer used to select frequency domain basis vectors corresponding to all S NZP CSI-RS channel measurement resources or S sets of CSI-RS ports; or E. a combination of any two or more of A-D.

Embodiment 17: The method of embodiment 16 wherein the same number of frequency domain basis vectors are selected for all measured channels (e.g., for all S>1 NZP CSI-RS channel measurement resources or S>1 sets of CSI-RS ports).

Embodiment 18: The method of embodiment 16 wherein different numbers of frequency domain basis vectors are selected for at least some of measured channels (e.g., for at least some of the S>1 NZP CSI-RS channel measurement resources or at least some of the S>1 sets of CSI-RS ports).

Embodiment 19: The method of any of embodiments 16 to 18 wherein the CSI comprises an index identifying a starting point of a single window from which orthogonal frequency domain basis vectors corresponding to S>1 NZP CSI-RS channel measurement resources or S>1 sets of CSI-RS ports are selected.

Embodiment 20: The method of embodiment 19 wherein the index identifying the starting point of the single window is only reported when the number of PMI subbands is larger than a predefined value.

Embodiment 21: The method of embodiment 19 or 20 wherein a length of the single window is xM, where x>1 is an integer and M is the number of frequency domain basis vectors selected per layer per NZP CSI-RS resource or set of CSI-RS ports.

Embodiment 22: The method of any of embodiments 19 to 21 wherein the index is layer common.

Embodiment 23: The method of any of embodiments 16 to 18 wherein the CSI comprises S indices identifying starting points of S windows wherein orthogonal frequency domain basis vectors corresponding to the $s^{th}$ NZP CSI-RS channel measurement resource or $s^{th}$ set of CSI-RS ports are selected from the $s^{th}$ window.

Embodiment 24: The method of embodiment 23 wherein the S indices identifying starting points of S windows are only reported when the number of PMI subbands is larger than a predefined value.

Embodiment 25: The method of any of embodiments 16 to 18 wherein the computed CSI comprises S combinatorial indices per layer where the $s^{th}$ combinatorial index is used to select frequency domain basis vectors corresponding to the $s^{th}$ NZP CSI-RS channel measurement resource or $s^{th}$ set of CSI-RS ports.

Embodiment 26: The method of embodiment 25 wherein the frequency domain basis vectors for the S NZP CSI-RS channels or S sets of CSI-RS ports are selected from a single window or S windows when the number of PMI subbands is larger than a predefined value.

Embodiment 27: The method of embodiment 25 wherein, when the number of PMI subbands is less than a predefined threshold, the frequency domain basis vectors for the S NZP CSI-RS channels or S sets of CSI-RS ports are selected without any intermediate window.

Embodiment 28: The method of any of embodiments 16 to 27 wherein the selected frequency domain basis vectors are rotated such that a zero-th frequency domain basis vector is always selected.

Embodiment 29: The method of any of embodiments 16 to 28 wherein different numbers of frequency domain basis vectors are selected for different NZP CSI-RS resources or different sets of NZP CSI-RS ports.

Embodiment 30: The method of any of the previous embodiments, further comprising: obtaining user data; and forwarding the user data to a host or a user equipment.

Group C Embodiments

Embodiment 31: A user equipment, comprising: processing circuitry configured to perform any of the steps of any of the Group A embodiments; and power supply circuitry configured to supply power to the processing circuitry.

Embodiment 32: A network node, the network node comprising: processing circuitry configured to perform any of the steps of any of the Group B embodiments; power supply circuitry configured to supply power to the processing circuitry.

Embodiment 33: A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 34: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

Embodiment 35: The host of the previous embodiment, wherein the cellular network further includes a network node configured to communicate with the UE to transmit the user data to the UE from the host.

Embodiment 36: The host of the previous 2 embodiments, wherein: the processing circuitry of the host is configured to execute a host application, thereby providing the user data; and the host application is configured to interact with a client application executing on the UE, the client application being associated with the host application.

Embodiment 37: A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

Embodiment 38: The method of the previous embodiment, further comprising: at the host, executing a host application associated with a client application executing on the UE to receive the user data from the UE.

Embodiment 39: The method of the previous embodiment, further comprising: at the host, transmitting input data to the client application executing on the UE, the input data being provided by executing the host application, wherein the user data is provided by the client application in response to the input data from the host application.

Embodiment 40: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

Embodiment 41: The host of the previous embodiment, wherein the cellular network further includes a network node configured to communicate with the UE to transmit the user data from the UE to the host.

Embodiment 42: The host of the previous 2 embodiments, wherein: the processing circuitry of the host is configured to execute a host application, thereby providing the user data; and the host application is configured to interact with a client application executing on the UE, the client application being associated with the host application.

Embodiment 43: A method implemented by a host configured to operate in a communication system that further includes a network node and a user equipment (UE), the method comprising: at the host, receiving user data transmitted to the host via the network node by the UE, wherein the UE performs any of the steps of any of the Group A embodiments to transmit the user data to the host.

Embodiment 44: The method of the previous embodiment, further comprising: at the host, executing a host application associated with a client application executing on the UE to receive the user data from the UE.

Embodiment 45: The method of the previous embodiment, further comprising: at the host, transmitting input data to the client application executing on the UE, the input data being provided by executing the host application, wherein the user data is provided by the client application in response to the input data from the host application.

Embodiment 46: A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

Embodiment 47: The host of the previous embodiment, wherein: the processing circuitry of the host is configured to execute a host application that provides the user data; and the UE comprises processing circuitry configured to execute a client application associated with the host application to receive the transmission of user data from the host.

Embodiment 48: A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B embodiments to transmit the user data from the host to the UE.

Embodiment 49: The method of the previous embodiment, further comprising, at the network node, transmitting the user data provided by the host for the UE.

Embodiment 50: The method of any of the previous 2 embodiments, whe7rein the user data is provided at the host by executing a host application that interacts with a client application executing on the UE, the client application being associated with the host application.

Embodiment 51: A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

Embodiment 52: The communication system of the previous embodiment, further comprising: the network node; and/or the user equipment.

Embodiment 53: A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

Embodiment 54: The host of the previous 2 embodiments, wherein: the processing circuitry of the host is configured to execute a host application, thereby providing the user data; and the host application is configured to interact with a client application executing on the UE, the client application being associated with the host application.

Embodiment 55: The host of the any of the previous 2 embodiments, wherein the initiating receipt of the user data comprises requesting the user data.

Embodiment 56: A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B embodiments to receive the user data from the UE for the host.

Embodiment 57: The method of the previous embodiment, further comprising at the network node, transmitting the received user data to the host.

Those skilled in the art will recognize improvements and modifications to the embodiments of the present disclosure. All such improvements and modifications are considered within the scope of the concepts disclosed herein.

The invention claimed is:

1. A method performed by a user equipment, UE, the method comprising:

receiving, from a network node, information for a Channel State Information, CSI, reporting configuration that configures the UE with:

a plurality of Non-Zero Power, NZP, Channel State Information Reference Signal, CSI-RS, resources for channel measurement, where each of the multiple NZP CSI-RS resources is associated with a different Transmission Configuration Indicator, TCI, state or unified TCI state; and a parameter combination indicating at least a total number of frequency domain, FD, basis vectors to be selected and reported per layer across the plurality of NZP CSI-RS resources; or performing channel measurements on:

the plurality of NZP CSI-RS resources according to the associated TCI states or unified TCI states; or computing CSI based on the channel measurements, including selecting FD basis vectors based on the channel measurements and the parameter combination, the CSI comprising:

for each layer, information about a single second subset of FD basis vectors selected from a second set of FD basis vectors for the plurality of CSI-RS resources; or reporting a computed CSI.

2. The method of claim 1 wherein the CSI further comprises information about the second set of FD basis vectors.

3. The method of claim 1 wherein the first set of FD basis vectors for each layer is common for all of the plurality of NZP CSI-RS resources.

4. The method of claim 1 wherein each of the first set and the second set of FD basis vectors comprises a subset of consecutive orthogonal Discrete Fourier Transform, DFT, basis vectors arranged in a cyclic order, wherein the information for the first set of FD basis vectors comprising an index that identifies the starting orthogonal DFT basis vector among the subset of consecutive orthogonal DFT basis vectors.

5. The method of claim 4 wherein the index that identifies the starting orthogonal DFT basis vector is only reported in the CSI when the number of precoding matrix indicator, PMI, subbands for the CSI is larger than a predefined value.

6. The method of claim 4 wherein the number of consecutive orthogonal frequency domain basis vectors for each layer is an integer multiple of the number of the first subset of FD basis vectors.

7. The method of claim 4 wherein the index is layer common.

8. The method of claim 1 wherein the information for the first set and the second set of FD basis vectors are only reported when the number of precoding matrix indicator, PMI, subbands for the CSI is larger than a predefined value.

9. The method of claim 1 wherein the information about each of the first subset and the second subset of FD basis vectors comprises a combinatorial index where the combinatorial index is used to indicate the subset of FD basis vectors from the corresponding set of FD basis vectors.

10. The method of claim 9 wherein the frequency domain basis vectors for the S NZP CSI-RS channels are selected from a single window when a number of precoding matrix indicator, PMI, subbands for the CSI is larger than a predefined value.

11. The method of claim 1 wherein, when a number of precoding matrix indicator, PMI, subbands for the CSI is less than a predefined threshold, the first set and the second set of FD basis vectors are the same and comprise a number of orthogonal DFT basis vectors each having a vector length equal to the number of PMI subbands, wherein the number of orthogonal DFT basis vectors equals to the number of PMI subbands.

12. The method of claim 1 wherein the first subset of frequency domain basis vectors are phase rotated such that a zero-th frequency domain basis vector containing all 1's is always selected, wherein the amount of phase rotation is reported.

13. A user equipment, UE, comprising:
- one or more transmitters;
- one or more receivers; and
- processing circuitry associated with the one or more transmitters and the one or more receivers, the processing circuitry configured to cause the UE to perform one or more of:
  - receive, from a network node, information for a Channel State Information, CSI, reporting configuration that configures the UE with:
    - a plurality of Non-Zero Power, NZP, Channel State Information Reference Signal, CSI-RS, resources for channel measurement, where each of the multiple NZP CSI-RS resources is associated with a different Transmission Configuration Indicator, TCI, state or unified TCI state; or
    - a parameter combination indicating at least a total number of frequency domain, FD, basis vectors to be selected and reported per layer across the plurality of NZP CSI-RS resources or the plurality of sets of CSI-RS ports; or
  - perform channel measurements on:
    - the plurality of NZP CSI-RS resources according to the associated TCI states or unified TCI states; or
  - compute CSI based on the channel measurements, including selecting FD basis vectors based on the channel measurements and the parameter combination, the CSI comprising:
    - for each layer, information about a single second subset of FD basis vectors selected from a second set of FD basis vectors for the plurality of CSI-RS resources; or
  - reporting the computed CSI.

14. A method performed by a network node, the method comprising:
- sending, to a User Equipment, UE,, information for a Channel State Information, CSI, reporting configuration that configures the UE with:
  - (a) a plurality of Non-Zero Power, NZP, Channel State Information Reference Signal, CSI-RS, resources for channel measurement, where each of the multiple NZP CSI-RS resources is associated with a different Transmission Configuration Indicator, TCI, state or unified TCI state;
  - (b) unified TCI state;
  - (c) both (a) and (b); or
  - (d) a parameter combination indicating at least a total number of frequency domain, FD, basis vectors to be selected and reported per layer across the plurality of NZP CSI-RS resources or the plurality of sets of CSI-RS ports; or
- receiving a report comprising CSI from the UE, the CSI comprising:
  - for each layer, information about a single second subset of FD basis vectors selected from a second set of FD basis vectors for the plurality of CSI-RS resources.

15. A network node comprising processing circuitry configured to cause the network node to:
- send, to a User Equipment, UE, information for a Channel State Information, CSI, reporting configuration that configures the UE with:
  - (a) a plurality of Non-Zero Power, NZP, Channel State Information Reference Signal, CSI-RS, resources for channel measurement, where each of the multiple NZP CSI-RS resources is associated with a different Transmission Configuration Indicator, TCI, state or unified TCI state; or
  - (b)
  - a parameter combination indicating at least a total number of frequency domain, FD, basis vectors to be selected and reported per layer across the plurality of NZP CSI-RS resources or the plurality of sets of CSI-RS ports; or
- receive a report comprising CSI from the UE, the CSI comprising:
  - for each layer, information about a single second subset of FD basis vectors selected from a second set of FD basis vectors for the plurality of CSI-RS resources.

* * * * *